(12) United States Patent
Yoshimoto et al.

(10) Patent No.: US 12,254,071 B2
(45) Date of Patent: *Mar. 18, 2025

(54) SEMICONDUCTOR DEVICE

(71) Applicant: Semiconductor Energy Laboratory Co., Ltd., Atsugi (JP)

(72) Inventors: Satoshi Yoshimoto, Isehara (JP); Susumu Kawashima, Atsugi (JP); Koji Kusunoki, Isehara (JP); Kazunori Watanabe, Machida (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,437

(22) Filed: Aug. 24, 2023

(65) Prior Publication Data
US 2024/0028680 A1 Jan. 25, 2024

Related U.S. Application Data

(63) Continuation of application No. 17/623,294, filed as application No. PCT/IB2020/056156 on Jun. 30, 2020, now Pat. No. 11,741,209.

(30) Foreign Application Priority Data

Jul. 11, 2019 (JP) .................. 2019-129555

(51) Int. Cl.
*G06F 3/041* (2006.01)
*G06F 21/32* (2013.01)
*G06V 40/13* (2022.01)

(52) U.S. Cl.
CPC ............ *G06F 21/32* (2013.01); *G06F 3/0412* (2013.01); *G06F 3/04164* (2019.05); *G06V 40/1318* (2022.01)

(58) Field of Classification Search
None
See application file for complete search history.

(56) References Cited

U.S. PATENT DOCUMENTS 8,736,587 B2 5/2014 Yamazaki
11,062,667 B2 7/2021 Kawashima et al.
(Continued)

FOREIGN PATENT DOCUMENTS

CN 108109592 A 6/2018
JP 2010-040042 A 2/2010
(Continued)

OTHER PUBLICATIONS

International Search Report (Application No. PCT/IB2020/056156) Dated Oct. 13, 2020.
(Continued)

*Primary Examiner* — Krishna P Neupane
(74) *Attorney, Agent, or Firm* — Robinson Intellectual Property Law Office, P.C.; Eric J. Robinson

(57) ABSTRACT

A semiconductor device including a biometric recognition function and a touch sensor or near touch sensor function is provided. The semiconductor device includes a light-emitting device and an imaging device. The imaging device includes a gate driver circuit and m rows of pixels (m is an integer more than or equal to 2). The gate driver circuit includes a plurality of first register circuits and second register circuits whose number is less than that of the first register circuits. The first register circuits are connected with each other in series and the second register circuits are connected with each other in series. The gate driver circuit has a function of operating in the first mode and the second mode. In the first mode, the first register circuits are in the on state and the second register circuits are in the off state,
(Continued)

and in the second mode, the second register circuits are in the on state and the first register circuits are in the off state.

13 Claims, 30 Drawing Sheets

(56) References Cited

U.S. PATENT DOCUMENTS

| | | | |
|---|---|---|---|
| 2003/0206608 A1* | 11/2003 | Kawahata | G11C 19/28 |
| | | | 377/64 |
| 2005/0146006 A1 | 7/2005 | Yamazaki et al. | |
| 2010/0007632 A1* | 1/2010 | Yamazaki | G06F 1/1616 |
| | | | 345/175 |
| 2014/0299879 A1 | 10/2014 | Yamazaki | |
| 2015/0243678 A1 | 8/2015 | Umezaki | |
| 2015/0310929 A1 | 10/2015 | Umezaki | |
| 2017/0053585 A1* | 2/2017 | Sohn | G09G 3/20 |
| 2018/0151144 A1 | 5/2018 | Kawashima et al. | |
| 2019/0130087 A1 | 5/2019 | Mori et al. | |
| 2021/0066669 A1 | 3/2021 | Kubota et al. | |
| 2021/0096678 A1 | 4/2021 | Kubota et al. | |
| 2021/0193071 A1 | 6/2021 | Kawashima et al. | |
| 2021/0327979 A1 | 10/2021 | Kamada et al. | |

FOREIGN PATENT DOCUMENTS

| | | |
|---|---|---|
| JP | 2018-092161 A | 6/2018 |
| JP | 2019-079415 A | 5/2019 |
| KR | 2018-0059358 A | 6/2018 |

OTHER PUBLICATIONS

Written Opinion (Application No. PCT/IB2020/056156) Dated Oct. 13, 2020.

* cited by examiner

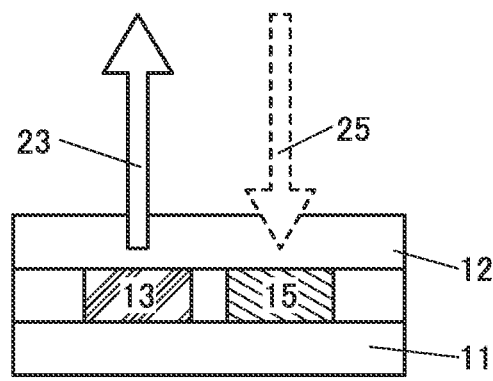
FIG. 1A
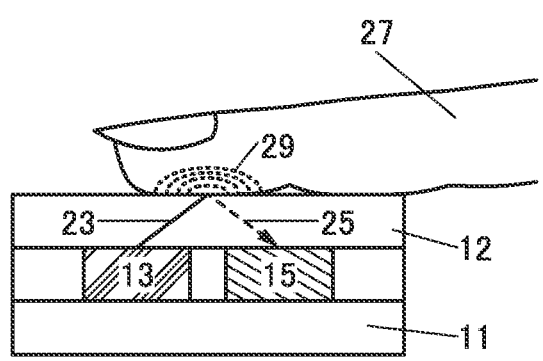
FIG. 1B1
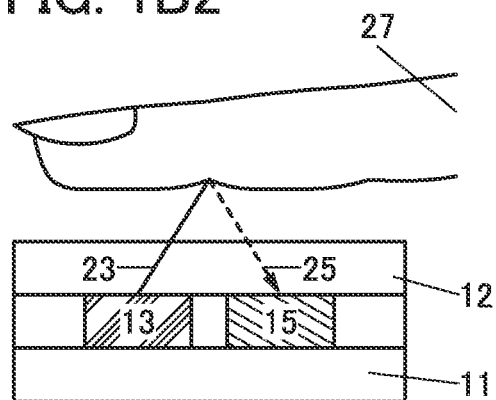
FIG. 1B2

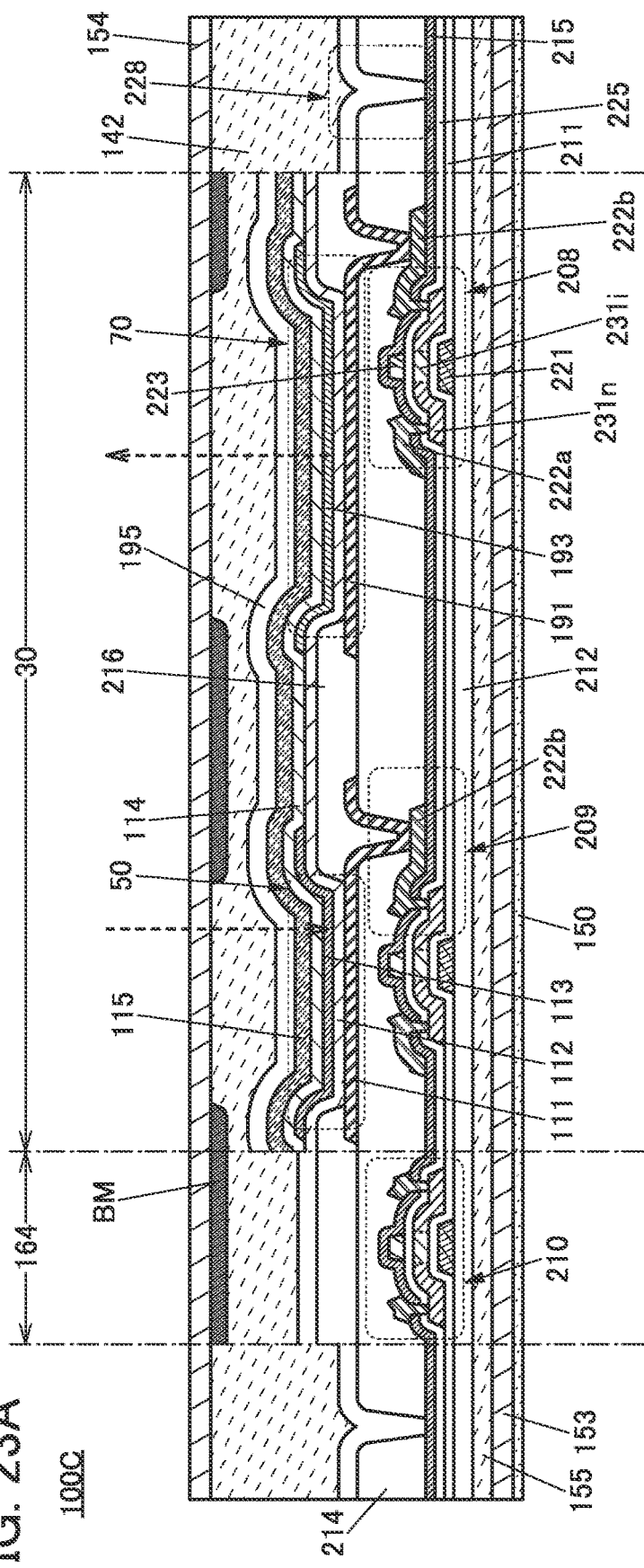
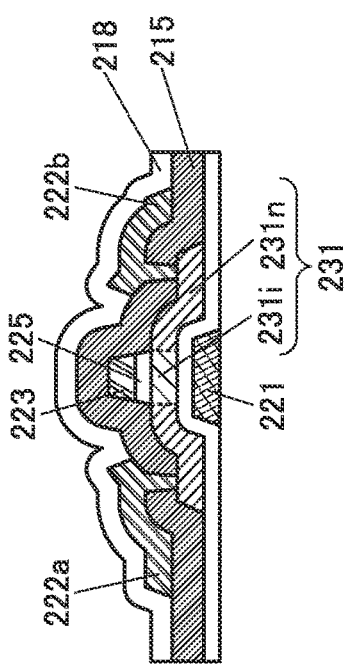
FIG. 23A
FIG. 23B

SEMICONDUCTOR DEVICE

TECHNICAL FIELD

One embodiment of the present invention relates to a semiconductor device. One embodiment of the present invention relates to a semiconductor device including a light-emitting device and an imaging device. One embodiment of the present invention relates to an operation method of a semiconductor device.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device (e.g., touch sensor), an input/output device (e.g., touch panel), a driving method thereof, and a manufacturing method thereof. A semiconductor device generally means a device that can function by utilizing semiconductor characteristics.

BACKGROUND ART

Imaging devices have been mounted in devices such as digital cameras conventionally, and with the widespread use of portable information terminals such as smartphones and tablet terminals, an improvement in performance, a reduction in size, and a reduction in costs have been needed. Moreover, imaging devices have been not only used for taking a photograph or a moving image but also applied to biometric recognition such as face recognition, fingerprint recognition, and vein recognition or input devices such as touch sensors or motion sensors, for example; that is, the usage has been diversified. Patent Document 1 discloses electronic devices such as smartphones capable of fingerprint recognition.

REFERENCE

Patent Document

[Patent Document 1] Japanese Published Patent Application No. 2019-79415

SUMMARY OF THE INVENTION

Problems to be Solved by the Invention

For example, in the case where an electronic device including a semiconductor device having a light-emitting device and an imaging device has a function of biometric recognition such as fingerprint recognition and a function of a touch sensor or a near-touch sensor, it is preferable to perform high-accuracy imaging to improve the accuracy of recognition when biometric recognition is performed. On the other hand, in the case of using a function of a touch sensor or a near touch sensor, imaging is preferably performed at a high frame frequency so that the movement of a detection target such as a finger can be detected accurately.

An object of one embodiment of the present invention is to provide a semiconductor device having a function of biometric recognition and a function of a touch sensor or a near touch sensor. Another object is to provide a semiconductor device including an imaging device that can perform imaging with high accuracy. Another object is to provide a semiconductor device including an imaging device that can perform imaging at a high frame frequency. Another object is to provide a semiconductor device that can perform biometric recognition with high accuracy. Another object is to provide a semiconductor device that can detect the position of a detection target with high accuracy. Another object is to provide a highly useful semiconductor device. Another object is to provide a highly reliable semiconductor device. Another object is to provide a novel semiconductor device or the like.

Another object is to provide an operation method of a semiconductor device having a function of biometric recognition and a function of a touch sensor or a near touch sensor. Another object is to provide an operation method of a semiconductor device including an imaging device that can perform imaging with high accuracy. Another object is to provide an operation method of a semiconductor device including an imaging device that can perform imaging at a high frame frequency. Another object is to provide an operation method of a semiconductor device that can perform biometric recognition with high accuracy. Another object is to provide an operation method of a semiconductor device that can detect the position of a detection target with high accuracy. Another object is to provide an operation method of a highly useful semiconductor device. Another object is to provide an operation method of a highly reliable semiconductor device. Another object is to provide an operation method of a novel semiconductor device or the like.

Note that the description of these objects does not preclude the existence of other objects. One embodiment of the present invention does not have to achieve all these objects. Objects other than these can be derived from the description of the specification, the drawings, the claims, and the like.

Means for Solving the Problems

A semiconductor device includes a light-emitting device and an imaging device. The imaging device includes a gate driver circuit and m rows of pixels (m is an integer more than or equal to 2). The gate driver circuit includes a plurality of first register circuits and second register circuits whose number is less than that of the first register circuits. The first register circuits are connected with each other in series. The second register circuits are connected with each other in series. The gate driver circuit has a function of operating in a first mode and a second mode.

In the first mode, the first register circuits are in an on state and the second register circuits are in an off state. In the second mode, the second register circuits are in the on state and the first register circuits are in the off state.

In the above embodiment, the gate driver circuit may include m first register circuits and m/k (k is an integer more than or equal to 2 and less than or equal to m) second register circuits.

In the above embodiment, the number of rows of the pixels to which signals output from the second register circuits are supplied in the second mode can be less than the number of rows of the pixels to which signals output from the first register circuits are supplied in the first mode.

In the above embodiment, in the first mode, signals output from the first register circuits can be supplied to m rows of the pixels, and in the second mode, signals output from the second register circuits can be supplied to the pixels more than m/k rows and less than m rows.

One embodiment of the present invention is a semiconductor device. The semiconductor device includes a light-emitting device and an imaging device. The imaging device includes a gate driver circuit. The imaging device has a function of operating in a first mode or a second mode. The first gate driver circuit includes first to m-th (m is an integer more than or equal to 2) register circuits for the first mode, first to p-th (p is an integer more than or equal to 1 and less than m) register circuits for the second mode, a first transistor, a second transistor, a third transistor, and a fourth transistor. The first to m-th register circuits for the first mode are connected with each other in series. The first to p-th register circuits for the second mode are connected with each other in series. An output terminal of the first register circuit for the first mode is electrically connected to one of a source and a drain of the first transistor. The output terminal of the first register circuit for the first mode is electrically connected to one of a source and a drain of the second transistor. An output terminal of the first register circuit for the second mode is electrically connected to one of a source and a drain of the third transistor. The output terminal of the first register circuit for the second mode is electrically connected to one of a source and a drain of the fourth transistor. The other of the source and the drain of the first transistor is electrically connected to the other of the source and the drain of the third transistor. The other of the source and the drain of the second transistor is electrically connected to the other of the source and the drain of the fourth transistor.

In the above embodiment, in the first mode, the first and the second transistors are in the on state, and the third and the fourth transistors are in the off state, and in the second mode, the third and the fourth transistors are in the on state, and the first and the second transistors are in the off state.

In the above embodiment, the imaging device includes m rows of pixels, and p can be m/k (k is an integer more than or equal to 2 and less than or equal to m).

Effect of the Invention

According to one embodiment of the present invention, a semiconductor device having a function of biometric recognition and a function of a touch sensor or a near touch sensor can be provided. A semiconductor device including an imaging device that can perform imaging with high accuracy can be provided. A semiconductor device including an imaging device that can perform imaging at a high frame frequency can be provided. A semiconductor device that can perform biometric recognition with high accuracy can be performed. A semiconductor device that can detect the position of a detection target with high accuracy can be provided. A highly useful semiconductor device can be provided. A highly reliable semiconductor device can be provided. A novel semiconductor device or the like can be provided.

An operation method of a semiconductor device having a function of biometric recognition and a function of a touch sensor or a near touch sensor can be provided. An operation method of a semiconductor device including an imaging device that can perform imaging with high accuracy can be provided. An operation method of a semiconductor device including an imaging device that can perform imaging at a high frame frequency can be provided. An operation method of a semiconductor device that can perform biometric recognition with high accuracy can be provided. An operation method of a semiconductor device that can detect the position of a detection target with high accuracy can be provided. An operation method of a highly useful semiconductor device can be provided. An operation method of a highly reliable semiconductor device can be provided. An operation method of a novel semiconductor device or the like can be provided.

Note that the description of these effects does not preclude the existence of other effects. One embodiment of the present invention does not have to have all of these effects. Other effects can be derived from the description of the specification, the drawings, the claims, and the like.

BRIEF DESCRIPTION OF THE DRAWINGS

FIG. 1A and FIG. 1B1 and FIG. 1B2 are schematic views illustrating structure examples of a semiconductor device.

FIG. 2B1 is a circuit diagram illustrating a configuration example of an imaging device. FIG. 2B2 is a timing chart illustrating an example of a method of operation of an imaging device.

FIG. 23A and FIG. 23B are cross-sectional views illustrating structure examples of a semiconductor device.

MODE FOR CARRYING OUT THE INVENTION

Figure 2A:
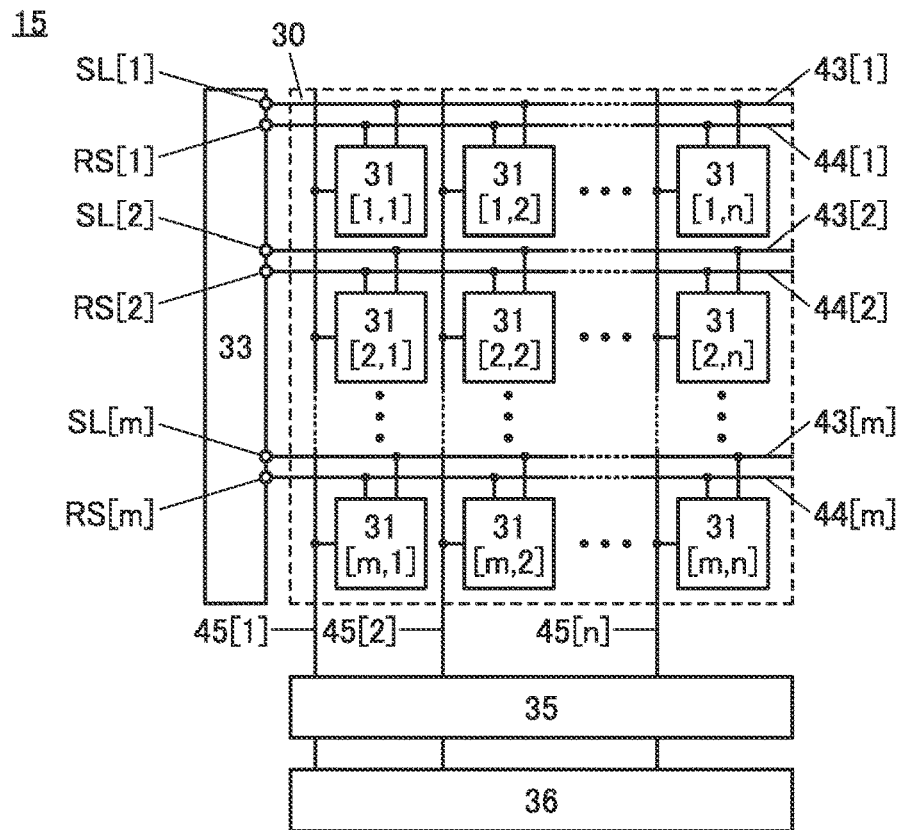
FIG. 2A is a block diagram illustrating a structure example of an imaging device.

Embodiments are described in detail with reference to the drawings. Note that the present invention is not limited to the following description, and it will be readily appreciated by those skilled in the art that modes and details of the present invention can be modified in various ways without departing from the spirit and scope of the present invention. Thus, the present invention should not be construed as being limited to the description in the following embodiments. Note that in the structures of the invention described below, the same portions or portions having similar functions are denoted with the same reference numerals in different drawings, and description of such portions is not repeated.

The position, size, range, and the like of each component illustrated in the drawings and the like do not represent the actual position, size, range, and the like in some cases for easy understanding of the invention. Therefore, the disclosed invention is not necessarily limited to the position, size, range, or the like disclosed in the drawings. For example, in an actual manufacturing process, a resist mask or the like might be unintentionally reduced in size by treatment such as etching, which might not be reflected in the drawings for easy understanding.

In addition, in this specification and the like, the terms "electrode" and "wiring" do not functionally limit these components. For example, an "electrode" is used as part of a "wiring" in some cases, and vice versa. Furthermore, the terms "electrode" and "wiring" can also include the case where a plurality of "electrodes" and "wirings" are formed in an integrated manner.

In this specification and the like, the resistance value of a "resistor" is sometimes determined depending on the length of a wiring. Alternatively, the resistance value is sometimes determined through the connection of a conductive layer used for a wiring to a conductive layer with resistivity different from that of the conductive layer. Alternatively, the resistance value is sometimes determined through impurity doping in a semiconductor layer.

In this specification and the like, a "terminal" in an electric circuit refers to a portion that inputs or outputs current or voltage or receives or transmits a signal. Accordingly, part of a wiring or an electrode functions as a terminal in some cases.

Note that the term "over", "above", "under", or "below" in this specification and the like does not necessarily mean that a component is placed directly over and in contact with or directly under and in contact with another component. For example, the expression "electrode B over insulating layer A" does not necessarily mean that the electrode B is formed on and in direct contact with the insulating layer A, and does not exclude the case where another component is provided between the insulating layer A and the electrode B. Additionally, the expression "conductive layer D above conductive layer C" does not necessarily mean that the conductive layer D is formed on and in direct contact with the conductive layer C, and does not exclude the case where another component is provided between the conductive layer C and the conductive layer D. The term "above" or "below" does not exclude the case where a component is placed in an oblique direction. Furthermore, functions of a source and a drain are interchanged with each other depending on operation conditions, for example, when a transistor of different polarity is employed or when the direction of current flow is changed in circuit operation; therefore, it is difficult to define which is the source or the drain. Therefore, the terms source and drain can be switched in this specification.

In this specification and the like, the expression "electrically connected" includes the case where components are directly connected to each other and the case where components are connected through an "object having any electric function". Here, there is no particular limitation on the "object having any electric function" as long as electric signals can be transmitted and received between components that are connected through the object. Thus, even when the expression "electrically connected" is used, there is a case where no physical connection is made and a wiring just extends in an actual circuit. In addition, the expression "directly connected" includes the case where different conductors are connected to each other through a contact to form a wiring. Thus, a wiring may be formed of conductors that contain one or more of the same elements or may be formed of conductors that contain different elements.

In this specification and the like, the terms "identical", "same", "equal", "uniform", and the like used in describing calculation values and actual measurement values allow for a margin of error of ±20% unless otherwise specified.

A voltage refers to a voltage difference between a given voltage and a reference voltage (e.g., a ground voltage or a source voltage) in many cases. Therefore, the terms "voltage" and "voltage" can be replaced with each other in many cases. In this specification and the like, "voltage" and "voltage" can be replaced with each other unless otherwise specified.

Note that a "semiconductor" has characteristics of an "insulator" when the conductivity is sufficiently low, for example. Thus, a "semiconductor" and an "insulator" can be replaced with each other. In that case, a "semiconductor" and an "insulator" cannot be strictly distinguished from each other because a border therebetween is not clear. Accordingly, a "semiconductor" and an "insulator" in this specification can be replaced with each other in some cases.

Furthermore, a "semiconductor" has characteristics of a "conductor" when the conductivity is sufficiently high, for example. Thus, a "semiconductor" and a "conductor" can be replaced with each other. In that case, a "semiconductor" and a "conductor" cannot be strictly distinguished from each other because a border therebetween is not clear. Accordingly, a "semiconductor" and a "conductor" in this specification can be replaced with each other in some cases.

Note that ordinal numbers such as "first" and "second" in this specification and the like are used in order to avoid confusion among components and do not denote the priority or the order such as the order of steps or the stacking order. A term without an ordinal number in this specification and the like might be provided with an ordinal number in a claim in order to avoid confusion among components. A term with an ordinal number in this specification and the like might be provided with a different ordinal number in a claim. Furthermore, even when a term is provided with an ordinal number in this specification and the like, the ordinal number might be omitted in the scope of claims and the like.

Note that in this specification and the like, an "on state" of a transistor refers to a state in which a source and a drain of the transistor are electrically short-circuited (also referred to as a "conduction state"). Furthermore, an "off state" of the transistor refers to a state in which the source and the drain of the transistor are electrically disconnected (also referred to as a "non-conduction state"). For example, the transistor in the on state can operate in a linear region.

In addition, in this specification and the like, an "on-state current" sometimes refers to a current that flows between a source and a drain when a transistor is in an on state. Furthermore, an "off-state current" sometimes refers to a current that flows between a source and a drain when a transistor is in an off state.

In this specification and the like, a gate refers to part or the whole of a gate electrode and a gate wiring. A gate wiring refers to a wiring for electrically connecting at least one gate electrode of a transistor to another electrode or another wiring.

In this specification and the like, a source refers to part or the whole of a source region, a source electrode, and a source wiring. A source region refers to a region in a semiconductor layer, where the resistivity is lower than or equal to a given value. A source electrode refers to part of a conductive layer, which is connected to a source region. A source wiring refers to a wiring for electrically connecting at least one source electrode of a transistor to another electrode or another wiring.

In this specification and the like, a drain refers to part or the whole of a drain region, a drain electrode, and a drain wiring. A drain region refers to a region in a semiconductor layer, where the resistivity is lower than or equal to a given value. A drain electrode refers to part of a conductive layer, which is connected to a drain region. A drain wiring refers to a wiring for electrically connecting at least one drain electrode of a transistor to another electrode or another wiring.

Embodiment 1

In this embodiment, a semiconductor device of one embodiment of the present invention will be described.

A semiconductor device of one embodiment of the present invention includes a light-emitting device and an imaging device. The light-emitting device has a function of, for example, emitting infrared light or visible light. The imaging device has a function of detecting light emitted from the light-emitting device. For example, a detection target is irradiated with light emitted from the light-emitting device, and the light which is reflected by the detection target can be detected with the imaging device.

The semiconductor device of one embodiment of the present invention can operate in a first mode and a second mode. For example, when the detection target is a finger of a user of the semiconductor device of one embodiment of the present invention, the first mode can be a mode in which biometric recognition such as fingerprint recognition is performed. The second mode can be a mode in which the position of the detection target in contact with the semiconductor device or not in contact with but near the semiconductor device can be detected. In other words, in the second mode, the semiconductor device of one embodiment of the present invention can function as a touch sensor or a near touch sensor. Here, the near touch sensor is a sensor that has a function of detecting a near object. For example, in the case where a near touch sensor is provided in a pixel included in a semiconductor device, a sensor that has a function of detecting an object near the pixel is referred to as a near touch sensor. That is, even when an object is not in contact with the near touch sensor, the near touch sensor can detect the object.

The imaging device included in the semiconductor device of one embodiment of the present invention includes a pixel portion in which pixels in m row(s) and n column(s) (m and n are integers more than or equal to 1) are arranged in a matrix, and a gate driver circuit having a function of selecting pixels from which imaging data is read out row by row. Here, the gate driver circuit includes a shift register circuit. The shift register circuit includes a plurality of register circuits. The register circuits are connected with each other in series, whereby the pixels in m rows can be selected sequentially.

Here, when biometric recognition is performed in the first mode and the position of a detection target such as a finger in contact with or near the pixel portion is detected (a touch or a near touch is detected) in the second mode, imaging with high accuracy is preferably performed to improve the accuracy of recognition when the semiconductor device of one embodiment of the present invention is operated in the first mode. In contrast, when the semiconductor device operates in the second mode, imaging at a high frame frequency is preferably performed so that the movement of a detection target can be detected accurately.

Thus, a register circuit for the first mode and a register circuit for the second mode are provided in the gate driver circuit included in the imaging device of the semiconductor device of one embodiment of the present invention. The number of register circuits for the second mode is smaller than the number of register circuits for the first mode. For example, m register circuits for the first mode and m/k (k is an integer more than or equal to 2 and less than or equal to m) register circuits for the second mode can be provided.

When the semiconductor device of one embodiment of the present invention is operated in the first mode, the register circuit for the first mode is in the on state and the register circuit for the second mode is in the off state. In contrast, when the semiconductor device of one embodiment of the present invention is operated in the second mode, the register circuit for the second mode is in the on state and the register circuit for the first mode is in the off state.

As described above, the number of register circuits for the first mode can be the same as the number of rows of the pixels in the imaging device, for example. Thus, in the first mode, pixels in all the rows can be selected and operated, for example. Therefore, high-accuracy imaging can be performed. In contrast, the number of register circuits for the second mode can be smaller than the number of rows of the pixels included in the imaging device, for example. Accordingly, one frame period can be shortened and imaging can be performed at a high frame frequency. As described above, the semiconductor device of one embodiment of the present invention can detect the movement of a detection target such as a finger with high accuracy while the accuracy of biometric recognition, for example, is improved.

Structure Example of Semiconductor Device

FIG. 1A illustrates a structure example of a semiconductor device 10. The semiconductor device 10 includes a substrate 11 and a substrate 12, and a light-emitting device 13 and an imaging device 15 are provided between the substrate 11 and the substrate 12.

The light-emitting device 13 has a function of emitting light 23. The light 23 can be infrared light or visible light.

The imaging device 15 has a function of detecting emitted light 25. Specifically, the imaging device 15 is provided with a photodetector and has a function of detecting the light 25 emitted to the photodetector.

The semiconductor device 10, for example, emits the light 23 to a detection target, and the light reflected by the detection target can be detected as the light 25 with the imaging device 15.

The semiconductor device 10 can operate in the first mode and the second mode. FIG. 1B1 illustrates the first mode, and FIG. 1B2 illustrates the second mode. In FIG. 1B1 and FIG. 1B2, the detection target is a finger 27. The finger 27 can be a finger of the user of the semiconductor device 10, for example.

In the first mode, the light 23 is emitted to the finger 27 and the imaging device 15 detects the light reflected by the finger 27 as the light 25, whereby a fingerprint 29 of the finger 27 can be detected. In this manner, biometric recognition such as fingerprint recognition can be performed.

In the second mode, the light-emitting device 13 emits the light 23 and the imaging device 15 detects the light 25 reflected by the finger 27, whereby the position of the finger 27 can be detected. Here, as illustrated in FIG. 1B2, as long as the detection target finger 27 is near the semiconductor device 10, the finger 27 is not necessarily in contact with the semiconductor device 10. Alternatively, the finger 27 may be in contact with the semiconductor device 10. In other words, in the second mode, the semiconductor device 10 can function as a touch sensor or a near touch sensor. Note that the detection target is not limited to the finger 27 and may be, for example, a stylus.

Configuration Example of Imaging Device

Figure 2A:
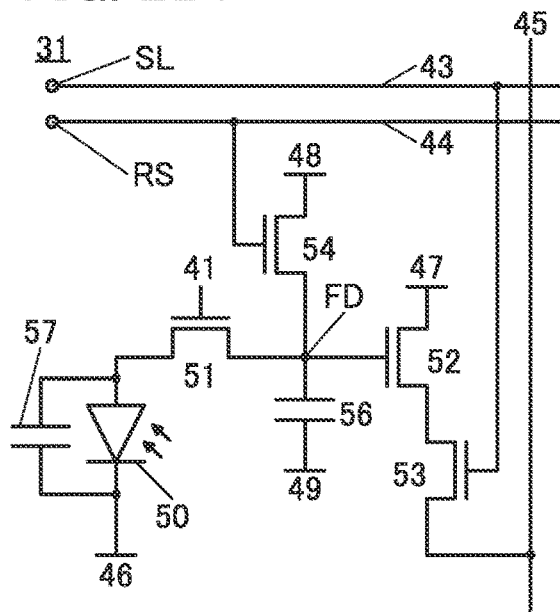
Figure 2A:
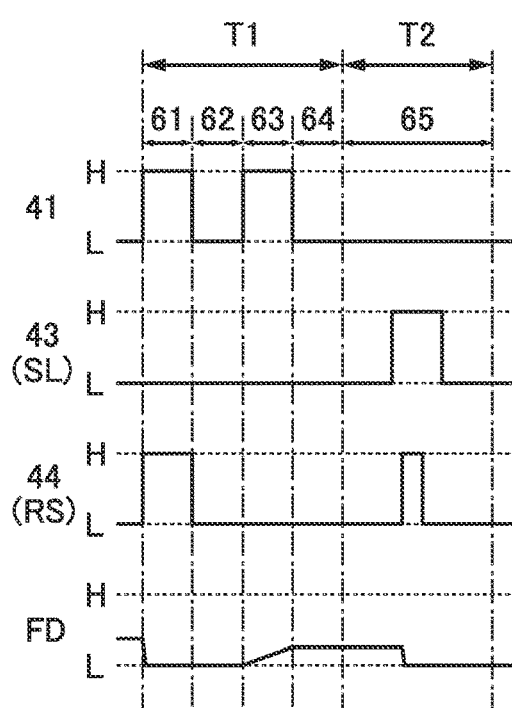

FIG. 2A is a block diagram illustrating a configuration example of the imaging device 15. The imaging device 15 includes a pixel portion 30 in which pixels 31 in m rows and n columns are arranged in a matrix (m and n are integers more than or equal to 1), a gate driver circuit 33, a CDS circuit 35, and a data driver circuit 36. Here, the gate driver circuit 33 includes a shift register circuit, which is not illustrated in FIG. 2A.

In this specification and the like, when a plurality of components are denoted with the same reference numerals, and in particular need to be distinguished from each other, an identification sign such as "[1]", "[m]", "[1,1]", or "[m,n]" is sometimes added to the reference numerals. For example, the pixel 31 in the first row and the first column is denoted with a pixel 31[1,1], and the pixel 31 in the m-th row and the n-th column is denoted with a pixel 31[m,n].

The gate driver circuit 33 is electrically connected to the pixels 31 through a wiring 43. The gate driver circuit 33 is electrically connected to the pixels 31 through a wiring 44. Here, the wiring 43 is electrically connected to a terminal SL, and the wiring 44 is electrically connected to a terminal RS. The CDS circuit 35 is electrically connected to the pixel 31 through the wiring 45. The CDS circuit 35 is electrically connected to the data driver circuit 36.

FIG. 2A illustrates a configuration in which the pixels 31 in the same rows are electrically connected to the same wiring 43 (terminal SL) and the same wiring 44 (terminal RS), and the pixels 31 in the same column are electrically connected to the same wiring 45. In this specification and the like, for example, the wiring 43 (terminal SL) electrically connected to the pixels 31 in the first row is referred to as a wiring 43[1] (terminal SL[1]) and the wiring 43 (terminal SL) electrically connected to the pixels 31 in the m-th row is referred to as a wiring 43[m] (terminal SL[m]). For example, the wiring 44 (terminal RS) electrically connected to the pixels 31 in the first row is referred to as a wiring 44[1] (terminal RS[1]) and the wiring 44 (terminal RS) electrically connected to the pixels 31 in the m-th row is referred to as a wiring 44[m] (terminal RS[m]). For example, the wiring 45 electrically connected to the pixels 31 in the first column is referred to as a wiring 45[1], and the wiring 45 electrically connected to the pixels 31 in the n-th column is referred to as a wiring 45[n].

The gate driver circuit 33 has a function of selecting the pixels 31 from which imaging data is read out. Specifically, the pixels 31 from which imaging data is read out can be selected by supplying a signal to the wiring 43 (terminal SL). Furthermore, the gate driver circuit 33 has a function of supplying a signal to the wiring 44 (terminal RS).

The CDS circuit 35 has a function of performing correlated double sampling (CDS) on imaging data read out from the pixel 31. The correlated double sampling means that a difference between a potential corresponding to the imaging data read out and a potential output from the pixel 31 when imaging data written to the pixel 31 is reset is calculated. The correlated double sampling can reduce noise in the imaging data read out.

The data driver circuit 36 has a function of outputting imaging data read out from the pixel 31 to the outside of the imaging device 15. Specifically, the data driver circuit 36 has a function of outputting imaging data subjected to correlated double sampling by using the CDS circuit 35 to the outside of the imaging device 15.

FIG. 2B1 is a circuit diagram illustrating a configuration example of the pixel 31. The pixel 31 with a configuration illustrated in FIG. 2B1 includes a photodetector 50, a transistor 51, a transistor 52, a transistor 53, a transistor 54, a capacitor 56, and a capacitor 57. Note that the capacitor 56 or the capacitor 57 is not necessarily provided.

One electrode of the photodetector 50 is electrically connected to one electrode of the capacitor 57. The one electrode of the capacitor 57 is electrically connected to one of a source and a drain of the transistor 51. The other of the source and the drain of the transistor 51 is electrically connected to a gate of the transistor 52. One of a source and a drain of the transistor 52 is electrically connected to one of a source and a drain of the transistor 53. A gate of the transistor 52 is electrically connected to one of a source and a drain of the transistor 54. One of the source and the drain of the transistor 54 is electrically connected to one electrode of the capacitor 56. Note that a node where the other of the source and the drain of the transistor 51, the gate of the transistor 52, one of the source and the drain of the transistor 54, and the one electrode of the capacitor 56 are electrically connected to each other is referred to as a node FD.

A gate of the transistor 51 is electrically connected to a wiring 41. A gate of the transistor 53 is electrically connected to the wiring 43 (terminal SL). A gate of the transistor 54 is electrically connected to the wiring 44 (terminal RS). The other of the source and the drain of the transistor 53 is electrically connected to the wiring 45. The other electrode of the photodetector 50 and the other electrode of the capacitor 57 are electrically connected to a wiring 46. The other of the source and the drain of the transistor 52 is electrically connected to a wiring 47. The other of the source and the drain of the transistor 54 is electrically connected to a wiring 48. The other electrode of the capacitor 56 is electrically connected to a wiring 49.

A power potential can be supplied to the wiring 46 to the wiring 49. Thus, it can be said that the wiring 46 to the wiring 49 each have a function of a power supply line. For example, a high potential can be supplied to the wiring 47, and a low potential can be supplied to the wiring 49. In the case where the cathode of the photodetector 50 is electrically connected to the wiring 46 as illustrated in FIG. 2B1, the wiring 46 can have a high potential and the wiring 48 can have a low potential. In contrast, in the case where the anode of the photodetector 50 is electrically connected to the wiring 46, the wiring 46 can have a low potential and the wiring 48 can have a high potential.

In this specification and the like, a high potential refers to a potential higher than a low potential. A ground potential can be used as the high potential signal or the low potential signal. For example, in the case where a ground potential is used as the high potential signal, the low potential signal is a potential lower than the ground potential, and in the case where a ground potential is used as the low potential signal, the high potential signal is a potential higher than the ground potential.

FIG. 2B2 is a timing chart showing an operation example of the pixel 31 with the configuration illustrated in FIG. 2B1. Here, the potential of the wiring 46 is set to a high potential, and the potential of the wiring 48 is set to a low potential. Note that in FIG. 2B2, "H" means a high potential and "L" means a low potential. The same applies to other timing charts.

FIG. 2B2 illustrates a period T1 and a period T2 in which the pixel 31 operates. In addition, the period T1 includes a period 61, a period 62, a period 63, and a period 64, and the period T2 includes a period 65.

First, an example of the operation in the period T1 is described. In the period 61, the potentials of the wiring 41 and the wiring 44 (terminal RS) is set to a high potential, and the potential of the wiring 43 (terminal SL) is set to a low potential. Accordingly, the transistor 51 and the transistor 54 are turned on and the transistor 53 is turned off. The transistor 54 is turned on, whereby the potential of the node FD becomes a low potential that is the potential of the wiring 48. Furthermore, since the transistor 51 is turned on in addition to the transistor 54, the potential of one electrode of the photodetector 50 also becomes a low potential that is the potential of the wiring 48; this is not illustrated in FIG. 2B2. Therefore, electric charges accumulated in the capacitor 56, the capacitor 57, and the like are reset. Thus, the period 61 can be referred to as a reset period.

In the period 62, the potentials of the wiring 41 and the wiring 44 (terminal RS) is set to a low potential. Thus, the transistor 51 and the transistor 54 are turned off. When the photodetector 50 is irradiated with light in this state, electric charges corresponding to the illuminance of the light are accumulated in the capacitor 57. Thus, the period 62 can be referred to as an exposure period.

In the period 63, the potential of the wiring 41 is set to a high potential. Thus, the transistor 51 is turned on, whereby the electric charges accumulated in the capacitor 57 are transferred to the node FD. Accordingly, the potential of the node FD is increased. Therefore, the period 63 can be referred to as a transfer period.

In the period 64, the potential of the wiring 41 is set to a low potential. Accordingly, the transistor 51 is turned off, whereby a transfer of electric charges from the capacitor 57 to the node FD is finished.

The above is the operation example of the period T1. In the period T1, the imaging data is written to the pixel 31. Specifically, the potential of the node FD becomes a potential corresponding to the imaging data. Thus, the period T1 can be referred to as a writing period.

Next, an example of the operation in the period T2 is described. In the period 65, the potential of the wiring 43 (terminal SL) is set to a high potential. Accordingly, the transistor 53 is turned on, and the imaging data written to the pixel 31 is read out. Specifically, the potential of the wiring 45 becomes a potential corresponding to the potential of the node FD.

As described above, a high potential signal is supplied to the wiring 43 (terminal SL), whereby the imaging data written to the pixel 31 is read out. In other words, it can be said that the signal supplied to the wiring 43 (terminal SL) has a function of selecting the pixel 31 from which the imaging data is read out. Thus, the signal supplied to the wiring 43 (terminal SL) can be referred to as a selection signal.

After the imaging data is read out, the potential of the wiring 44 (terminal RS) is set to a high potential. Thus, the transistor 54 is turned on, and the imaging data written to the pixel 31 is reset. Specifically, the potential of the node FD becomes a low potential that is the potential of the wiring 48. Here, since the transistor 53 is in the on state, the potential of the wiring 45 is changed in accordance with the potential change of the node FD. Therefore, the CDS circuit 35 electrically connected to the wiring 45 can perform correlated double sampling.

As described above, a high potential signal is supplied to the wiring 44 (terminal RS), whereby the imaging data written to the pixel 31 is reset. Thus, a signal supplied to the wiring 44 (terminal RS) can be referred to as a reset signal.

After correlated double sampling is performed, the potential of the wiring 44 (terminal RS) is set to a low potential, whereby the transistor 54 is turned off. After that, the potential of the wiring 43 (terminal SL) is set to a low potential, whereby the transistor 53 is turned off. Note that the potential of the wiring 44 and the potential of the wiring 43 may be a low potential at the same time.

The above is an operation example of the period T2. In the period T2, the imaging data written to the pixel 31 is read out. Specifically, the potential of the wiring 45 becomes a potential corresponding to the imaging data written to the pixel 31. Thus, the period T2 can be referred to as a reading period.

Imaging data is preferably written to the pixel 31[1,1] to the pixel **31[*m*,*n*]** with the global shutter mode. The global shutter mode refers to a method of writing imaging data in all the pixels at the same time. When imaging data is written with the global shutter mode, an image with few distortions can be easily obtained even though an object moves fast since simultaneousness of imaging is secured.

In contrast, imaging data is read out from the pixel 31[1,1] to the pixel **31[*m*,*n*] row by row, for example. Therefore, in the case of writing imaging data into the pixel 31 with the global shutter mode, there is the pixel 31 whose period from writing imaging data to reading the imaging data becomes long. Therefore, in the case of writing imaging data to the pixel 31 with the global shutter mode, it is preferable that electric charges transferred from the capacitor 57** to the node FD can be stored for a long time.

In order to store electric charges for a long time at the node FD, the transistor electrically connected to the node FD may be a transistor with a low off-state current. Examples of the transistor with a low off-state current include a transistor using a metal oxide for a channel formation region (hereinafter referred to as OS transistor). Thus, the transistor 51 and the transistor 54 are preferably OS transistors.

The channel formation region of an OS transistor preferably includes a metal oxide. The metal oxide used for the OS transistor is preferably an oxide that contains at least one of indium (In) and zinc (Zn).

Typical examples of such oxides include an In-M-Zn oxide, an In-M oxide, a Zn-M oxide, and an In—Zn oxide (the element M is one or more selected from aluminum (Al), gallium (Ga), yttrium (Y), tin (Sn), boron (B), silicon (Si), titanium (Ti), iron (Fe), nickel (Ni), germanium (Ge), zirconium (Zr), molybdenum (Mo), lanthanum (La), cerium (Ce), neodymium (Nd), vanadium (V), beryllium (Be), hafnium (Hf), tantalum (Ta), and tungsten (W), for example). Typical examples of the In-M-Zn oxide include an In—Ga—Zn oxide, an In—Sn—Zn oxide, and an In—Ga—Sn—Zn oxide.

The off-state current per channel width of 1 μm of an OS transistor can be as low as approximately 1 yA/μm (y: yocto, $10^{-24}$) to 1 zA/μm (z: zepto, $10^{-21}$).

A CAC (Cloud-Aligned Composite)-OS is preferably used for the OS transistor. Details of the CAC-OS will be described in an Embodiment to be described later.

As the transistor 51 to the transistor 54, a transistor other than the OS transistor can be used if having a low off-state current. For example, a transistor using a wide-bandgap semiconductor may be used. In some cases, the wide-bandgap semiconductor refers to a semiconductor with a bandgap of 2.2 eV or greater. Examples include silicon carbide, gallium nitride, and diamond.

Note that the transistor 51 and the transistor 54 may be transistors including silicon in their channel formation regions (hereinafter, Si transistors) or the like. A Si transistor has a higher off-state current than an OS transistor. However, by making the capacitance of the capacitor 56 large, for example, imaging data can be written to the pixel 31[1,1] to the pixel 31[m,n] with the global shutter mode even when the on-state current of the transistor 51 and the transistor 54 is high. Note that imaging data may be written to the pixel 31[1,1] to the pixel 31[m,n] with the rolling shutter mode. In that case, the capacitance of the capacitor 56 need not be increased even when the transistor 51 and the transistor 54 are transistors with a high off-state current.

The transistor 52 and the transistor 53 may be Si transistors or OS transistors. For example, when transistors including crystalline silicon (typically, low-temperature polysilicon, single crystal silicon, or the like) are used as the transistor 52 and the transistor 53, the on-state current of the transistor 52 and the transistor 53 can be increased. This enables high-speed reading of imaging data. In contrast, when all the transistors 51 to 54 are OS transistors, all the transistors included in the pixel 31 can be formed in the same layer. When all the transistors including the transistor 51 to the transistor 54 included in the semiconductor device 10 are OS transistors, all the transistors included in the semiconductor device 10 can be formed in the same layer. Therefore, the manufacturing process of the semiconductor device 10 can be simplified.

Configuration Example 1 of Gate Driver Circuit

Figure 3:
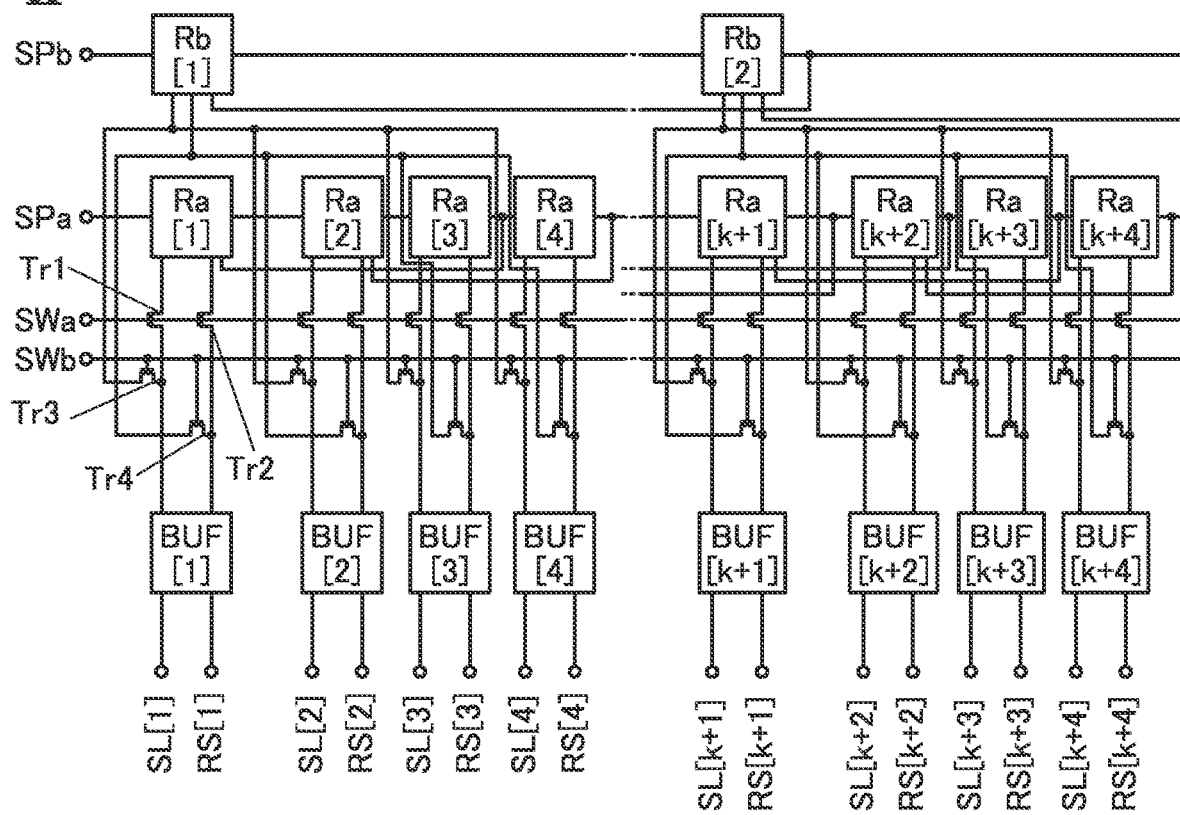
FIG. 3 is a block diagram illustrating a configuration example of an imaging device.

FIG. 3 is a diagram illustrating a configuration example of the gate driver circuit 33. Specifically, FIG. 3 is a diagram illustrating a configuration example of the shift register circuit included in the gate driver circuit 33. The shift register circuit includes a register circuit Ra, a register circuit Rb, a buffer circuit BUF, a transistor Tr1, a transistor Tr2, a transistor Tr3, and a transistor Tr4. Note that the transistor Tr1 to the transistor Tr4 may be either n-channel transistors or p-channel transistors. Furthermore, the other transistors described in this embodiment may be either n-channel transistors or p-channel transistors. Hereinafter, descriptions are made on the assumption that all the transistors described in this embodiment are n-channel transistors; however, the description below can be referred to even when a p-channel transistor is included by reversing the large-small relation between potentials as appropriate, for example.

Here, the numbers of register circuits Ra and buffer circuits BUF can be the same as the row number of the pixels 31, for example. That is, for example, m register circuits Ra and m buffer circuits BUF can be provided. The number of register circuits Rb is smaller than the number of register circuits Ra. For example, when the number of register circuits Ra is m, the number of register circuits Rb can be m/k (k is an integer more than or equal to 2 and less than or equal to m). That is, one register circuit Rb can be provided to the k register circuits Ra. Hereinafter, descriptions are made on the assumption that the shift register circuit included in the gate driver circuit 33 includes m register circuit(s) Ra, m/k register circuit(s) Rb, and m buffer circuit(s) BUF.

In this specification and the like, for example, m register circuits Ra are described as a register circuit Ra[1] to a register circuit Ra[m] to distinguish them. In addition, for example, m/k register circuits Rb are described as a register circuit Rb[1] to a register circuit Rb[m/k] to distinguish them. Furthermore, for example, m buffer circuits BUF are described as a buffer circuit BUF[1] to a buffer circuit BUF[m] to distinguish them. FIG. 3 illustrates the register circuit Ra[1] to a register circuit Ra[4] and a register circuit Ra[k+1] to a register circuit Ra[k+4] as the register circuits Ra. Additionally, the register circuit Rb[1] and a register circuit Rb[2] are illustrated as the register circuits Rb. Furthermore, the buffer circuit BUF[1] to a buffer circuit BUF[4] and a buffer circuit BUF[k+1] to a buffer circuit BUF[k+4] are illustrated as the buffer circuits BUF.

A terminal SPa is electrically connected to the register circuit Ra[1], and a terminal SPb is electrically connected to the register circuit Rb[1]. In addition, the register circuit Ra[1] to the register circuit Ra[m] are connected in series. Specifically, for example, the register circuit Ra[1] is electrically connected to a register circuit Ra[2], the register circuit Ra[2] is electrically connected to a register circuit Ra[3], and the register circuit Ra[3] is electrically connected to a register circuit Ra[4]. In addition, for example, the register circuit Ra[k+1] is electrically connected to a register circuit Ra[k+2], the register circuit Ra[k+2] is electrically connected to a register circuit Ra[k+3], and the register circuit Ra[k+3] is electrically connected to a register circuit Ra[k+4]. Additionally, the register circuit Rb[1] to the register circuit Rb[m/k] are connected in series. Specifically, for example, the register circuit Rb[1] is electrically connected to a register circuit Rb[2].

The register circuit Ra is electrically connected to the buffer circuit BUT through the transistor Tr1. The register circuit Ra is electrically connected to the buffer circuit BUT through the transistor Tr2. The register circuit Rb is electrically connected to the buffer circuit BUF through the transistor Tr3. The register circuit Rb is electrically connected to the buffer circuit BUF through the transistor Tr4.

Here, a configuration can be formed in which one register circuit Rb is electrically connected to a plurality of buffer circuits BUF through the transistor Tr3 and electrically connected to the plurality of buffer circuits BUF through the transistor Tr4. For example, one register circuit Rb is electrically connected to four buffer circuits BUF through the transistor Tr3 and electrically connected to four buffer circuits BUF through the transistor Tr4. For example, as illustrated in FIG. 3, the register circuit Rb[1] is electrically connected to the buffer circuit BUF[1] to the buffer circuit BUF[4] through the transistor Tr3 and electrically connected to the buffer circuit BUF[1] to the buffer circuit BUF[4] through the transistor Tr4. Furthermore, the register circuit Rb[2] is electrically connected to the buffer circuit BUF[k+1] to the buffer circuit BUF[k+4] through the transistor Tr3 and electrically connected to the buffer circuit BUF[k+1] to the buffer circuit BUF[k+4] through the transistor Tr4. Note that one register circuit Rb may be electrically connected to two or three buffer circuits BUF through the transistor Tr3 and may be electrically connected to two or three buffer circuits BUF through the transistor Tr4. Alternatively, one register circuit Rb may be electrically connected to five or more buffer circuits BUF through the transistor Tr3 and may be electrically connected to five or more buffer circuits BUF through the transistor Tr4. Specifically, a configuration can be formed in which one register circuit Rb is electrically connected to more than or equal to one and less than or equal to k buffer circuit(s) BUF through the transistor Tr3 and electrically connected to more than or equal to one and less than or equal to k buffer circuit(s) BUF through the transistor Tr4.

As described above, by electrically connecting one register circuit Rb to the plurality of buffer circuits BUF, imaging data can be read out from the pixels 31 in a plurality of rows at the same time. Thus, imaging data read out at the same time can be overlapped, and the potential of the wiring 45 which electrically connects the pixel 31 to the CDS circuit 35 can be increased. Thus, the imaging device 15 can be operated at a high frame frequency, and the imaging sensitivity of the imaging device 15 can be improved even when an exposure period per frame is short. Hereinafter, descriptions are made of the case where one register circuit Rb is electrically connected to four buffer circuits BUF through the transistor Tr3 and electrically connected to four buffer circuits BUF through the transistor Tr4.

A gate of the transistor Tr1 and a gate of the transistor Tr2 are electrically connected to a terminal SWa. A gate of the transistor Tr3 and a gate of the transistor Tr4 are electrically connected to a terminal SWb. The relation between a signal input to the terminal SWa and a signal input to the terminal SWb can be complementary. For example, when a high potential signal is input to the terminal SWa, a signal input to the terminal SWb can be a low potential signal. Alternatively, when a low potential signal is input to the terminal SWa, a signal input to the terminal SWb can be a high potential signal.

When a high potential signal is input to the terminal SWa, a signal output from the register circuit Ra is input to the buffer circuit BUF. For example, a signal output from the register circuit Ra[1] is input to the buffer circuit BUF[1]. In contrast, when a high potential signal is input to the terminal SWb, a signal output from the register circuit Rb is input to the buffer circuit BUF. For example, a signal output from the register circuit Rb[1] is input to the buffer circuit BUF[1] to the buffer circuit BUF[4].

To the buffer circuit BUF, the terminal SL and the terminal RS are electrically connected, and a signal input from the register circuit Ra or a signal input from the register circuit Rb is output from the terminal SL and the terminal RS.

A start pulse signal is input to the terminal SPa and the terminal SPb. In the case where a start pulse signal is input to the terminal SPa and a high potential signal is input to the terminal SWa, the register circuit Ra[1] to the register circuit Ra[m] sequentially output signals to the buffer circuit BUF[1] to the buffer circuit BUF[m]. That is, after the register circuit Ra[1] outputs a signal to the buffer circuit BUF[1], the register circuit Ra[2] outputs a signal to the buffer circuit BUF[2]. Then, signals are sequentially output until the register circuit Ra[m] outputs a signal to the buffer circuit BUF[m].

In the case where a start pulse signal is input to the terminal SPb and a high potential signal is input to the terminal SWb, the register circuit Rb[1] to the register circuit Rb[m/k] sequentially output signals to the buffer circuits BUF. That is, after the register circuit Rb[1] outputs signals to the buffer circuit BUF[1] to the buffer circuit BUF[4], the register circuit Rb[2] outputs signals to the buffer circuit BUF[+1] to the buffer circuit BUF[+4]. Then, signals are sequentially output until the register circuit Rb[m/k] outputs signals to the buffer circuit BUF[m-k+1] to the buffer circuit BUF[m-k+4].

As described above, the semiconductor device 10 can operate in the first mode and the second mode. Specifically, in the first mode, a high potential signal is input to the terminal SWa. Thus, the transistor Tr1 and the transistor Tr2 are turned on and signals corresponding to the signal output from the register circuit Ra are output from the terminal SL and the terminal RS. In addition, in the second mode, a high potential signal is input to the terminal SWb. Thus, the transistor Tr3 and the transistor Tr4 are turned on, and signals corresponding to the signal output from the register circuit Rb are output from the terminal SL and the terminal RS.

From the above, the register circuit Ra operates in the first mode and the register circuit Rb operates in the second mode. Thus, the register circuit Ra can be referred to as a register circuit for the first mode. Furthermore, the register circuit Rb can be referred to as a register circuit for the second mode.

As illustrated in FIG. 2A and FIG. 2B1, the terminal SL and the terminal RS are electrically connected to the pixels 31. Accordingly, in the first mode in which signals corresponding to the signal output from the register circuit Ra are output from the terminal SL and the terminal RS by the buffer circuit BUF, the imaging data can be read out from all the pixels 31, for example. Accordingly, imaging data read out from the pixels 31 can have high accuracy. Thus, as described above, for example, in the case where biometric recognition such as fingerprint recognition is performed as illustrated in FIG. 1B1, the semiconductor device 10 is preferably operated in the first mode to improve recognition accuracy.

In contrast, in the second mode in which signals corresponding to the signal output from the register circuit Rb are output from the terminal SL and the terminal RS by the buffer circuit BUF, the number of operating register circuits and the like can be less than that in the first mode. For example, the number of register circuits Rb can be one thirty-sixth of the number of register circuits Ra. That is, k can be 36. Thus, the gate driver circuit 33 can be operated at high speed, and the imaging device 15 can perform imaging at a high frame frequency. Thus, as described above, in the case where the position of a detection target such as the finger 27 is detected as illustrated in FIG. 1B2, the semiconductor device 10 is preferably operated in the second mode so that the movement of the detection target can be accurately detected.

Note that the number of rows of pixels 31 to which signals corresponding to the signals output from the register circuit Rb are supplied in the second mode can be less than or equal to the number of rows of pixels 31 to which signals corresponding to the signals output from the register circuit Ra are supplied in the first mode. Specifically, in the case where signals corresponding to the signals output from the register circuit Ra are supplied to the pixels 31 in m rows in the first mode, for example, signals corresponding to the signals output from the register circuit Rb can be supplied to the pixels 31 in more than or equal to m/k rows and less than or equal to the m rows in the second mode. For example, when the shift register circuit in the gate driver circuit 33 has the configuration illustrated in FIG. 3, signals corresponding to the signals output from the register circuit Ra can be supplied to the pixels 31 in m rows in the first mode. In contrast, in the second mode, signals corresponding to the signals output from the register circuit Rb can be supplied to the pixels 31 in 4m/k rows.

As described above, the semiconductor device 10 can perform accurate biometric recognition and can detect a detection target such as a finger accurately, for example.

Figure 4A:
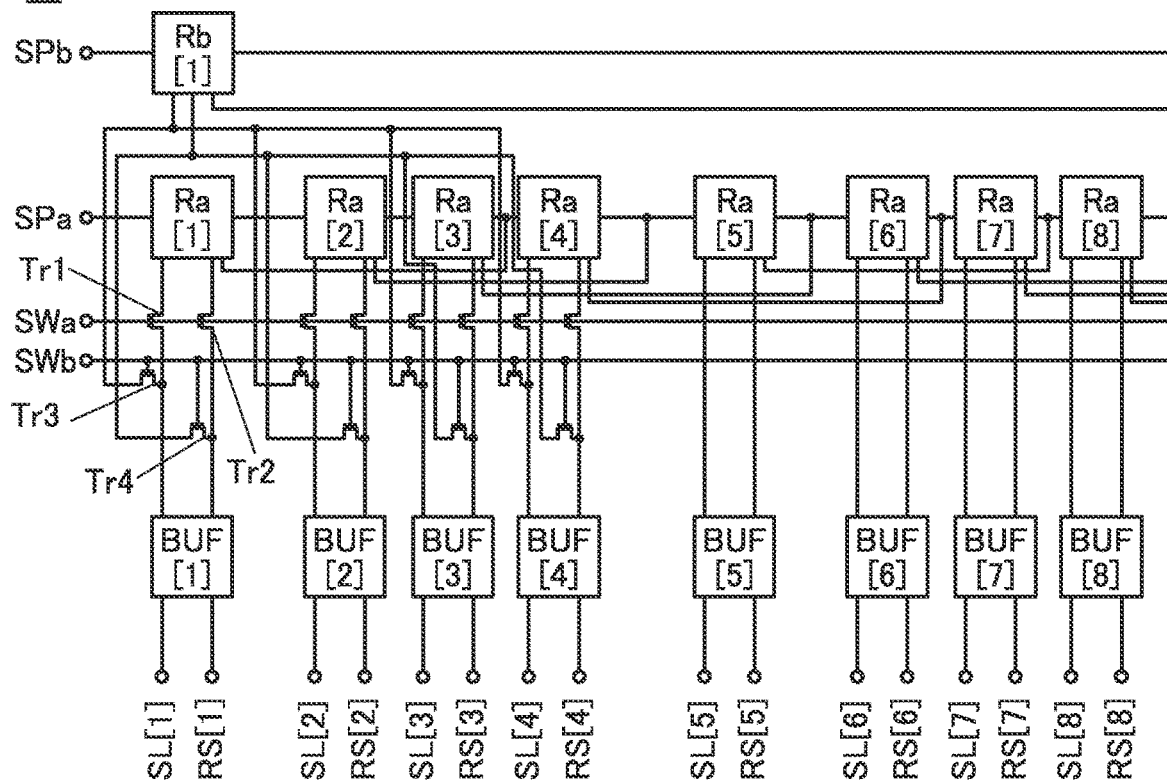
FIG. 4A and FIG. 4B are block diagrams illustrating configuration examples of imaging devices.
Figure 4B:
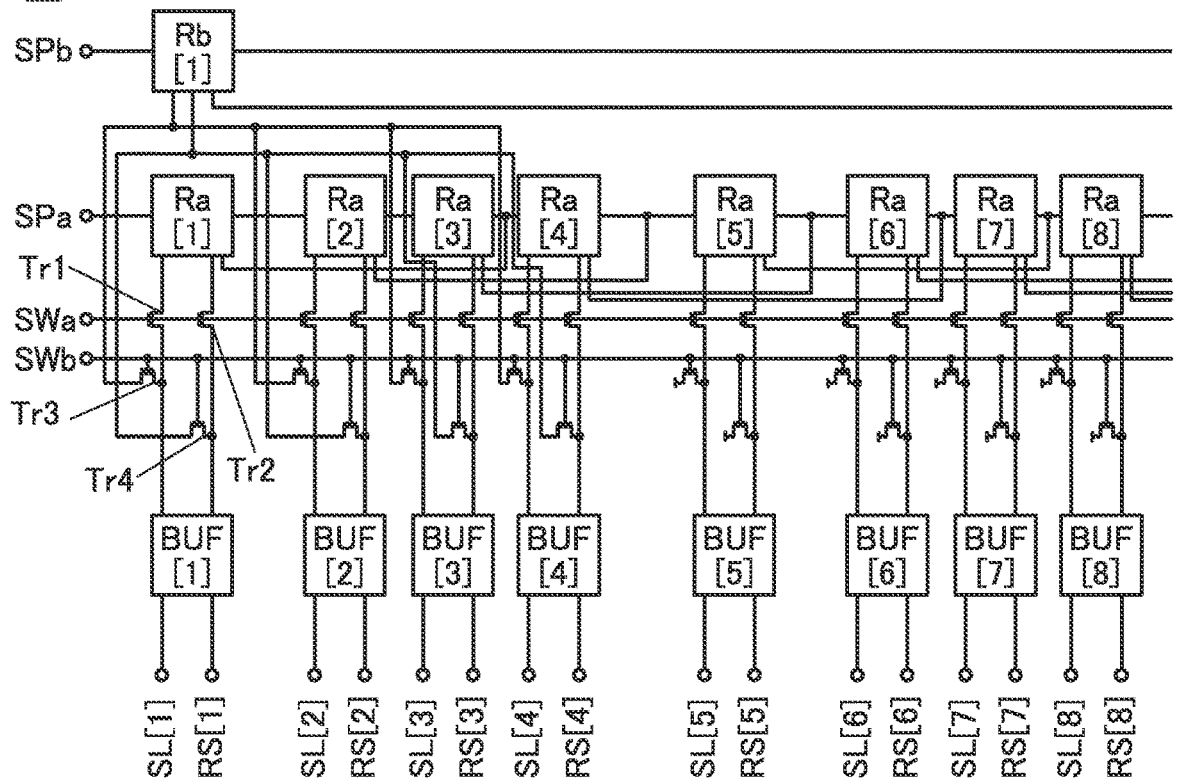

FIG. 4A and FIG. 4B are diagrams illustrating the register circuit Ra[1] to the register circuit Ra[8], the register circuit Rb[1], and the buffer circuit BUF[1] to the buffer circuit BUF[8] out of the circuits included in the gate driver circuit 33 illustrated in FIG. 3.

In the gate driver circuit 33 illustrated in FIG. 4A, a buffer circuit BUF[5] to the buffer circuit BUF[8] to which signals output from the register circuit Rb are not supplied are electrically connected to the register circuit Ra[5] to the register circuit Ra[8] respectively without through the transistor Tr1 and electrically connected to the register circuit Ra[5] to the register circuit Ra[8] respectively without through the transistor Tr2. The buffer circuit BUF[5] to the buffer circuit BUF[8] are not electrically connected to one of a source and a drain of the transistor Tr3 and one of a source and a drain of the transistor Tr4. In other words, the gate driver circuit 33 illustrated in FIG. 4A does not include the transistors Tr3 and the transistors Tr4 to the buffer circuit BUF[5] to the buffer circuit BUF[8] to which signals output from the register circuit Rb are not supplied.

In contrast, in the gate driver circuit 33 illustrated in FIG. 4B, the buffer circuit BUF[5] to the buffer circuit BUF[8] to which signals output from the register circuit Rb are not supplied are electrically connected to the register circuit Ra[5] to the register circuit Ra[8] respectively through the transistor Tr1 and electrically connected to the register circuit Ra[5] to the register circuit Ra[8] respectively through the transistors Tr2. The buffer circuit BUF[5] to the buffer circuit BUF[8] are electrically connected to one of the source and the drain of the transistor Tr3 and one of the source and the drain of the transistor Tr4. Here, a constant potential can be supplied to the other of the source and the drain of the transistor Tr3 whose source or drain is electrically connected to the buffer circuit BUF[5] to the buffer circuit BUF[8]. Furthermore, a constant potential can be supplied to the other of the source and the drain of the transistor Tr4 whose source or drain is electrically connected to the buffer circuit BUF[5] to the buffer circuit BUF[8]. For example, a low potential can be supplied to the other of the source and the drain of the transistor Tr3, and a high potential can be supplied to the other of the source and the drain of the transistor Tr4.

Figure 5:
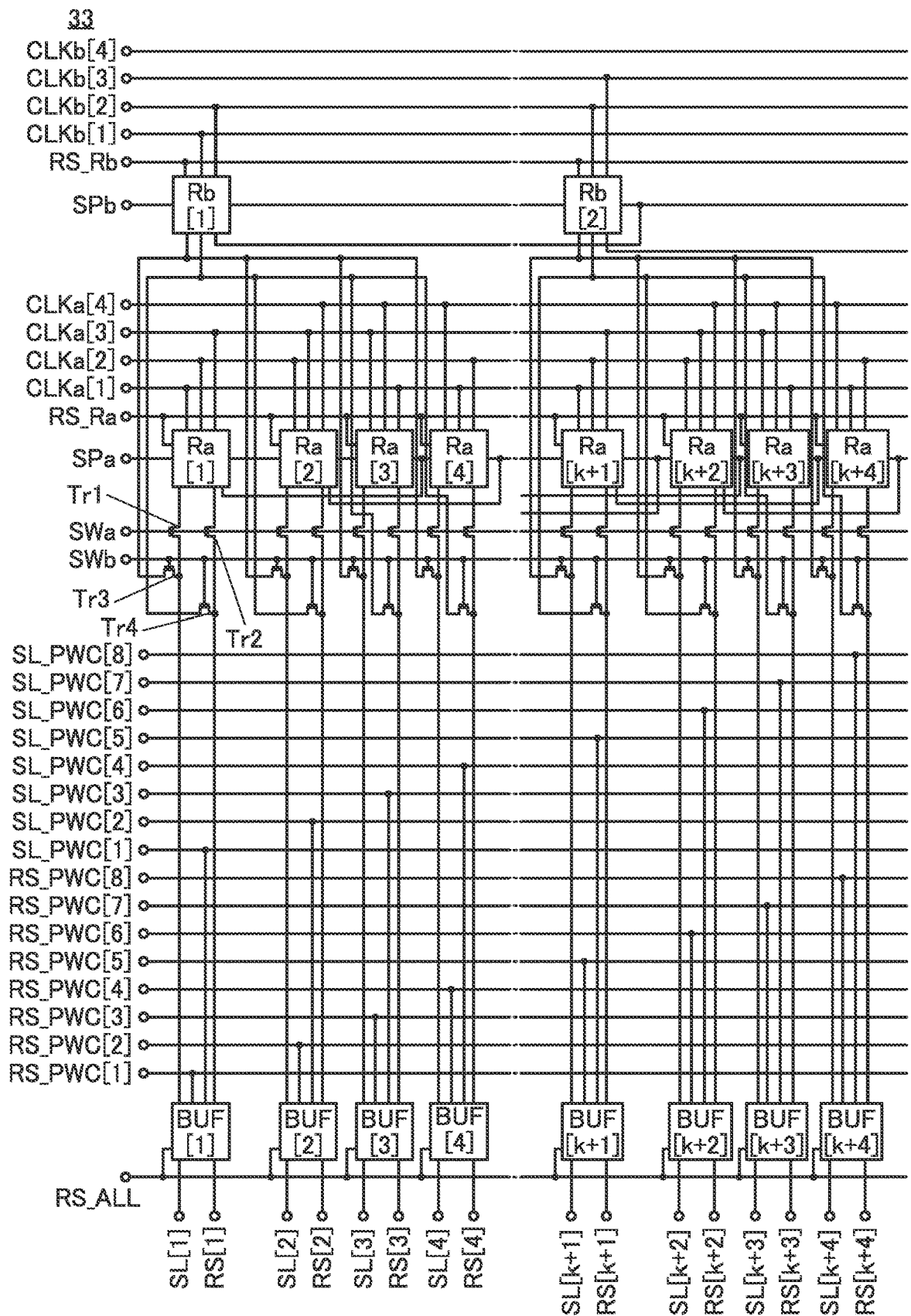
FIG. 5 is a block diagram illustrating a configuration example of an imaging device.

FIG. 5 is a specific configuration example of the shift register circuit illustrated in FIG. 3, which is obtained by adding terminals to the shift register circuit in FIG. 3. As illustrated in FIG. 5, a shift register circuit included in the gate driver circuit 33 includes a terminal CLKa, a terminal CLKb, a terminal RS_Ra, a terminal RS_Rb, a terminal SL_PWC, a terminal RS_PWC, and a terminal RS_ALL, in addition to the terminals illustrated in FIG. 3. Although FIG. 5 illustrates a configuration in which a terminal CLKa[1] to a terminal CLKa[4] are provided as the terminals CLKa, a terminal CLKb[1] to a terminal CLKb[4] are provided as the terminals CLKb, a terminal SL_PWC[1] to a terminal SL_PWC[8] are provided as the terminals SL_PWC, and a terminal RS_PWC[1] to a terminal RS_PWC[8] are provided as the terminals RS_PWC, the numbers of terminals CLKa, terminals CLKb, terminals SL_PWC, and RS_PWC are not limited to the numbers illustrated in FIG. 5.

The terminal CLKa and the terminal RS_Ra can be electrically connected to the register circuit Ra. The terminal CLKb and the terminal RS_Rb can be electrically connected to the register circuit Rb. The terminal SL_PWC, the terminal RS_PWC, and the terminal RS_ALL can be electrically connected to the buffer circuit BUF.

In the configuration illustrated in FIG. 5, three terminals CLKa can be electrically connected to one register circuit Ra. For example, the register circuit Ra[1] and the register circuit Ra[k+1] can be electrically connected to the terminal CLKa[1], the terminal CLKa[2], and the terminal CLKa[3]. Furthermore, the register circuit Ra[2] and the register circuit Ra[k+2] can be electrically connected to the terminal CLKa[2], the terminal CLKa[3], and the terminal CLKa[4]. Furthermore, the register circuit Ra[3] and the register circuit Ra[k+3] can be electrically connected to the terminal CLKa[3], the terminal CLKa[4], and the terminal CLKa[1]. Furthermore, the register circuit Ra[4] and the register circuit Ra[k+4] can be electrically connected to the terminal CLKa[4], the terminal CLKa[1], and the terminal CLKa[2].

In the configuration illustrated in FIG. 5, two terminals CLKb can be electrically connected to one register circuit Rb. For example, the register circuit Rb[1] can be electrically connected to the terminal CLKb[1] and a terminal CLKb[2]. Furthermore, the register circuit Rb[2] can be electrically connected to the terminal CLKb[2] and a terminal CLKb[3]. Although not illustrated in FIG. 5, the register circuit Rb[3] can be electrically connected to the terminal CLKb[3] and a terminal CLKb[4].

In the configuration illustrated in FIG. 5, one terminal SL_PWC and one terminal RS_PWC can be electrically connected to one buffer circuit BUF. For example, the buffer circuit BUF[1] can be electrically connected to the terminal SL_PWC[1] and the terminal RS_PWC[1]. Furthermore, the buffer circuit BUF[2] can be electrically connected to a terminal SL_PWC[2] and a terminal RS_PWC[2]. Furthermore, the buffer circuit BUF[3] can be electrically connected to a terminal SL_PWC[3] and a terminal RS_PWC[3]. Furthermore, the buffer circuit BUF[4] can be electrically connected to a terminal SL_PWC[4] and a terminal RS_PWC[4]. Furthermore, the buffer circuit BUF[k+1] can be electrically connected to a terminal SL_PWC[5] and a terminal RS_PWC[5]. Furthermore, the buffer circuit BUF[k+2] can be electrically connected to a terminal SL_PWC[6] and a terminal RS_PWC[6]. Furthermore, the buffer circuit BUF[k+3] can be electrically connected to a terminal SL_PWC[7] and a terminal RS_PWC[7]. Furthermore, the buffer circuit BUF[k+4] can be electrically connected to a terminal SL_PWC[8] and a terminal RS_PWC[8].

Figure 6A:
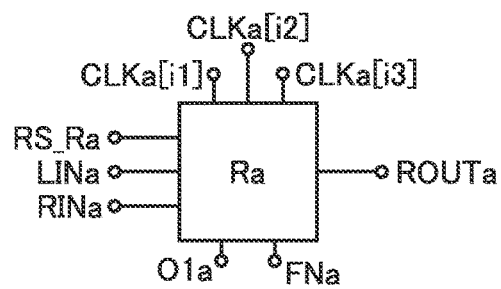
FIG. 6A and FIG. 6B are block diagrams illustrating configuration examples of an imaging device.

FIG. 6A is a diagram illustrating an example of a terminal electrically connected to the register circuit Ra. A terminal LINa, a terminal RINa, a terminal ROUTa, a terminal O1a, and a terminal FNa are electrically connected to the register circuit Ra in addition to a terminal CLKa[i1], a terminal CLKa[i2], a terminal CLKa[i3], and the terminal RS_Ra.

Here, the terminal CLKa[i1], the terminal CLKa[i2], and the terminal CLKa[i3] can be any of the terminal CLKa[1] to the terminal CLKa[4]. For example, in the register circuit Ra[1], the terminal CLKa[i1] can be the terminal CLKa[1], the terminal CLKa[i2] can be the terminal CLKa[2], and the terminal CLKa[i3] can be the terminal CLKa[3]. Furthermore, in the register circuit Ra[2], the terminal CLKa[i1] can be the terminal CLKa[2], the terminal CLKa[i2] can be the terminal CLKa[3], and the terminal CLKa[i3] can be the terminal CLKa[4]. Furthermore, in the register circuit Ra[3], the terminal CLKa[i1] can be the terminal CLKa[3], the terminal CLKa[i2] can be the terminal CLKa[4], and the terminal CLKa[i3] can be the terminal CLKa[1]. Furthermore, in the register circuit Ra[4], the terminal CLKa[i1] can be the terminal CLKa[4], the terminal CLKa[i2] can be the terminal CLKa[1], and the terminal CLKa[i3] can be the terminal CLKa[2].

Although described later in detail, signals are input to the register circuit Ra through the terminal RS_Ra, the terminal LINa and the terminal RINa, and signals are output from the register circuit Ra to the terminal ROUTa, the terminal O1a, and the terminal FNa. Thus, the terminal RS_Ra, the terminal LINa, and the terminal RINa can be referred to as input terminals, and the terminal ROUTa, the terminal O1a, and the terminal FNa can be referred to as output terminals. Furthermore, a clock signal is input to the terminal CLKa. Thus, the terminal CLKa can be referred to as a clock signal input terminal.

Figure 6B:
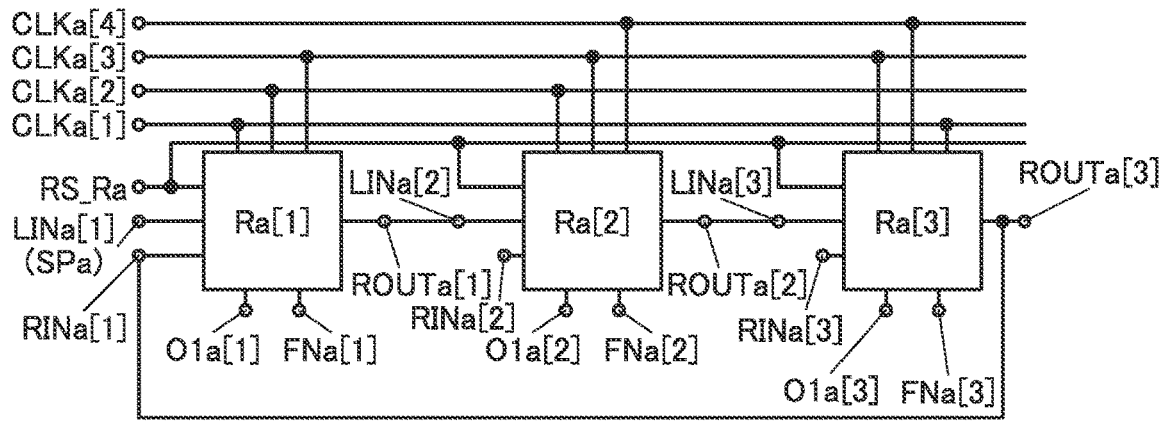

FIG. 6B is a diagram illustrating a configuration example of the register circuit Ra[1] to the register circuit Ra[3]. Here, in FIG. 6B and the like, for example, the terminal LINa, the terminal RINa, the terminal ROUTa, the terminal O1a, and the terminal FNa electrically connected to the register circuit Ra[1] are described as a terminal LINa[1], a terminal RINa[1], a terminal ROUTa[1], a terminal O1a[1], and a terminal FNa[1], respectively. Furthermore, for example, the terminal LINa, the terminal RINa, the terminal ROUTa, the terminal O1a, and the terminal FNa electrically connected to the register circuit Ra[2] are described as a terminal LINa[2], a terminal RINa[2], a terminal ROUTa[2], a terminal O1a[2], and a terminal FNa[2], respectively. Furthermore, for example, the terminal LINa, the terminal RINa, the terminal ROUTa, the terminal O1a, and the terminal FNa electrically connected to the register circuit Ra[3] are described as a terminal LINa[3], a terminal RINa[3], a terminal ROUTa[3], a terminal O1a[3], and a terminal FNa[3], respectively.

A start pulse signal is input to the terminal LINa[1]. Thus, the terminal LINa[1] can be regarded as the terminal SPa. When the start pulse signal is input to the terminal LINa[1], the register circuit Ra[1] can output signals to the terminal ROUTa[1], the terminal O1a[1], and the terminal FNa[1].

The terminal ROUTa[1] is electrically connected to the terminal LINa[2]. Accordingly, a signal output from the terminal ROUTa[1] of the register circuit Ra[1] is input to the register circuit Ra[2] through the terminal LINa[2]. When a signal is input to the terminal LINa[2], the register circuit Ra[2] can output signals to the terminal ROUTa[2], the terminal O1a[2], and the terminal FNa[2].

The terminal ROUTa[2] is electrically connected to the terminal LINa[3]. Accordingly, a signal output from the terminal ROUTa[2] of the register circuit Ra[2] is input to the register circuit Ra[3] through the terminal LINa[3]. When a signal is input to the terminal LINa[3], the register circuit Ra[3] can output signals to the terminal ROUTa[3], the terminal O1a[3], and the terminal FNa[3].

As described above, the register circuits Ra are connected to each other in series through the terminals ROUTa and the terminal LINa.

The terminal ROUTa[3] is electrically connected to the terminal RINa[1]. Accordingly, a signal output from the terminal ROUTa[3] of the register circuit Ra[3] is input to the register circuit Ra[1] through the terminal RINa[1]. That is, a signal output from the second subsequent register circuit Ra can be input to the terminal RINa. Although not illustrated in FIG. 6B, the terminal RINa[2] can be electrically connected to a terminal ROUTa[4] which is electrically connected to the register circuit Ra[4]. Furthermore, the terminal RINa[3] can be electrically connected to a terminal ROUTa[5] which is electrically connected to the register circuit Ra[5].

Figure 6C:
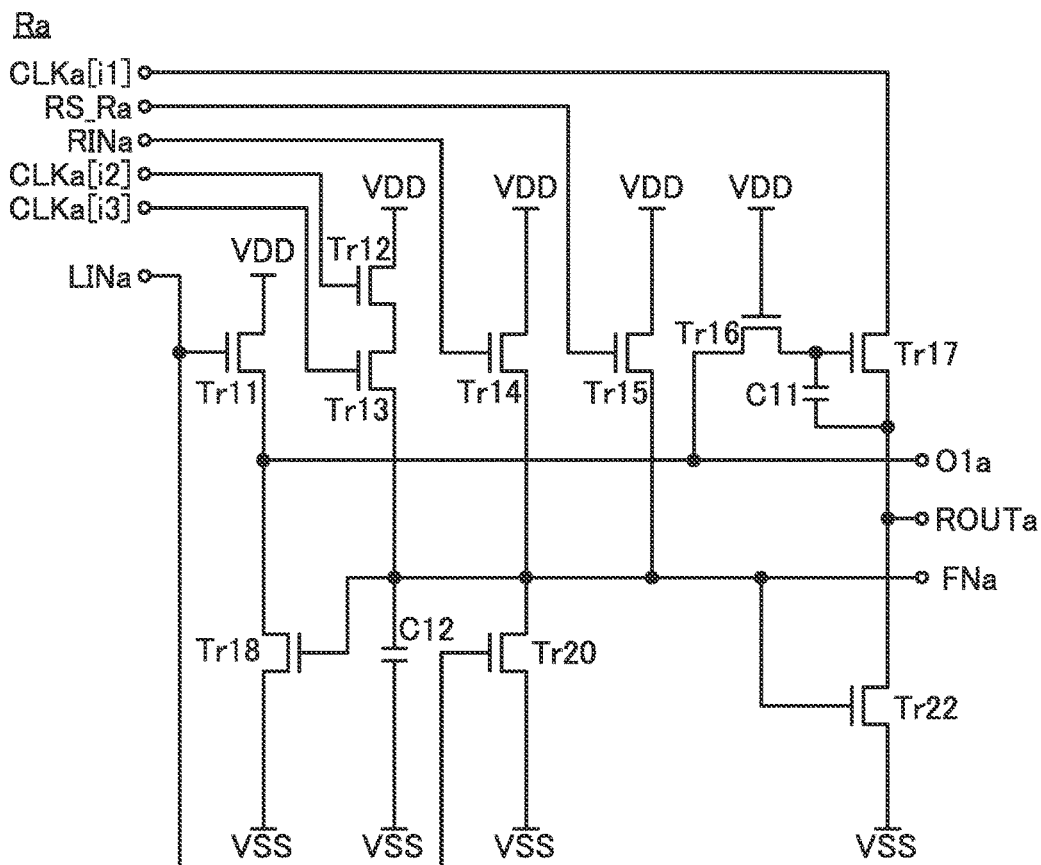
FIG. 6C is a circuit diagram showing a configuration example of an imaging device.

FIG. 6C is a circuit diagram illustrating a configuration example of the register circuit Ra. The register circuit Ra includes a transistor Tr11, a transistor Tr12, a transistor Tr13, a transistor Tr14, a transistor Tr15, a transistor Tr16, a transistor Tr17, a transistor Tr18, a transistor Tr20, a transistor Tr22, a capacitor C11, and a capacitor C12.

In this specification and the like, a potential VDD refers to a high potential and a potential VSS refers to a low potential.

The terminal CLKa[i1] is electrically connected to one of a source and a drain of the transistor Tr17. The terminal CLKa[i2] is electrically connected to a gate of the transistor Tr12. The terminal CLKa[i3] is electrically connected to a gate of the transistor Tr13. The terminal Rs_Ra is electrically connected to a gate of the transistor Tr15. The terminal LINa is electrically connected to a gate of the transistor Tr11 and a gate of the transistor Tr20. The terminal RINa is electrically connected to a gate of the transistor Tr14. The terminal ROUTa is electrically connected to the other of the source and the drain of the transistor Tr17, one electrode of the capacitor C11, and one of a source and a drain of the transistor Tr22. The terminal O1a is electrically connected to one of a source and a drain of the transistor Tr11, one of a source and a drain of the transistor Tr16, and one of a source and a drain of the transistor Tr18. The terminal FNa is electrically connected to one of a source and a drain of the transistor Tr13, one of a source and a drain of the transistor Tr14, one of a source and a drain of the transistor Tr15, a gate of the transistor Tr18, one of a source and a drain of the transistor Tr20, a gate of the transistor Tr22, and one electrode of the capacitor C12.

One of the source and the drain of the transistor Tr12 is electrically connected to the other of the source and the drain of the transistor Tr13. The other of the source and the drain of the transistor Tr16 is electrically connected to a gate of the transistor Tr17. The gate of the transistor Tr17 is electrically connected to the other electrode of the capacitor C11.

The potential VDD can be supplied to the other of the source and the drain of the transistor Tr11, the other of the source and the drain of the transistor Tr12, the other of the source and the drain of the transistor Tr14, the other of the source and the drain of the transistor Tr15, and a gate of the transistor Tr16. Furthermore, the potential VSS can be supplied to the other of the source and the drain of the transistor Tr18, the other of the source and the drain of the transistor Tr20, the other of the source and the drain of the transistor Tr22, and the other electrode of the capacitor C12.

When a high potential signal is input to the terminal LINa, the transistor Tr11 and the transistor Tr20 are turned on. Thus, the potential of the terminal O1a becomes a high potential, and the potential of the terminal FNa becomes a low potential. Furthermore, the transistor Tr11 is turned on, so that the potential of the gate of the transistor Tr17 becomes a high potential, whereby the transistor Tr17 is turned on. Thus, the potential of the terminal ROUTa is equal to the potential of the terminal CLKa[i1]. In other words, a signal input from the terminal CLKa[i1] can be output from the terminal ROUTa.

When a high potential signal is input to the terminal CLKa[i2] and the terminal CLKa[i3], the transistor Tr12 and the transistor Tr13 are turned on. Thus, the potential of the terminal FNa becomes a high potential. In addition, when the potential of the terminal FNa becomes a high potential, the transistor Tr18 is turned on. Thus, the potential of the terminal O1a becomes a low potential. Moreover, when the potential of the terminal FNa becomes a high potential, the transistor Tr22 is turned on. Thus, the potential of the terminal ROUTa becomes a low potential. Furthermore, even in the case where a high potential signal is input to the terminal RINa or a high potential signal is input to the terminal RS_Ra, the potential of the terminal FNa becomes a high potential. Thus, as described above, the potential of the terminal O1a and the potential of the terminal ROUTa become a low potential.

Figure 7A:
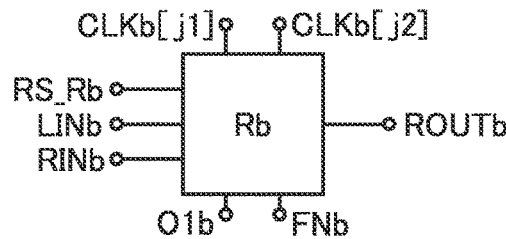
FIG. 7A and FIG. 7B are block diagrams illustrating configuration examples of an imaging device.

FIG. 7A is a diagram illustrating an example of a terminal electrically connected to the register circuit Rb. A terminal LINb, a terminal RINb, a terminal ROUTb, a terminal O1b, and a terminal FNb are electrically connected to the register circuit Rb in addition to a terminal CLKb[j1], a terminal CLKb[j2], and the terminal RS_Rb. Here, the terminal CLKb[j1], and the terminal CLKb[j2] can be any of the terminal CLKb[1] to the terminal CLKb[4]. For example, in the register circuit Rb[1], the terminal CLKb[i1] can be the terminal CLKb[1] and the terminal CLKb[i2] can be the terminal CLKb[2]. Furthermore, in the register circuit Rb[2], the terminal CLKb[i1] can be the terminal CLKb[2] and the terminal CLKb[i2] can be the terminal CLKb[3].

Although described later in detail, signals are input to the register circuit Rb through the terminal RS_Rb, the terminal LINb, and the terminal RINb, and signals are output from the register circuit Rb to the terminal ROUTb, the terminal O1b, and the terminal FNb. Thus, the terminal RS_Rb, the terminal LINb, and the terminal RINb can be referred to as input terminals, and the terminal ROUTb, the terminal O1b, and the terminal FNb can be referred to as output terminals. Furthermore, a clock signal is input to the terminal CLKb. Thus, the terminal CLKb can be referred to as a clock signal input terminal.

Figure 7B:
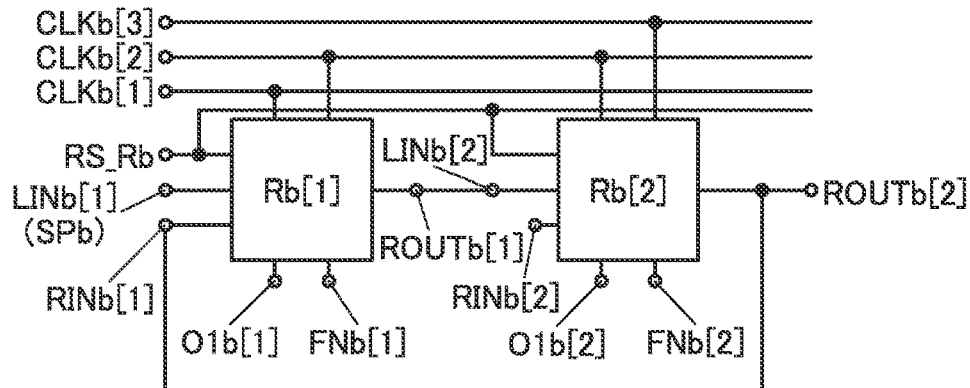

FIG. 7B is a diagram illustrating a configuration example of the register circuit Rb[1] and the register circuit Rb[2]. Here, in FIG. 7B and the like, for example, the terminal LINb, the terminal RINb, the terminal ROUTb, the terminal O1b, and the terminal FNb electrically connected to the register circuit Rb[1] are described as a terminal LINb[1], a terminal RINb[1], a terminal ROUTb[1], a terminal O1b[1], and a terminal FNb[1], respectively. Furthermore, for example, the terminal LINb, the terminal RINb, the terminal ROUTb, the terminal O1b, and the terminal FNb electrically connected to the register circuit Rb[2] are described as a terminal LINb[2], a terminal RINb[2], a terminal ROUTb [2], a terminal O1b[2], and a terminal FNb[2], respectively.

A start pulse signal is input to the terminal LINb[1]. Thus, the terminal LINb[1] can be regarded as the terminal SPb. When the start pulse signal is input to the terminal LINb[1], the register circuit Rb[1] can output signals to the terminal ROUTb[1], the terminal O1b[1], and the terminal FNb[1].

The terminal ROUTb[1] is electrically connected to the terminal LINb[2]. Accordingly, a signal output from the terminal ROUTb[1] of the register circuit Rb[1] is input to the register circuit Rb[2] through the terminal LINb[2]. When a signal is input to the terminal LINb[2], the register circuit Rb[2] can output signals to the terminal ROUTb[2], the terminal O1b[2], and the terminal FNb[2].

As described above, the register circuits Rb are connected to each other in series through the terminals ROUTb and the terminal LINb.

The terminal ROUTb[2] is electrically connected to the terminal RINb[1]. Accordingly, a signal output from the terminal ROUTb[2] of the register circuit Rb[2] is input to the register circuit Rb[1] through the terminal RINb[1]. That is, a signal output from the first subsequent register circuit Rb can be input to the terminal RINb. Although not illustrated in FIG. 7B, the terminal RINb[2] can be electrically connected to the terminal ROUTb[3] which is electrically connected to the register circuit Rb[3].

Figure 7C:
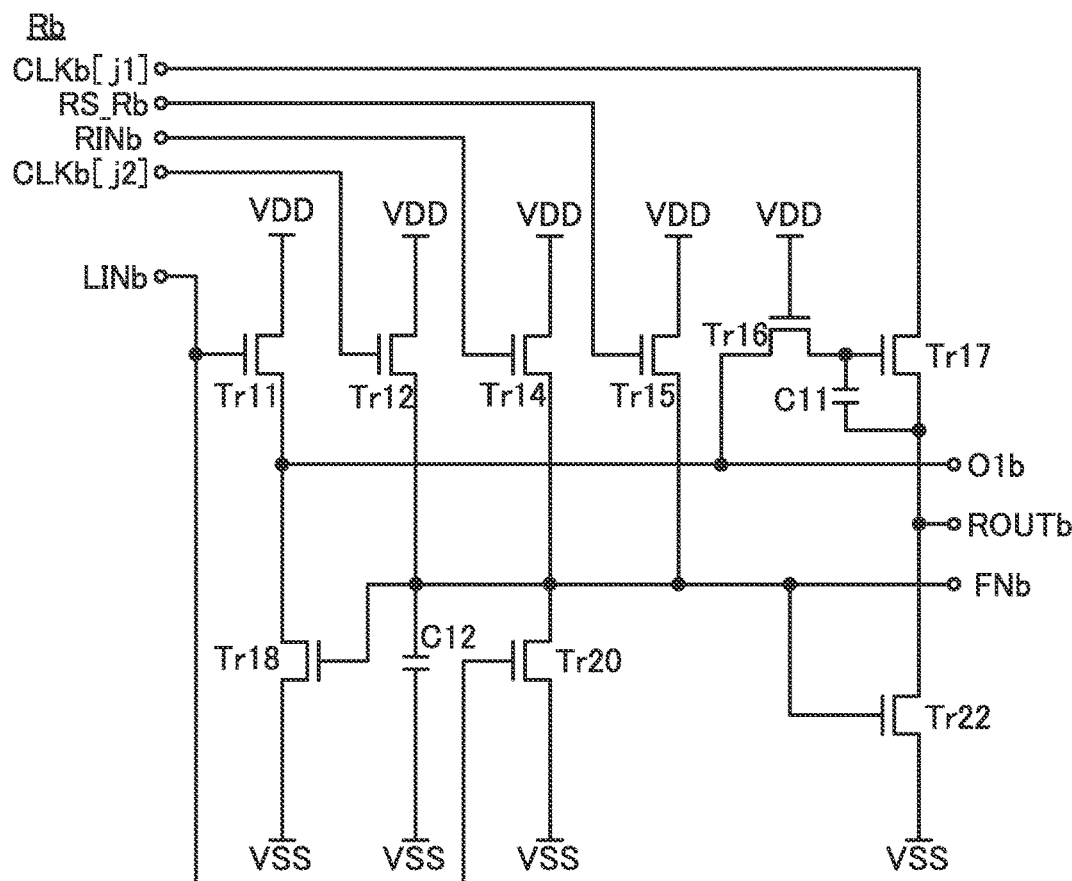
FIG. 7C is a circuit diagram illustrating a configuration example of an imaging device.

FIG. 7C is a circuit diagram illustrating a configuration example of the register circuit Rb. The configuration of the register circuit Rb illustrated in FIG. 7C is different from the configuration illustrated in FIG. 6C in that the transistor Tr13 is not provided. Moreover, the configuration is different from the configuration illustrated in FIG. 6C in that the terminal CLKb[j1], the terminal CLKb[j2], the terminal RS_Rb, the terminal LINb, the terminal RINb, the terminal ROUTb, the terminal O1b, and the terminal FNb are electrically connected instead of the terminal CLKa[i1], the terminal CLKa[i2], the terminal RS_Ra, the terminal LINa, the terminal RINa, the terminal ROUTa, the terminal O1a, and the terminal FNa. Since the transistor Tr13 is not provided, one of the source and the drain of the transistor Tr12 is electrically connected to the terminal FNb.

Note that the register circuit Ra may have any configuration illustrated in FIG. 7A to FIG. 7C, and the register circuit Rb may have any configuration illustrated in FIG. 6A to FIG. 6C.

Figure 8A:
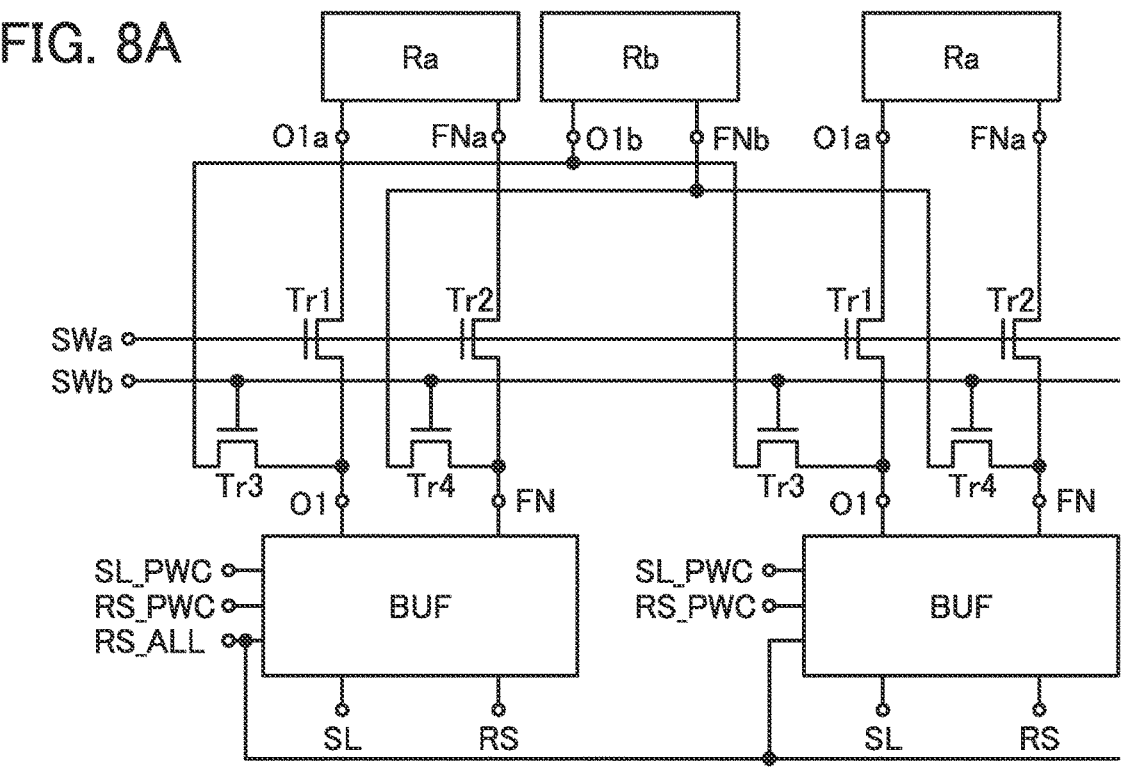
FIG. 8A is a block diagram illustrating a configuration example of an imaging device.

FIG. 8A is a diagram illustrating an example of terminals electrically connected to the buffer circuit BUF. Note that in FIG. 8A, the register circuit Ra and the register circuit Rb and the transistor Tr1 to the transistor Tr4 are also illustrated. Moreover, FIG. 8A also illustrates terminals electrically connected to the transistor Tr1 to the transistor Tr4.

To the buffer circuit BUF, in addition to the terminal SL_PWC, the terminal RS_PWC, the terminal RS_ALL, the terminal SL, and the terminal RS, the terminal O1 and the terminal FN are electrically connected. Note that although described later in detail, signals are input to the buffer circuit BUF through the terminal O1, the terminal FN, the terminal SL_PWC, the terminal RS_PWC, and the terminal RS_ALL, and signals are output from the buffer circuit BUF to the terminal SL and the terminal RS. Thus, the terminal O1, the terminal FN, the terminal SL_PWC, the terminal RS_PWC, and the terminal RS_ALL can be referred to as input terminals, and the terminal SL and the terminal RS can be referred to as output terminals.

The terminal O1a that is an output terminal of the register circuit Ra is electrically connected to one of a source and a drain of the transistor Tr1, and the terminal FNa that is an output terminal of the register circuit Ra is electrically connected to one of a source and a drain of the transistor Tr2. In addition, the terminal O1b that is an output terminal of the register circuit Rb is electrically connected to one of the source and the drain of the transistor Tr3, and the terminal FNb that is an output terminal of the register circuit Rb is electrically connected to one of the source and the drain of the transistor Tr4. Furthermore, the terminal O1 that is an input terminal of the buffer circuit BUF is electrically connected to the other of the source and the drain of the transistor Tr3, and the terminal FN that is an input terminal of the buffer circuit BUF is electrically connected to the other of the source and the drain of the transistor Tr2 and the other of the source and the drain of the transistor Tr4.

As described above, the gate of the transistor Tr1 and the gate of the transistor Tr2 are electrically connected to the terminal SWa, and the gate of the transistor Tr3 and the gate of the transistor Tr4 are electrically connected to the terminal SWb. Thus, when a high potential signal is input to the terminal SWa, the transistor Tr1 and the transistor Tr2 are turned on. Accordingly, the signal output from the terminal O1a of the register circuit Ra is input to the buffer circuit BUF through the terminal O1. In addition, the signal output from the terminal FNa of the register circuit Ra is input to the buffer circuit BUF through the terminal FN. Meanwhile, when a high potential signal is input to the terminal SWb, the transistor Tr3 and the transistor Tr4 are turned on. Accordingly, the signal output from the terminal O1b of the register circuit Rb is input to the buffer circuit BUF through the terminal O1. In addition, the signal output from the terminal FNb of the register circuit Rb is input to the buffer circuit BUF through the terminal FN.

Figure 8B:
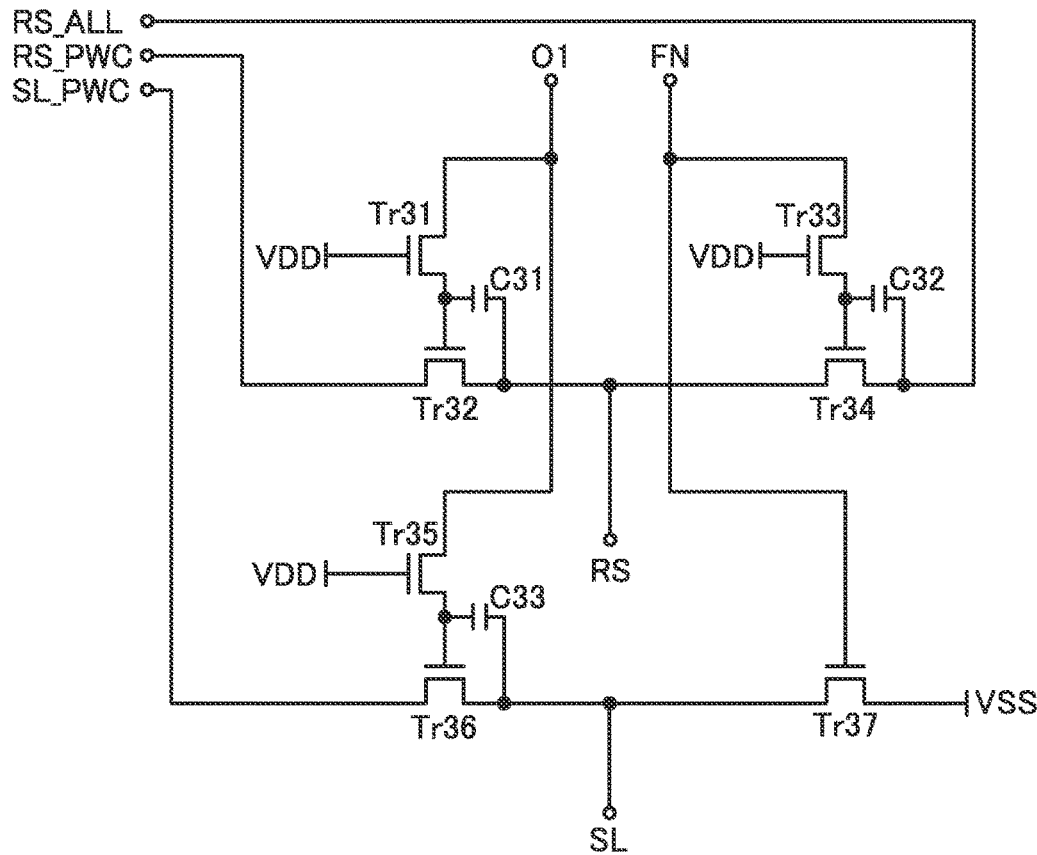
FIG. 8B is a circuit diagram illustrating a configuration example of an imaging device.

FIG. 8B is a circuit diagram illustrating a configuration example of the buffer circuit BUF. The buffer circuit BUF includes a transistor Tr31 to a transistor Tr37, a capacitor C31 to a capacitor C33.

The terminal O1 is electrically connected to one of a source and a drain of the transistor Tr31 and one of a source and a drain of the transistor Tr35. The terminal FN is electrically connected to one of a source and a drain of the transistor Tr33 and a gate of the transistor Tr37. A wiring SL_PWC is electrically connected to one of a source and a drain of the transistor Tr36. A wiring RS_PWC is electrically connected to one of a source and a drain of the transistor Tr32. A terminal RS_ALL is electrically connected to one of a source and a drain of the transistor Tr34 and one electrode of a capacitor C32. The terminal SL is electrically connected to the other of the source and the drain of the transistor Tr36, a source and a drain of the transistor Tr37, and one electrode of the capacitor C33. The terminal RS is electrically connected to the other of the source and the drain of the transistor Tr32, the source and the drain of the transistor Tr34, and one electrode of the capacitor C31.

The other of the source and the drain of the transistor Tr31 is electrically connected to a gate of the transistor Tr32. The gate of the transistor Tr32 is electrically connected to the other electrode of the capacitor C31. The other of the source and the drain of the transistor Tr33 is electrically connected to a gate of the transistor Tr34. The gate of the transistor Tr34 is electrically connected to the other electrode of the capacitor C32. The other of the source and the drain of the transistor Tr35 is electrically connected to a gate of the transistor Tr36. The gate of the transistor Tr36 is electrically connected to the other electrode of the capacitor C33.

The potential VDD can be supplied to a gate of the transistor Tr31, a gate of the transistor Tr33, and a gate of the transistor Tr35. Moreover, the potential VSS can be supplied to the other of the source and the drain of the transistor Tr37.

When a high potential signal is input to the terminal O1, the potential of the gate of the transistor Tr32 becomes a high potential, whereby the transistor Tr32 is turned on. Accordingly, a signal input from the terminal RS_PWC can be output from the terminal RS. Furthermore, when the potential of the gate of the transistor Tr36 becomes a high potential, the transistor Tr36 is turned on. Accordingly, a signal input from the terminal SL_PWC can be output from the terminal SL.

Meanwhile, when a high potential signal is input to the terminal FN, the potential of the gate of the transistor Tr34 becomes a high potential, whereby the transistor Tr34 is turned on. Accordingly, a signal input from the terminal RS_ALL can be output from the terminal RS. Furthermore, when the potential of the gate of the transistor Tr37 becomes a high potential, the transistor Tr37 is turned on. Accordingly, the potential of the terminal SL becomes a low potential. For example, a high potential signal is input to the terminal FN and the terminal RS_ALL in the period 61 illustrated in FIG. 2B2, whereby a high potential signal is output from the terminal RS. Thus, electric charges stored in the capacitor 56, the capacitor 57, and the like included in the pixel 31 illustrated in FIG. 2B1 can be reset. For example, when a high potential signal is input to the terminal RS_Ra or the terminal RS_Rb, a high potential signal can be input to the terminal FN. In this state, the reset operation can be performed by inputting a high potential signal to the terminal RS_ALL.

Example 1 of Operation Method

Figure 9:
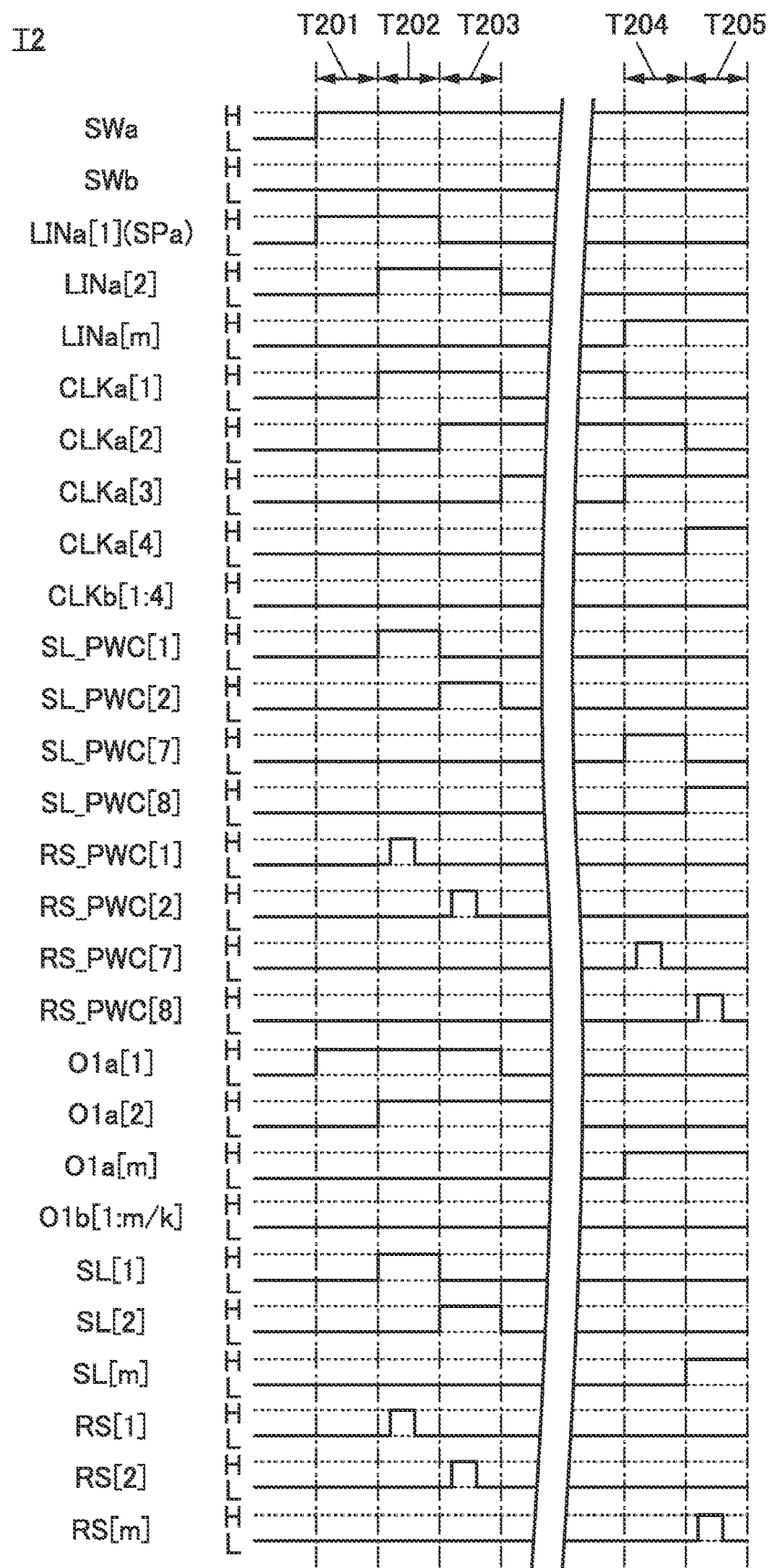
FIG. 9 is a timing chart illustrating an example of a method of operation of an imaging device.
Figure 10:
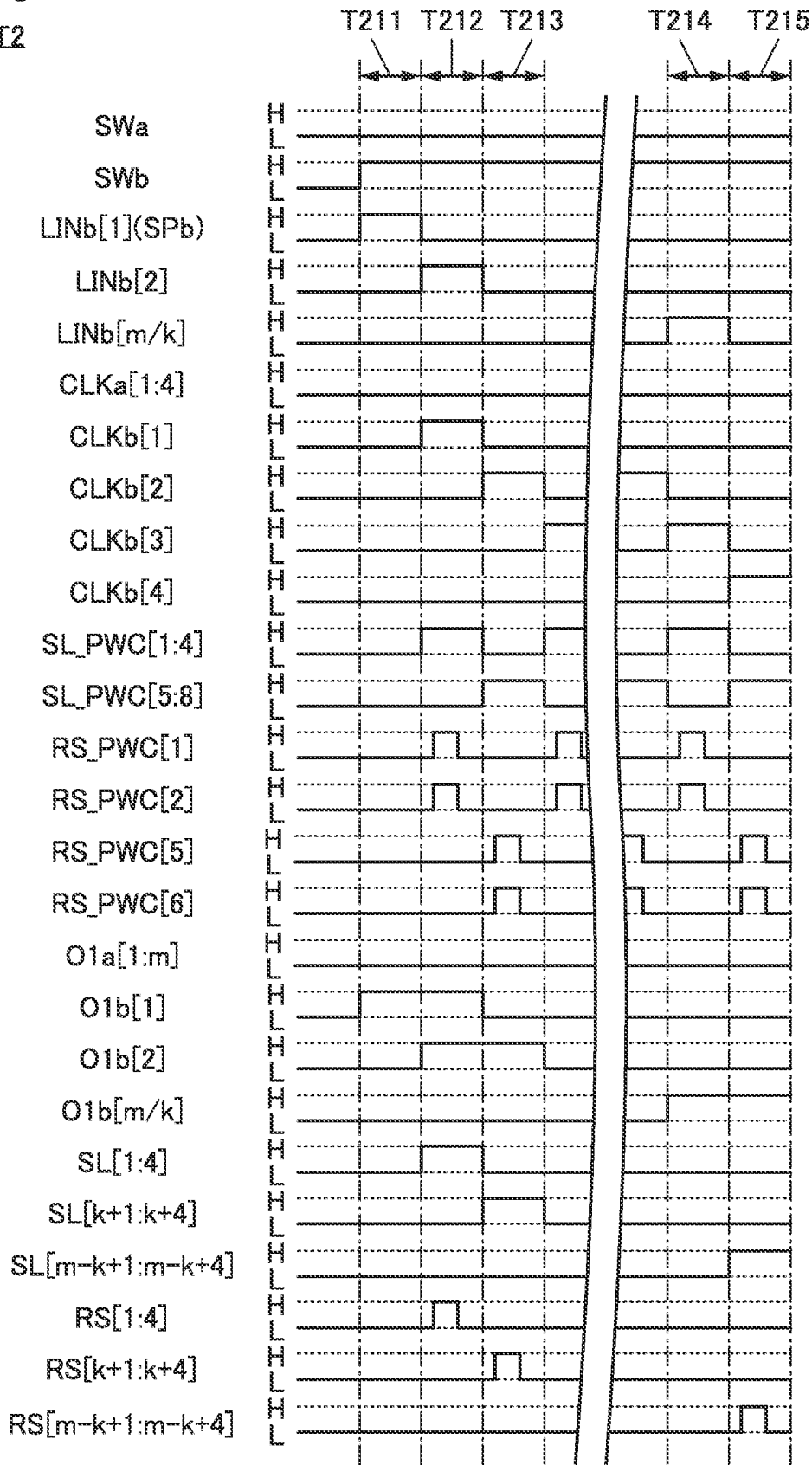
FIG. 10 is a timing chart illustrating an example of a method of operation of an imaging device.

FIG. 9 and FIG. 10 are timing charts illustrating operation method examples of the gate driver circuit 33 that is provided in the imaging device 15 included in the semiconductor device Specifically, operation method examples of the shift register circuit included in the gate driver circuit 33 in the reading period T2 which is illustrated in FIG. 2B2 are illustrated. FIG. 9 is an operation method example of the first mode, and FIG. 10 is an operation method example of the second mode. Note that in FIG. 9 and FIG. 10, an increase in a potential through bootstrap, a decrease in a potential through a leak current, and the like are not considered. The same applies to the other timing charts.

First, an operation method example of the register circuit included in the gate driver circuit 33 in the first mode is described. As illustrated in FIG. 9, in a period T201, the potential of a signal SWa is set to a high potential, and the potential of a signal SWb is set to a low potential. Thus, the semiconductor device 10 operates in the first mode. To the terminal LINa[1], a high potential signal is input as a start pulse signal. Accordingly, the transistor Tr11 included in the register circuit Ra[1] is turned on, and a high potential signal is output from the terminal O1a[1].

Clock signals are sequentially input to the terminal CLKa[1] to the terminal CLKa[4] from a period T202. Accordingly, the potentials of the terminal CLKa[1] become a high potential, and the potentials of the terminal CLKa[2] to the terminal CLKa[4] become a low potential in the period T202. In addition, the potentials of the terminal CLKa[1] and the terminal CLKa[2] become a high potential, and the potentials of the terminal CLKa[3] and the terminal CLKa[4] become a low potential in a period T203. In addition, the potentials of the terminal CLKa[2] and the terminal CLKa[3] become a high potential, and the potentials of the terminal CLKa[1] and the terminal CLKa[4] become a low potential in a period T204. In addition, the potential of the terminal CLKa[3] and the terminal CLKa[4] become a high potential, and the potential of the terminal CLKa[1] and the terminal CLKa[2] become a low potential in a period T205.

Note that in the period T201 to the period T205, clock signals are not input to all the clock terminals CLKb, for example. In other words, in the period T201 to the period T205, the potentials of all the clock terminals CLKb are a low potential. Here, for example, it can be said that the register circuit to which a clock signal is input is a register circuit in the on state, and the register circuit to which a clock signal is not input is a register circuit in the off state. Thus, in the first mode, it can be said that the register circuit Ra is in the on state, and the register circuit Rb is in the off state.

In addition, in the period T202, signals are input to the terminal SL_PWC[1] and the terminal RS_PWC[1]. Here, in the period T202, since a high potential signal is input to the terminal SWa, the transistor Tr1 is in the on state. Furthermore, since a high potential signal is input to the terminal LINa[1] as in the period T201, a high potential signal is output from the terminal O1a[1]. Thus, a high potential signal is input to the terminal O1[1] that is an input terminal of the buffer circuit BUF[1]. Consequently, the transistor Tr36 included in the buffer circuit BUF[1] is turned on, and a signal input to the terminal SL_PWC[1] is output from the terminal SL[1]. Furthermore, the transistor Tr32 included in the buffer circuit BUF[1] is turned on, and a signal input to the terminal RS_PWC[1] is output from the terminal RS[1]. Note that since the potential of the terminal O1a[1] is a high potential, the transistor Tr17 included in the register circuit Ra[1] is turned on, and a clock signal input to the terminal CLKa[1] is output from the terminal ROUTa[1]. As described above, since the potential of the terminal CLKa[1] in the period T202 is a high potential, a high potential signal is output from the terminal ROUTa[1]. Thus, a high potential signal is input to the terminal LINa[2] electrically connected to the terminal ROUTa[1].

In the period T203, signals are input to the terminal SL_PWC[2] and the terminal RS_PWC[2]. Here, in the period T203, since a high potential signal is input to the terminal SWa, the transistor Tr1 is in the on state. Furthermore, since a high potential signal is input to the terminal LINa[2] as in the period T202, a high potential signal is output from the terminal O1a[2]. Thus, a high potential signal is input to the terminal O1[2] that is an input terminal of the buffer circuit BUF[2]. Consequently, the transistor Tr36 included in the buffer circuit BUF[2] is turned on, and a signal input to the terminal SL_PWC[2] is output from the terminal SL [2]. Furthermore, the transistor Tr32 included in the buffer circuit BUF[2] is turned on, and a signal input to the terminal RS_PWC[2] is output from the terminal RS[2]. Note that since the potential of the terminal O1a[2] is a high potential, the transistor Tr17 included in the register circuit Ra[2] is turned on, and a clock signal input to the terminal CLKa[2] is output from the terminal ROUTa[2]. As described above, since the potential of the terminal CLKa[2] in the period T203 is a high potential, a high potential signal is output from the terminal ROUTa[2]. Thus, a high potential signal is input to the terminal LINa[3] electrically connected to the terminal ROUTa[2].

In the period T204, a high potential signal is input to a terminal LINa[m]. Accordingly, the transistor Tr11 included in the register circuit Ra[m] is turned on, and a high potential signal is output from a terminal O1a[m].

In the period T205, signals are input to the terminal SL_PWC[8] and the terminal RS_PWC[8]. Here, in the period T205, since a high potential signal is input to the terminal SWa, the transistor Tr1 is in the on state. Furthermore, since a high potential signal is input to the terminal LINa[m] as in the period T204, a high potential signal is output from the terminal O1a[m]. Thus, a high potential signal is input to a terminal O1[*m*] that is an input terminal of the buffer circuit BUF[m]. Consequently, the transistor Tr36 included in the buffer circuit BUF[m] is turned on, and a signal input to the terminal SL_PWC[8] is output from the terminal SL[m]. Furthermore, the transistor Tr32 included in the buffer circuit BUF[m] is turned on, and a signal input to the terminal RS_PWC[8] is output from the terminal RS[m]. Note that since the potential of the terminal O1a[m] is a high potential, the transistor Tr17 included in the register circuit Ra[m] is turned on, and a clock signal input to the terminal CLKa[4] is output from a terminal ROUTa[m]. As described above, since the potential of the terminal CLKa[4] in the period T205 is a high potential, a high potential signal is output from the terminal ROUTa[m].

As described above, in the operation method illustrated in FIG. 9, the start pulse signals input to the terminal LINa[1] in the period T201 are sequentially transmitted from the register circuit Ra[1] to the register circuit Ra[m] in the period T202 to the period T205. In response to that, it can be said that high potential selection signals are output from the terminal SL[1] to the terminal SL[m] sequentially, and high potential reset signals are output from the terminal RS[1] to the terminal RS[m] sequentially. Note that since the register circuit Rb[1] to the register circuit Rb[m/k] are in the off state, high potential signals are not output from the terminal O1b[1] to a terminal O1b[m/k].

Next, an operation method example of the register circuit included in the gate driver circuit 33 in the second mode is described. As illustrated in FIG. 10, in a period T211, the potential of the signal SWb is set to a high potential, and the potential of the signal SWa is set to a low potential. Thus, the semiconductor device 10 operates in the second mode. To the terminal LINb[1], a high potential signal is input as a start pulse signal. Accordingly, the transistor Tr11 included in the register circuit Rb[1] is turned on, and a high potential signal is output from the terminal O1b[1].

Clock signals are sequentially input to the terminal CLKb[1] to the terminal CLKb[4] from a period T212. Accordingly, the potential of the terminal CLKb[1] becomes a high potential, and the potentials of the terminal CLKb[2] to the terminal CLKb[4] become a low potential in a period T212. In addition, the potential of the terminal CLKb[2] becomes a high potential, and the potentials of the terminal CLKb[1], the terminal CLKb[3], and the terminal CLKb[4] become a low potential in a period T213. In addition, the potential of the terminal CLKb[3] becomes a high potential, and the potentials of the terminal CLKb[1], the terminal CLKb[2], and the terminal CLKb[4] become a low potential in a period T214. In addition, the potential of the terminal CLKb[4] becomes a high potential, and the potentials of the terminal CLKb[1], the terminal CLKb[2], and the terminal CLKb[3] become a low potential in a period T215.

Note that in the period T211 to the period T215, clock signals are not input to all the clock terminals CLKa, for example. In other words, in the period T211 to the period T215, the potentials of all the clock terminals CLKa are a low potential. Here, as described above, for example, it can be said that the register circuit to which a clock signal is input is a register circuit in the on state, and the register circuit to which a clock signal is not input is a register circuit in the off state. Thus, in the second mode, it can be said that the register circuit Rb is in the on state, and the register circuit Ra is in the off state.

In the period T212, signals are input to the terminal SL_PWC[1] to the terminal SL_PWC[4] and a terminal RS_PWC[1] to a terminal RS_PWC[4]. Here, in the period T212, a high potential signal is input to the terminal SWb, whereby the transistor Tr3 is in the on state. In addition, although the potential of the terminal LINb[1] is a low potential and the transistor Tr11 included in the register circuit Rb[1] is in the off state, the potential of the terminal O1b[1] is kept at a high potential since the terminal O1b[1] is in the floating state. Thus, high potential signals are input to the terminal O1[1] which is an input terminal of the buffer circuit BUF[1], the terminal O1[2] which is an input terminal of the buffer circuit BUF[2], a terminal O1[3] which is an input terminal of the buffer circuit BUF[3], and a terminal O1[4] which is an input terminal of the buffer circuit BUF[4]. Thus, the transistor Tr36 included in the buffer circuit BUF[1], the transistor Tr36 included in the buffer circuit BUF[2], the transistor Tr36 included in the buffer circuit BUF[3], and the transistor Tr36 included in the buffer circuit BUF[4] are turned on. Accordingly, a signal input to the terminal SL_PWC[1] is output from the terminal SL[1], a signal input to the terminal SL_PWC[2] is output from the terminal SL[2], a signal input to the terminal SL_PWC[3] is output from the terminal SL[3], and a signal input to the terminal SL_PWC[4] is output from the terminal SL[4]. Furthermore, the transistor Tr32 included in the buffer circuit BUF[1], the transistor Tr32 included in the buffer circuit BUF[2], the transistor Tr32 included in the buffer circuit BUF[3], and the transistor Tr32 included in the buffer circuit BUF[4] are turned on. Accordingly, a signal input to the terminal RS_PWC[1] is output from the terminal RS[1], a signal input to the terminal RS_PWC[2] is output from the terminal RS[2], a signal input to the terminal RS_PWC[3] is output from the terminal RS[3], and a signal input to the terminal RS_PWC[4] is output from the terminal RS[4]. Note that since the potential of the terminal O1b[1] is a high potential, the transistor Tr17 included in the register circuit Rb[1] is turned on, and a clock signal input to the terminal CLKb[1] is output from the terminal ROUTb[1]. As described above, since the potential of the terminal CLKb[1] in the period T212 is a high potential, a high potential signal is output from the terminal ROUTb[1]. Thus, a high potential signal is input to the terminal LINb[2] electrically connected to the terminal ROUTb[1].

In the period T213, signals are input to a terminal SL_PWC[5] to the terminal SL_PWC[8], and the terminal RS_PWC[5] to the terminal RS_PWC[8]. Here, in the period T213, since a high potential signal is input to the terminal SWb, the transistor Tr3 is in the on state. In addition, although the potential of the terminal LINb[2] is a low potential and the transistor Tr11 included in the register circuit Rb[2] is in the off state, the potential of the terminal O1b[2] is kept at a high potential since the terminal O1b[2] is in the floating state. Thus, high potential signals are input to a terminal O1[k+1] which is an input terminal of the buffer circuit BUF[k+1], a terminal O1[k+2] which is an input terminal of the buffer circuit BUF[k+2], a terminal O1[k+3] which is an input terminal of the buffer circuit BUF[k+3], and a terminal O1[k+4] which is an input terminal of the buffer circuit BUF[k+4]. Thus, the transistor Tr36 included in the buffer circuit BUF[k+1], the transistor Tr36 included in the buffer circuit BUF[k+2], the transistor Tr36 included in the buffer circuit BUF[k+3], and the transistor Tr36 included in the buffer circuit BUF[k+4] are turned on. Accordingly, a signal input to the terminal SL_PWC[5] is output from a terminal SL[k+1], a signal input to the terminal SL_PWC[6] is output from a terminal SL[k+2], a signal input to the terminal SL_PWC[7] is output from a terminal SL[k+3], and a signal input to the terminal SL_PWC[8] is output from a terminal SL[k+4]. Furthermore, the transistor Tr32 included in the buffer circuit BUF[k+1], the transistor Tr32 included in the buffer circuit BUF[k+2], the transistor Tr32 included in the buffer circuit BUF[k+3], and the transistor Tr32 included in the buffer circuit BUF[k+4] are turned on. Accordingly, a signal input to the terminal RS_PWC[5] is output from a terminal RS[k+1], a signal input to the terminal RS_PWC[6] is output from a terminal RS[k+2], a signal input to the terminal RS_PWC[7] is output from a terminal RS[k+3], and a signal input to the terminal RS_PWC[8] is output from a terminal RS[k+4]. Note that since the potential of the terminal O1b[2] is a high potential, the transistor Tr17 included in the register circuit Rb[2] is turned on, and a clock signal input to the terminal CLKb[2] is output from the terminal ROUTb[2]. As described above, since the potential of the terminal CLKb[2] in the period T213 is a high potential, a high potential signal is output from the terminal ROUTb[2]. Thus, a high potential signal is input to a terminal LINb[3] electrically connected to the terminal ROUTb[2].

In the period T214, a high potential signal is input to a terminal LINb[m/k]. Accordingly, the transistor Tr11 included in the register circuit Rb[m/k] is turned on, and a high potential signal is output from the terminal O1b[m/k].

In the period T215, signals are input to the terminal SL_PWC[5] to the terminal SL_PWC[8], and the terminal RS_PWC[5] to the terminal RS_PWC[8]. Here, in the period T215, since a high potential signal is input to the terminal SWb, the transistor Tr3 is in the on state. In addition, although the potential of the terminal LINb[m/k] is a low potential and the transistor Tr11 included in the register circuit Rb[m/k] is in the off state, the potential of the terminal O1b[m/k] is kept at a high potential since the terminal O1b[m/k] is in the floating state. Thus, high potential signals are input to a terminal O1[m−k+1] which is an input terminal of a buffer circuit BUF[m−k+1], a terminal O1[m−k+2] which is an input terminal of a buffer circuit BUF[m−k+2], a terminal O1[m−k+3] which is an input terminal of a buffer circuit BUF[m−k+3], and a terminal O1[m−k+4] which is an input terminal of a buffer circuit BUF[m−k+4]. Thus, the transistor Tr36 included in the buffer circuit BUF[m−k+1], the transistor Tr36 included in the buffer circuit BUF[m−k+2], the transistor Tr36 included in the buffer circuit BUF[m−k+3], and the transistor Tr36 included in the buffer circuit BUF[m−k+4] are turned on. Accordingly, a signal input to the terminal SL_PWC[5] is output from a terminal SL[m−k+1], a signal input to the terminal SL_PWC[6] is output from a terminal SL[m−k+2], a signal input to the terminal SL_PWC[7] is output from a terminal SL[m−k+3], and a signal input to the terminal SL_PWC[8] is output from a terminal SL[m−k+4]. Furthermore, the transistor Tr32 included in the buffer circuit BUF[m−k+1], the transistor Tr32 included in the buffer circuit BUF[m−k+2], the transistor Tr32 included in the buffer circuit BUF[m−k+3], and the transistor Tr32 included in the buffer circuit BUF[m−k+4] are turned on. Accordingly, a signal input to the terminal RS_PWC[5] is output from a terminal RS[m−k+1], a signal input to a terminal RS_PWC[6] is output from a terminal RS[m−k+2], a signal input to a terminal RS_PWC[7] is output from a terminal RS[m−k+3], and a signal input to a terminal RS_PWC[8] is output from a terminal RS[m−k+4]. Note that since the potential of the terminal O1b[m/k] is a high potential, the transistor Tr17 included in the register circuit Rb[m/k] is turned on, and a clock signal input to the terminal CLKb[4] is output from a terminal ROUTb[m/k]. As described above, since the potential of the terminal CLKb[4] in the period T215 is a high potential, a high potential signal is output from the terminal ROUTb[m/k].

As described above, in the operation method illustrated in FIG. 10, the start pulse signals input to the terminal LINb[1] in the period T211 are sequentially transmitted from the register circuit Rb[1] to the register circuit Rb[m/k] in the period T212 to the period T215. In response to that, it can be said that high potential select signals are output from a group from the terminal SL[1] to the terminal SL[4], and then from a group from the terminal SL[k+1] to the terminal SL[k+4] and a group from the terminal SL[m−k+1] to the terminal SL[m−k+4] sequentially. Furthermore, it can be said that high potential reset signals are output from a group from the terminal RS[1] to the terminal RS[4], and then from a group from the terminal RS[k+1] to the terminal RS[k+4] and a group from the terminal RS[m−k+1] to the terminal RS[m−k+4] sequentially. Note that since the register circuit Ra[1] to the register circuit Ra[m] are in the off state, high potential signals are not output from the terminal O1a[1] to a terminal O1a[m].

Note that in the case where the register circuit Rb is operated with the method illustrated in FIG. 10, the periods in which a plurality of clock signals each set to a high potential are not necessarily overlapped. For example, in the terminal CLKb[1] to the terminal CLKb[4], only the potential of the terminal CLKb[1] can be set to a high potential in the period T212, only the potential of the terminal CLKb[2] can be set to a high potential in the period T213, only the potential of the terminal CLKb[3] can be set to a high potential in the period T214, and only the potential of the terminal CLKb[4] can be set to a high potential in the period T215. In this manner, the periods in which a plurality of clock signals each set to a high potential are not overlapped, whereby potential changes of clock signals due to a mix of a plurality of clock signals can be inhibited. This allows the semiconductor device 10 to be operated with high accuracy.

Meanwhile, when the register circuit Rb is operated without overlapping high potential periods of a plurality of clock signals, it is necessary to store the potential of the terminal O1b as described above. For example, as described above, the potential of the terminal O1b[1] is stored in the period T212, the potential of the terminal O1b[2] is stored in the period T213, and the potential of the terminal O1b[m/k] is stored in the period T215. Thus, in order to inhibit potential changes of the terminal O1b due to a leakage of electric charges, the operation illustrated in FIG. is preferably performed in a short time. As described above, in the second mode in which the register circuit Rb operates, the semiconductor device 10 is preferably operated at high speed so that the position of a detection target is accurately detected. Thus, the operation illustrated in FIG. 10 is performed in a short time. Thus, even when the semiconductor device 10 is operated in a manner in which high potential periods of a plurality of clock signals are not overlapped, a potential change of the terminal O1b due to a leakage of electric charges is small. Therefore, in the second mode, it is preferable that the semiconductor device 10 be operated without overlapping high potential periods of a plurality of clock signals.

In contrast, in the first mode in which the register circuit Ra operates, fingerprint detection or the like is performed. Thus, the semiconductor device 10 does not need to operate at high speed compared to the second mode. Therefore, the register circuit Ra is preferably operated while high potential periods of two clock signals are overlapped. Accordingly, the potential of the terminal O1a can be prevented from being changed even when each of the period T202 to the period T205 illustrated in FIG. 9 becomes long. Note that in the case illustrated in FIG. 9, a high potential period of the clock signal input to the terminal CLKa[1] and a high potential period of the clock signal input to the terminal CLKa[2] overlap in the period T203. In addition, a high potential period of the clock signal input to the terminal CLKa[2] and a high potential period of the clock signal input to the terminal CLKa[3] overlap in the period T204. In addition, a high potential period of the clock signal input to the terminal CLKa[3] and a high potential period of the clock signal input to the terminal CLKa[4] overlap in the period T205.

Here, when a transistor with a low off-state current such as an OS transistor is used as the transistor Tr11 and the transistor Tr18 included in the register circuit Rb in the configuration in FIG. 7C, the potential of the terminal O1b can be stored for a long time. Furthermore, when a transistor with a low off-state current such as an OS transistor is used as the transistor Tr11 and the transistor Tr18 included in the register circuit Ra in the configuration in FIG. 6C, the potential of the terminal O1a can be stored for a long time. Thus, even in the case where the semiconductor device 10 is operated in the first mode, the semiconductor device 10 can operate in some cases without overlapping high potential periods of a plurality of clock signals.

Configuration Example 2 of Gate Driver Circuit

Figure 11:
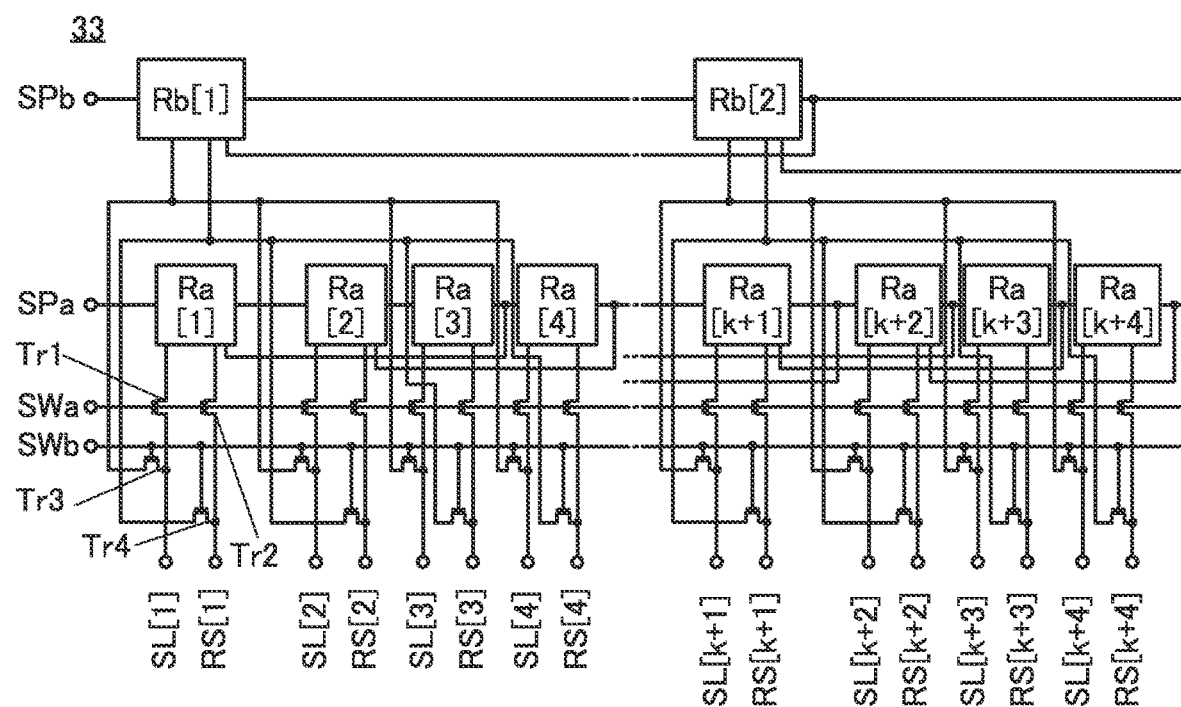
FIG. 11 is a block diagram illustrating a configuration example of an imaging device.

FIG. 11 is a diagram illustrating a configuration example of the shift register circuit in the gate driver circuit 33, which is a modification example of the structure in FIG. 3. The configuration of the shift register circuit illustrated in FIG. 11 is different from the configuration of the shift register circuit illustrated in FIG. 3 in that the buffer circuit BUF is not included. Hereinafter, when the shift register circuit included in the gate driver circuit 33 has the configuration illustrated in FIG. 11, portions different from the configuration of the shift register circuit illustrated in FIG. 3 are described. Hereinafter, descriptions are made on the assumption that the shift register circuit included in the gate driver circuit 33 includes an m register circuits Ra and m/k register circuits Rb.

The register circuit Ra is electrically connected to the terminal SL through the transistor Tr1. The register circuit Ra is electrically connected to the terminal RS through the transistor Tr2. The register circuit Rb is electrically connected to the terminal SL through the transistor Tr3. The register circuit Rb is electrically connected to the terminal RS through the transistor Tr4.

Here, a configuration in which one register circuit Rb is electrically connected to a plurality of terminals SL through the transistor Tr3 and electrically connected to the plurality of terminals RS through the transistor Tr4 can be formed. For example, one register circuit Rb is electrically connected to four terminals SL through the transistor Tr3 and electrically connected to four terminals RS through the transistor Tr4. For example, as illustrated in FIG. 11, the register circuit Rb[1] is electrically connected to the terminal SL[1] to the terminal SL[4] through the transistor Tr3 and electrically connected to the terminal RS[1] to the terminal RS[4] through the transistor Tr4. Furthermore, the register circuit Rb[2] is electrically connected to the terminal SL[k+1] to the terminal SL[k+4] through the transistor Tr3 and electrically connected to the terminal RS[k+1] to the terminal RS[k+4] through the transistor Tr4. Note that one register circuit Rb may be electrically connected to two or three terminals SL through the transistor Tr3 and may be electrically connected to two or three terminals RS through the transistor Tr4. Alternatively, one register circuit Rb may be electrically connected to five or more terminals SL through the transistor Tr3 and may be electrically connected to five or more terminals RS through the transistor Tr4. Specifically, a configuration in which one register circuit Rb is electrically connected to more than or equal to one and less than or equal to k terminal(s) SL through the transistor Tr3 and electrically connected to more than or equal to one and less than or equal to k terminal(s) RS through the transistor Tr4 can be formed.

As described above, by electrically connecting one register circuit Rb to the plurality of terminals SL and terminals RS, imaging data can be read out from the pixels 31 in a plurality of rows at the same time. Thus, imaging data read out at the same time can be overlapped, and the potential of the wiring 45 which electrically connects the pixel 31 to the CDS circuit 35 can be increased. Thus, the imaging device 15 can be operated at a high frame frequency, and the sensitivity of the imaging device 15 can be improved even when an exposure period per frame is short. Hereinafter, descriptions are made of the case where one register circuit Rb is electrically connected to four terminals SL through the transistor Tr3 and electrically connected to four terminals RS through the transistor Tr4.

When a high potential signal is input to the terminal SWa, signals are output from the register circuit Ra to the terminal SL and the terminal RS. Signals are output from the register circuit Ra[1] to the terminal SL[1] and the terminal RS[1], for example. Meanwhile, when a high potential signal is input to the terminal SWb, signals are output from the register circuit Rb to the terminal SL and the terminal RS. Signals are output from the register circuit Rb[1] to the terminal SL[1] to the terminal SL[4] and the terminal RS[1] to the terminal RS[4], for example.

As in the case illustrated in FIG. 3, start pulse signals are input to the terminal SPa and the terminal SPb. In the case where a start pulse signal is input to the terminal SPa and a high potential signal is input to the terminal SWa, the register circuit Ra[1] to the register circuit Ra[m] sequentially outputs signals to the terminal SL[1] to the terminal SL[m], and sequentially outputs signals to the terminal RS[1] to the terminal RS[m] at the same time. That is, after the register circuit Ra[1] outputs signals to the terminal SL[1] and the terminal RS[1], the register circuit Ra[2] outputs signals to the terminal SL[2] and the terminal RS[2]. Then, the register circuit Ra[m] outputs signals to the terminal SL[m] and the terminal RS[m] sequentially.

In the case where a start pulse signal is input to the terminal SPb and a high potential signal is input to the terminal SWb, the register circuit Rb[1] to the register circuit Rb[m/k] sequentially output signals to the terminal SL and the terminal RS. That is, after the register circuit Rb[1] outputs signals to the terminal SL[1] to the terminal SL[4] and the terminal RS[1] to the terminal RS[4], the register circuit Rb[2] outputs signals to the terminal SL[k+1] to the terminal SL[k+4] and the terminal RS[k+1] to the terminal RS[k+4]. Then, the register circuit Rb[m/k] sequentially outputs signals to the terminal SL[m−k+1] to the terminal SL[m−k+4] and the terminal RS[m−k+1] to the terminal RS[m−k+4].

Figure 12A:
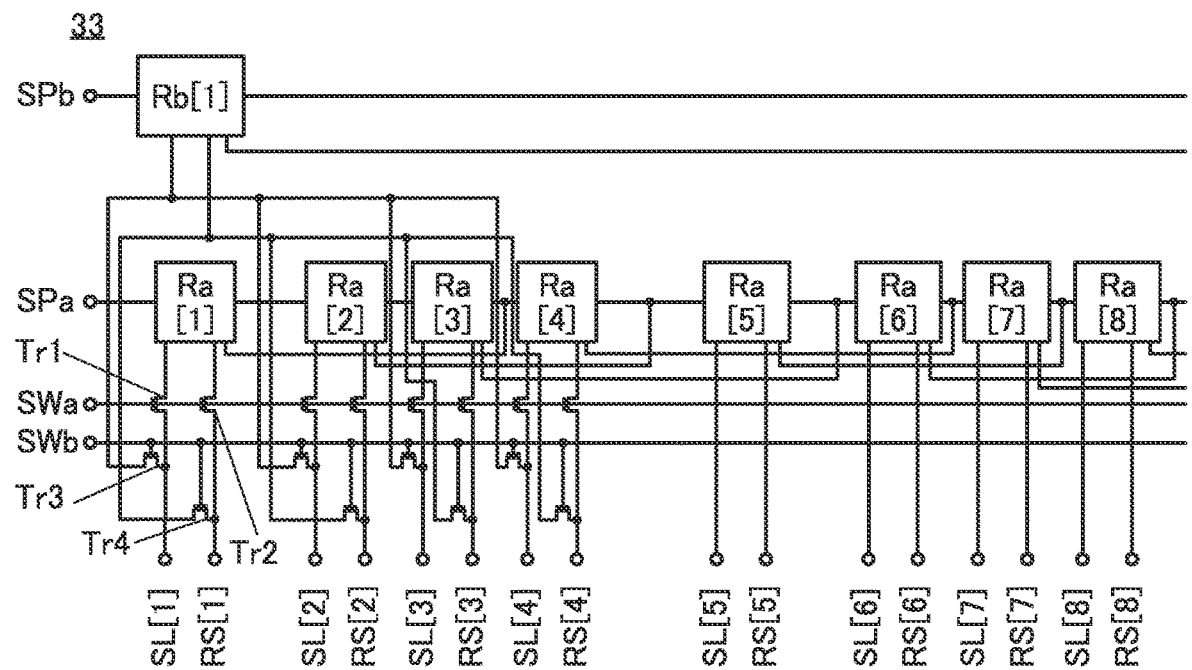
FIG. 12A and FIG. 12B are block diagrams illustrating configuration examples of imaging devices.
Figure 12B:
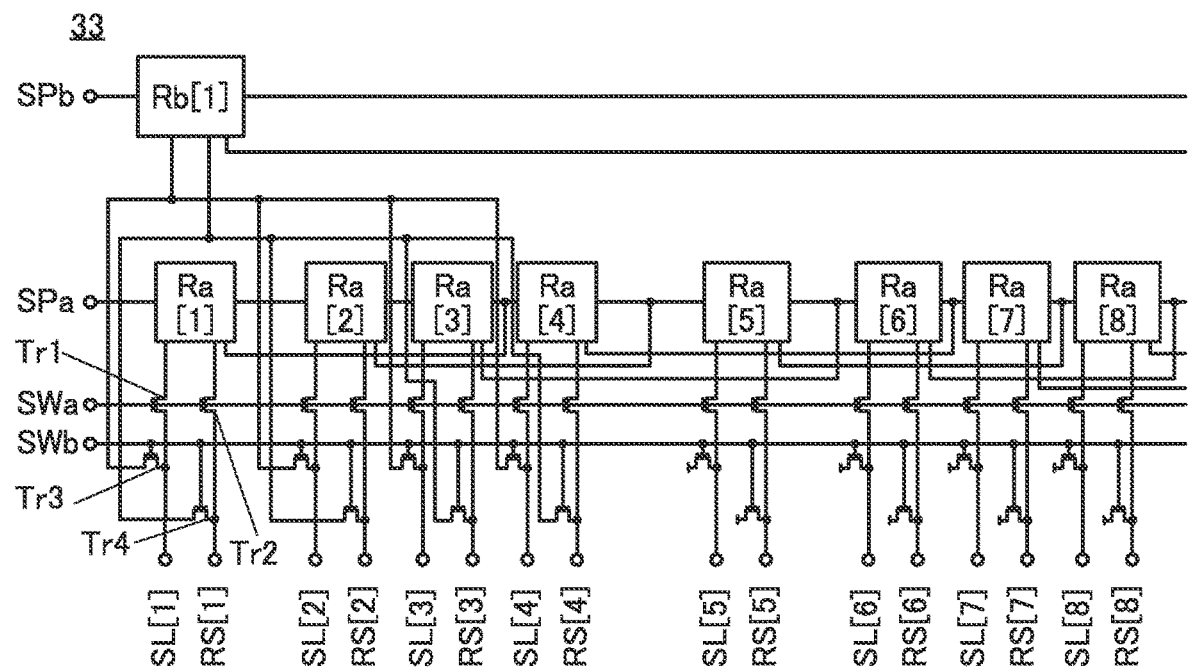

FIG. 12A and FIG. 12B are diagrams illustrating the register circuit Ra[1] to the register circuit Ra[8], the register circuit Rb[1], and the buffer circuit BUF[1] to the buffer circuit BUF[8] which are out of the circuits included in the gate driver circuit 33 illustrated in FIG. 11.

In the gate driver circuit 33 in FIG. 12A, the terminal SL[5] to the terminal SL[8] not supplied with the signal output from the register circuit Rb are electrically connected to the register circuit Ra[5] to the register circuit Ra[8] without the transistor Tr1, respectively. In addition, the terminal RS[5] to the terminal RS[8] not supplied with the signal output from the register circuit Rb are electrically connected to the register circuit Ra[5] to the register circuit Ra[8] without the transistor Tr2, respectively. In addition, the terminal SL[5] to the terminal SL[8] are not electrically connected to one of the source and the drain of the transistor Tr3, and the terminal RS[5] to the terminal RS[8] are not electrically connected to one of the source and the drain of the transistor Tr4. That is, the gate driver circuit 33 in FIG. 12A does not include the transistors Tr3 corresponding to the terminal SL[5] to the terminal SL[8] not supplied with signals from the register circuit Rb, and the transistors Tr4 corresponding to the terminal RS[5] to the terminal RS[8] not supplied with signals from the register circuit Rb.

In the gate driver circuit 33 in FIG. 12B, the terminal SL[5] to the terminal SL[8] not supplied with the signal output from the register circuit Rb are electrically connected to the register circuit Ra[5] to the register circuit Ra[8] through the transistor Tr1, respectively. In addition, the terminal RS[5] to the terminal RS[8] not supplied with the signal output from the register circuit Rb are electrically connected to the register circuit Ra[5] to the register circuit Ra[8] through the transistor Tr2, respectively. In addition, the terminal SL[5] to the terminal SL[8] are electrically connected to one of the source and the drain of the transistor Tr3, and the terminal RS[5] to the terminal RS[8] are electrically connected to one of the source and the drain of the transistor Tr4. Here, a constant potential can be supplied to the other of the source and the drain of the transistor Tr3 whose source or drain is electrically connected to the terminal SL[5] to the terminal SL[8]. Furthermore, a constant potential can be supplied to the other of the source and the drain of the transistor Tr4 whose source or drain is electrically connected to the terminal RS[5] to the terminal RS[8]. For example, a low potential can be supplied to the other of the source and the drain of the transistor Tr3, and a high potential can be supplied to the other of the source and the drain of the transistor Tr4.

Figure 13:
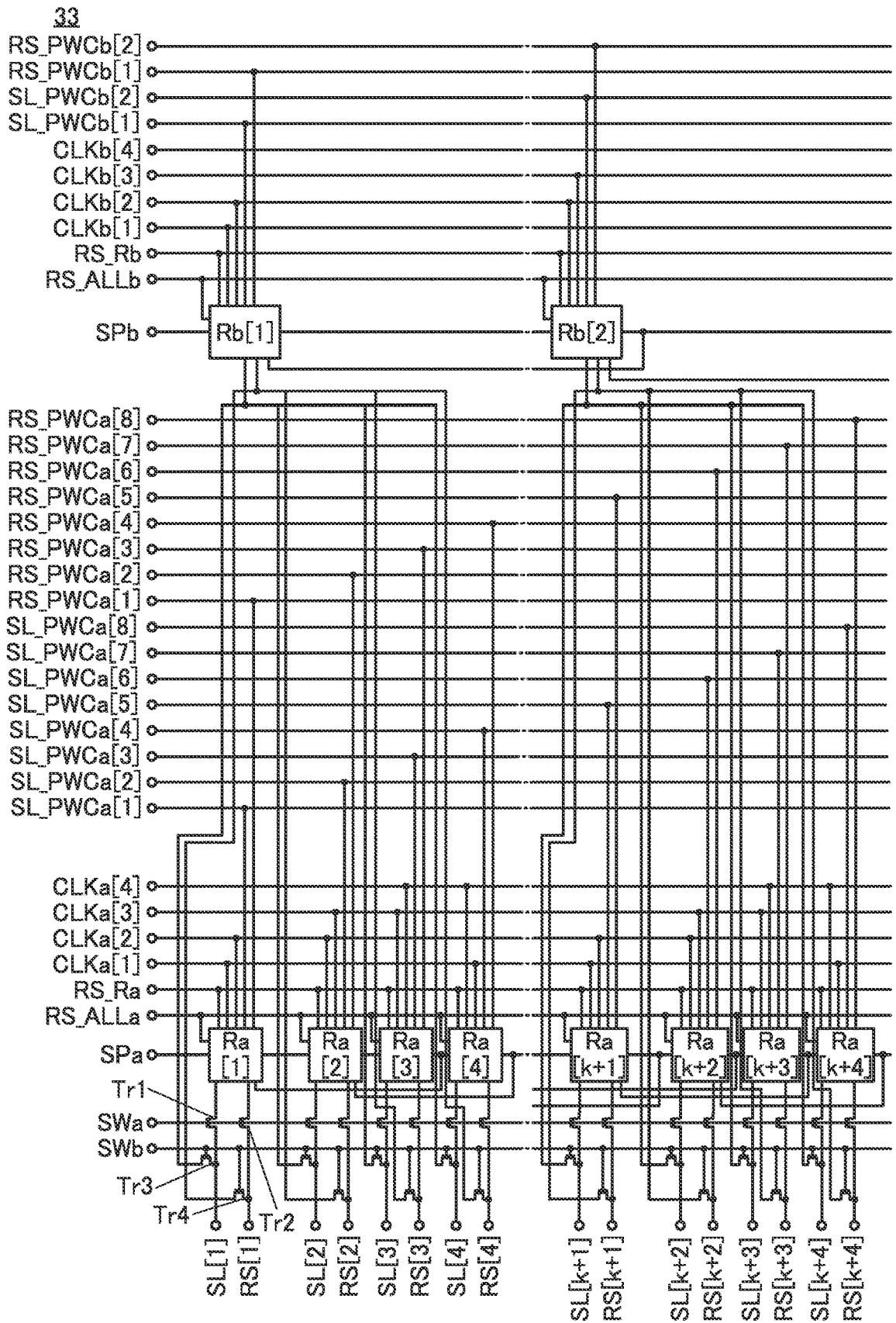
FIG. 13 is a block diagram illustrating a configuration example of an imaging device.

FIG. 13 is a configuration example of the shift register circuit illustrated in FIG. 11, which is obtained by adding terminals to the shift register circuit in FIG. 11. The shift register circuit illustrated in FIG. 13 is different from the shift register circuit with the configuration illustrated in FIG. 5 in that the terminal SL_PWCa and the terminal SL_PWCb are included instead of the terminal SL_PWC, the terminal RS_PWCa and the terminal RS_PWCb are included instead of the terminal RS_PWC, and the terminal RS_ALLa and the terminal RS_ALLb are included instead of the terminal RS_ALL. Although FIG. 13 illustrates a configuration in which a terminal SL_PWCa[1] to a terminal SL_PWCa[8] are provided as the terminals SL_PWCa, a terminal SL_PWCb[1] and a terminal SL_PWCb[2] are provided as the terminals SL_PWCb, a terminal RS_PWCa[1] to a terminal RS_PWCa[8] are provided as the terminals RS_PWCa, a terminal RS_PWCb[1] and a terminal RS_PWCb[2] are provided as the terminals RS_PWCb, the numbers of terminals SL_PWCa, terminals SL_PWCb, terminals RS_PWCa, and terminals RS_PWCb are not limited to the numbers illustrated in FIG. 13.

The terminal SL_PWCa, the terminal RS_PWCa, and the terminal RS_ALLa can be electrically connected to the register circuit Ra. In addition, the terminal SL_PWCb, the terminal RS_PWCb, and the terminal RS_ALLb can be electrically connected to the register circuit Rb.

In the configuration illustrated in FIG. 13, one terminal SL_PWCa and one terminal RS_PWCa can be electrically connected to one register circuit Ra. For example, the register circuit Ra[1] can be electrically connected to the terminal SL_PWCa[1] and the terminal RS_PWCa[1]. Furthermore, the register circuit Ra[2] can be electrically connected to a terminal SL_PWCa[2] and a terminal RS_PWCa[2]. Furthermore, the register circuit Ra[3] can be electrically connected to a terminal SL_PWCa[3] and a terminal RS_PWCa[3]. Furthermore, the register circuit Ra[4] can be electrically connected to a terminal SL_PWCa[4] and a terminal RS_PWCa[4]. Furthermore, the register circuit Ra[k+1] can be electrically connected to a terminal SL_PWCa[5] and a terminal RS_PWCa[5]. Furthermore, the register circuit Ra[k+2] can be electrically connected to a terminal SL_PWCa[6] and a terminal RS_PWCa[6]. Furthermore, the register circuit Ra[k+3] can be electrically connected to a terminal SL_PWCa[7] and a terminal RS_PWCa[7]. Furthermore, the register circuit Ra[k+4] can be electrically connected to the terminal SL_PWCa[8] and the terminal RS_PWCa[8].

In the configuration illustrated in FIG. 13, one terminal SL_PWCb and one terminal RS_PWCb can be electrically connected to one register circuit Rb. For example, the register circuit Rb[1] can be electrically connected to the terminal SL_PWCb[1] and the terminal RS_PWCb[1]. Furthermore, the register circuit Rb[2] can be electrically connected to the terminal SL_PWCb[2] and the terminal RS_PWCb[2].

Figure 14:
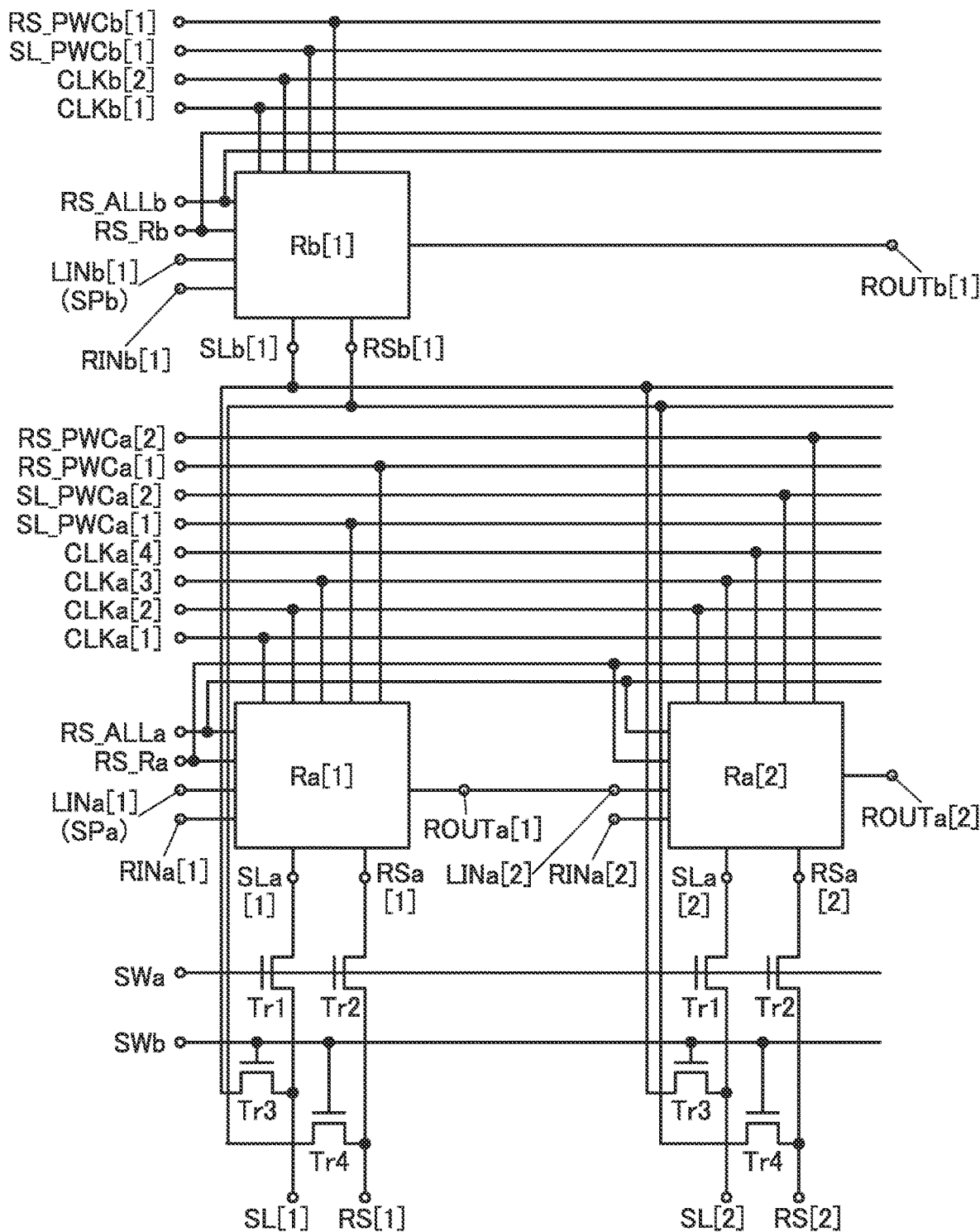
FIG. 14 is a block diagram illustrating a configuration example of an imaging device.

FIG. 14 is a diagram illustrating an example of terminals electrically connected to the register circuit Ra[1], the register circuit Ra[2], the register circuit Rb[1], and the transistor Tr1 to the transistor Tr4. Terminals SLa and terminals RSa are electrically connected to registers Ra. Specifically, for example, a terminal SLa[1] and a terminal RSa[1] are electrically connected to the register Ra[1], and a terminal SLa[2] and a terminal RSa[2] are electrically connected to the register Ra[2]. Furthermore, a terminal SLb and a terminal RSb are electrically connected to a register Rb. Specifically, for example, a terminal SLb[1] and a terminal RSb[1] are electrically connected to the register Rb[1].

Although described in detail later, signals are output from the register circuit Ra to the terminal SLa and the terminal RSa and signals are output from the register circuit Rb to the terminal SLb and the terminal RSb. Thus, the terminal SLa, the terminal RSa, the terminal SLb, and the terminal RSb can be referred to as output terminals.

The terminal SLa is electrically connected to the terminal SL through the transistor Tr1, and the terminal RSa is electrically connected to the terminal RS through the transistor Tr2. The terminal SLb is electrically connected to the terminal SL through the transistor Tr3, and the terminal RSb is electrically connected to the terminal RS through the transistor Tr4. Specifically, the terminal SLa[1] is electrically connected to the terminal SL[1] through the transistor Tr1, and the terminal RSa[1] is electrically connected to the terminal RS[1] through the transistor Tr2. Furthermore, the terminal SLa[2] is electrically connected to the terminal SL[2] through the transistor Tr1, and the terminal RSa[2] is electrically connected to the terminal RS[2] through the transistor Tr2. Furthermore, the terminal SLb[1] is electrically connected to the terminal SL[1] to the terminal SL[4] through the transistor Tr3, and the terminal RSb[1] is electrically connected to the terminal RS[1] to the terminal RS[4] through the transistor Tr4. Note that the terminal SL[3], the terminal SL[4], the terminal RS[3], and the terminal RS[4] are not illustrated in FIG. 14.

Figure 15:
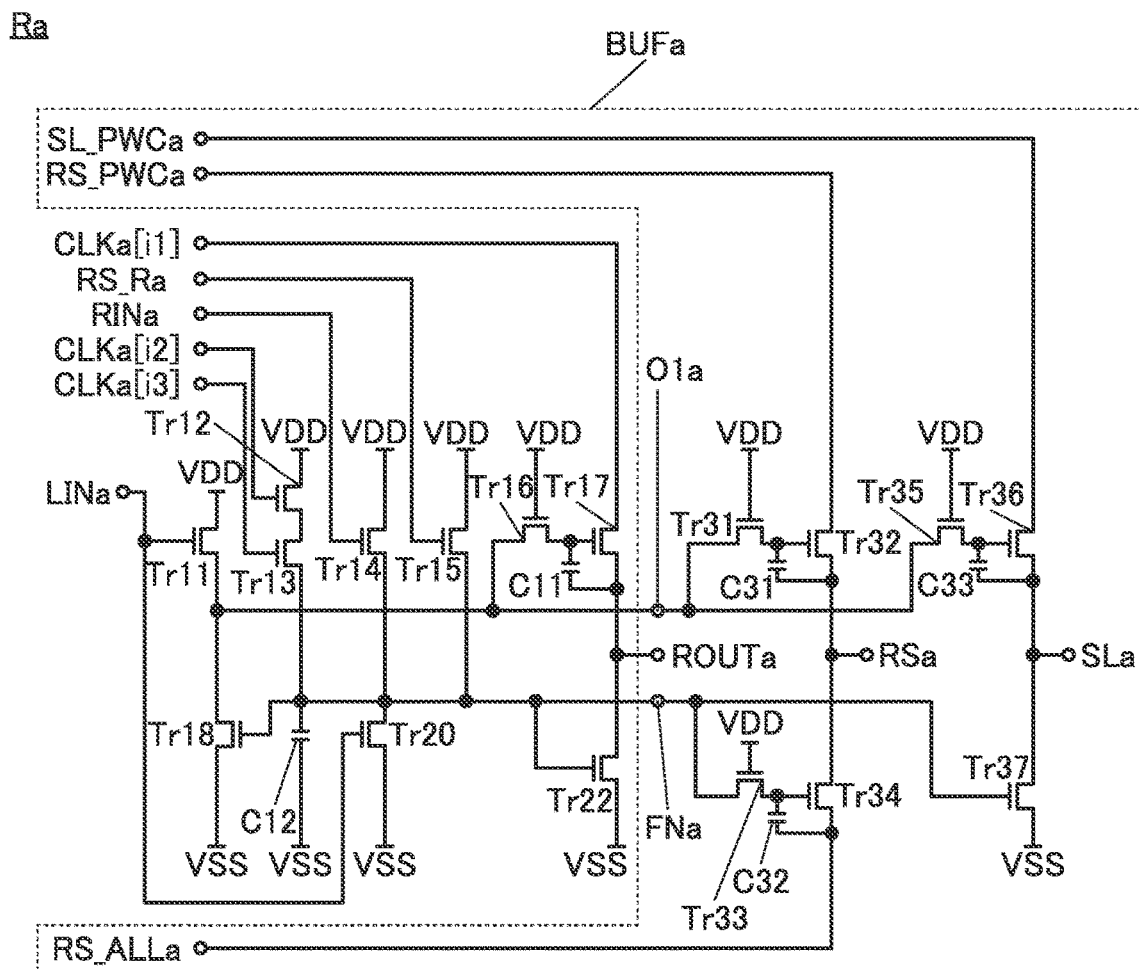
FIG. 15 is a block diagram illustrating a configuration example of an imaging device.

FIG. 15 is a circuit diagram illustrating a configuration example of the register circuit Ra illustrated in FIG. 11 to FIG. 14. The register circuit Ra includes the transistor Tr11, the transistor Tr12, the transistor Tr13, the transistor Tr14, the transistor Tr15, the transistor Tr16, the transistor Tr17, the transistor Tr18, the transistor Tr20, the transistor Tr22, the capacitor C11, and the capacitor C12. The register circuit Ra includes the transistor Tr31 to the transistor Tr37 and the capacitor C31 to the capacitor C33.

As illustrated in FIG. 15, the register circuit Ra illustrated in FIG. 13 can have a configuration in which the circuit with the configuration illustrated in FIG. 6C and the circuit with the configuration illustrated in FIG. 8B. That is, it can be said that the register circuit Ra illustrated in FIG. 15 has a configuration in which the buffer circuit BUF with the configuration illustrated in FIG. 8B is provided in the register circuit Ra with the configuration in FIG. 6C. In the circuit illustrated in FIG. 15, the circuit corresponding to the buffer circuit BUF illustrated in FIG. 8B is a buffer circuit BUFa.

The terminal O1a is electrically connected to one of a source and a drain of the transistor Tr31 and one of the source and the drain of the transistor Tr35. The terminal FNa is electrically connected to one of the source and the drain of the transistor Tr33 and the gate of the transistor Tr37. A terminal SL_PWCa is electrically connected to one of the source and the drain of the transistor Tr36. A terminal RS_PWCa is electrically connected to one of the source and the drain of the transistor Tr32. A terminal RS_ALLa is electrically connected to one of the source and the drain of the transistor Tr34 and one electrode of the capacitor C32. The terminal SLa is electrically connected to the other of the source and the drain of the transistor Tr36, one of the source and the drain of the transistor Tr37, and one electrode of the capacitor C33. A terminal RSa is electrically connected to the other of the source and the drain of transistor Tr32, the other of the source and the drain of the transistor Tr34, and one electrode of the capacitor C31.

The descriptions of the operation method of the buffer circuit BUF illustrated in FIG. 8B can be referred to for an operation example of the buffer circuit BUFa by changing the terminal O1 to the terminal O1a, the terminal FN to the terminal FNa, the terminal SL_PWC to the terminal SL_PWCa, the terminal RS_PWC to the terminal RS_PWCa, the terminal RS_ALL to the terminal RS_ALLa, and the like.

Figure 16:
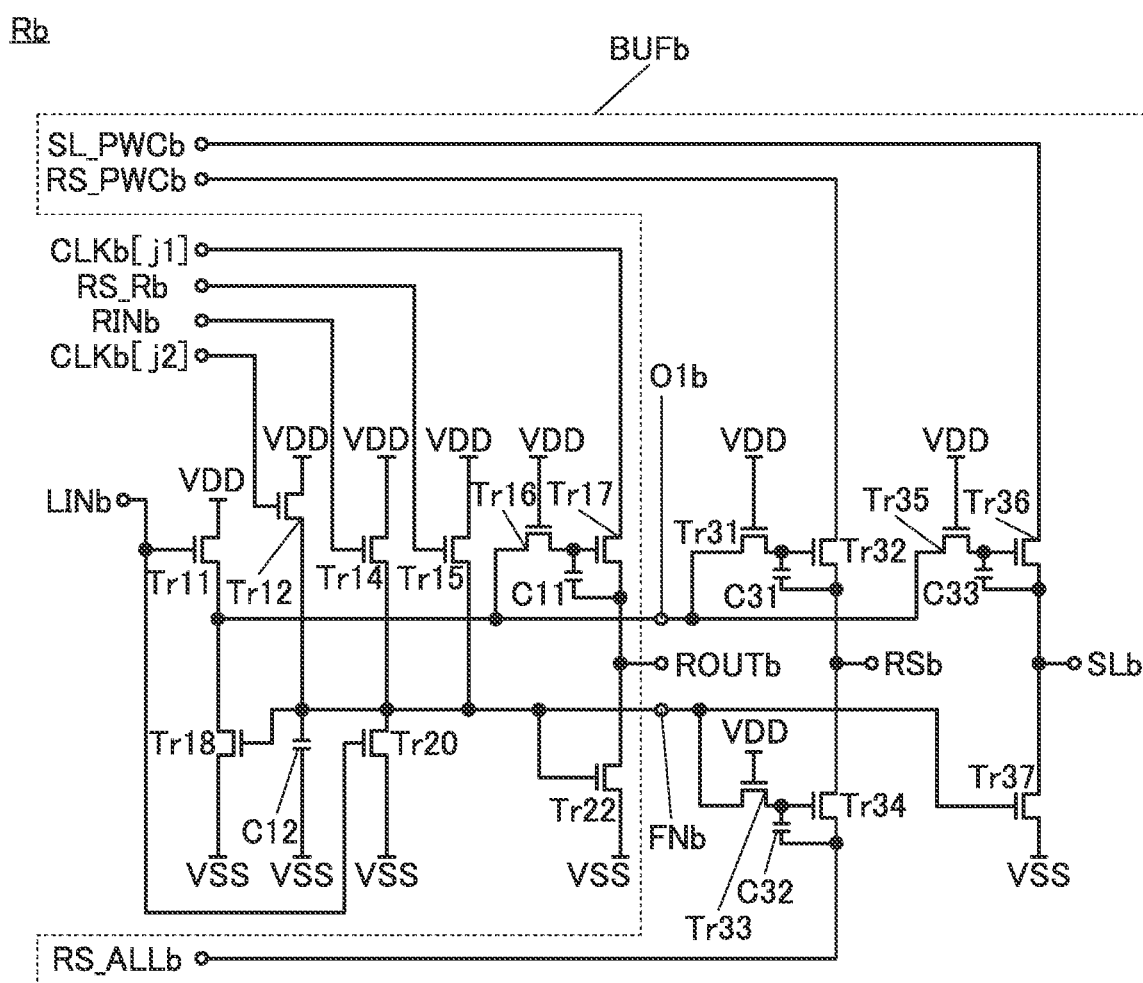
FIG. 16 is a block diagram illustrating a configuration example of an imaging device.

FIG. 16 is a circuit diagram illustrating a configuration example of the register circuit Rb illustrated in FIG. 11 to FIG. 14. The configuration of the register circuit Rb illustrated in FIG. 16 is different from the configuration illustrated in FIG. 15 in that the transistor Tr13 is not provided. Furthermore, the terminal CLKb[j1], the terminal CLKb[j2], the terminal RS_Rb, the terminal LINb, the terminal RINb, the terminal ROUTb, the terminal O1b, the terminal FNb, the terminal SL_PWCb, the terminal RS_PWCb, the terminal RS_ALLb, the terminal SLb, and the terminal RSb are electrically connected to the register circuit Rb illustrated in FIG. 16 instead of the terminal CLKa[i1], the terminal CLKa[i2], the terminal RS_Ra, the terminal LINa, the terminal RINa, the terminal ROUTa, the terminal O1a, the terminal FNa, the terminal SL_PWCa, the terminal RS_PWCa, the terminal RS_ALLa, the terminal SLa, and the terminal RSa; this is different from the configuration illustrated in FIG. 15. Here, out of the circuit illustrated in FIG. 16, the circuit with the configuration corresponding to the buffer circuit BUF illustrated in FIG. 8B is a buffer circuit BUFb.

Note that the register circuit Ra may have the configuration illustrated in FIG. 16 and the register circuit Rb may have the configuration illustrated in FIG. 15.

The operation example of the buffer circuit BUF illustrated in FIG. 8B can be referred to for an operation example of the buffer circuit BUFb by changing the terminal O1 to the terminal O1b, the terminal FN to the terminal FNb, the terminal SL_PWC to the terminal SL_PWCb, the terminal RS_PWC to the terminal RS_PWCb, the terminal RS_ALL to the terminal RS_ALLb, and the like.

As described above, the shift register circuit in the gate driver circuit 33 has the configuration illustrated in FIG. 11, whereby the buffer circuit to which the signal output from the register circuit Ra is input can be different from the buffer circuit to which the signal output from the register circuit Rb is input.

Example 2 of Operation Method

Figure 17:
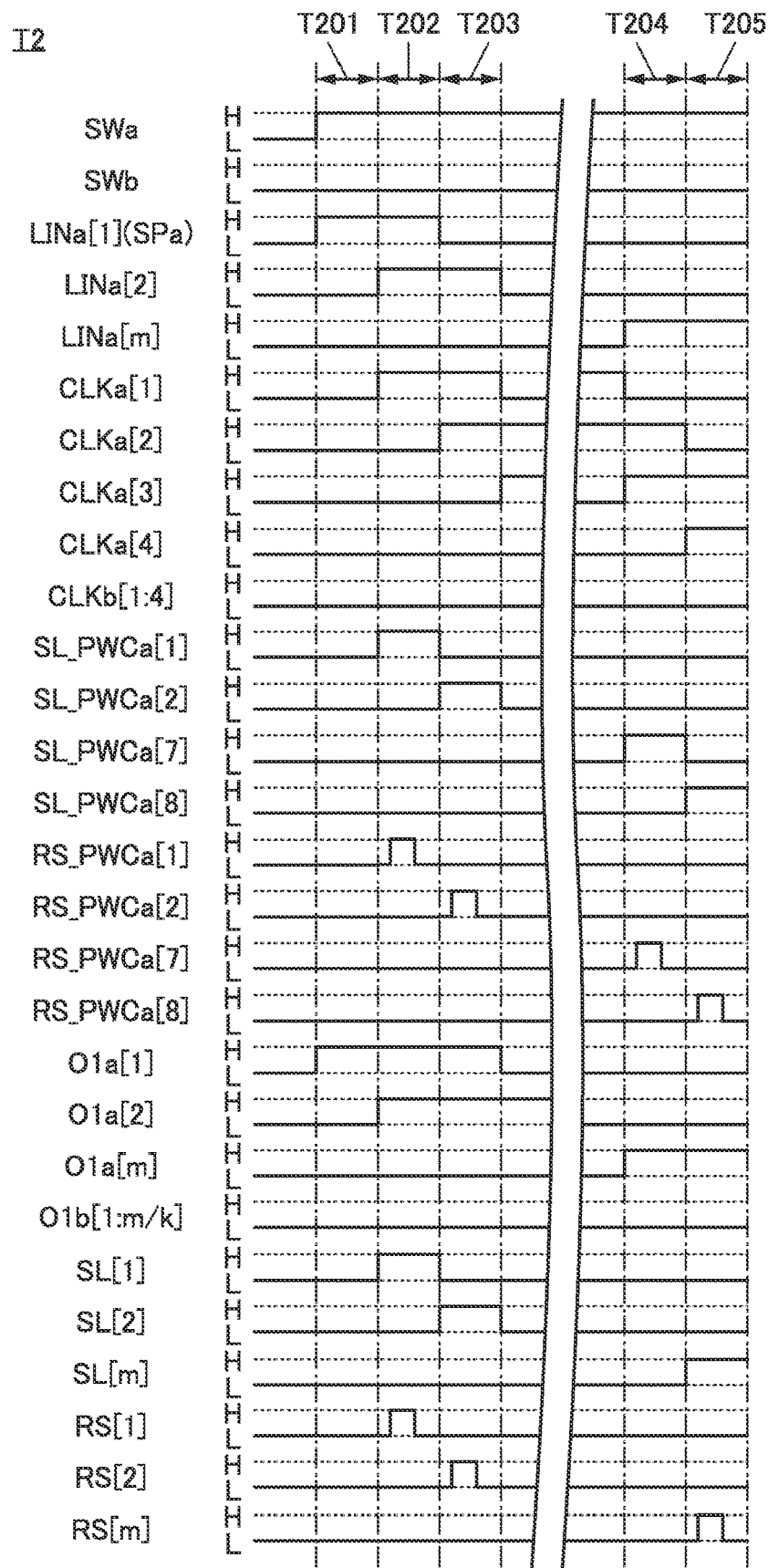
FIG. 17 is a timing chart illustrating an example of a method of operation of an imaging device.
Figure 18:
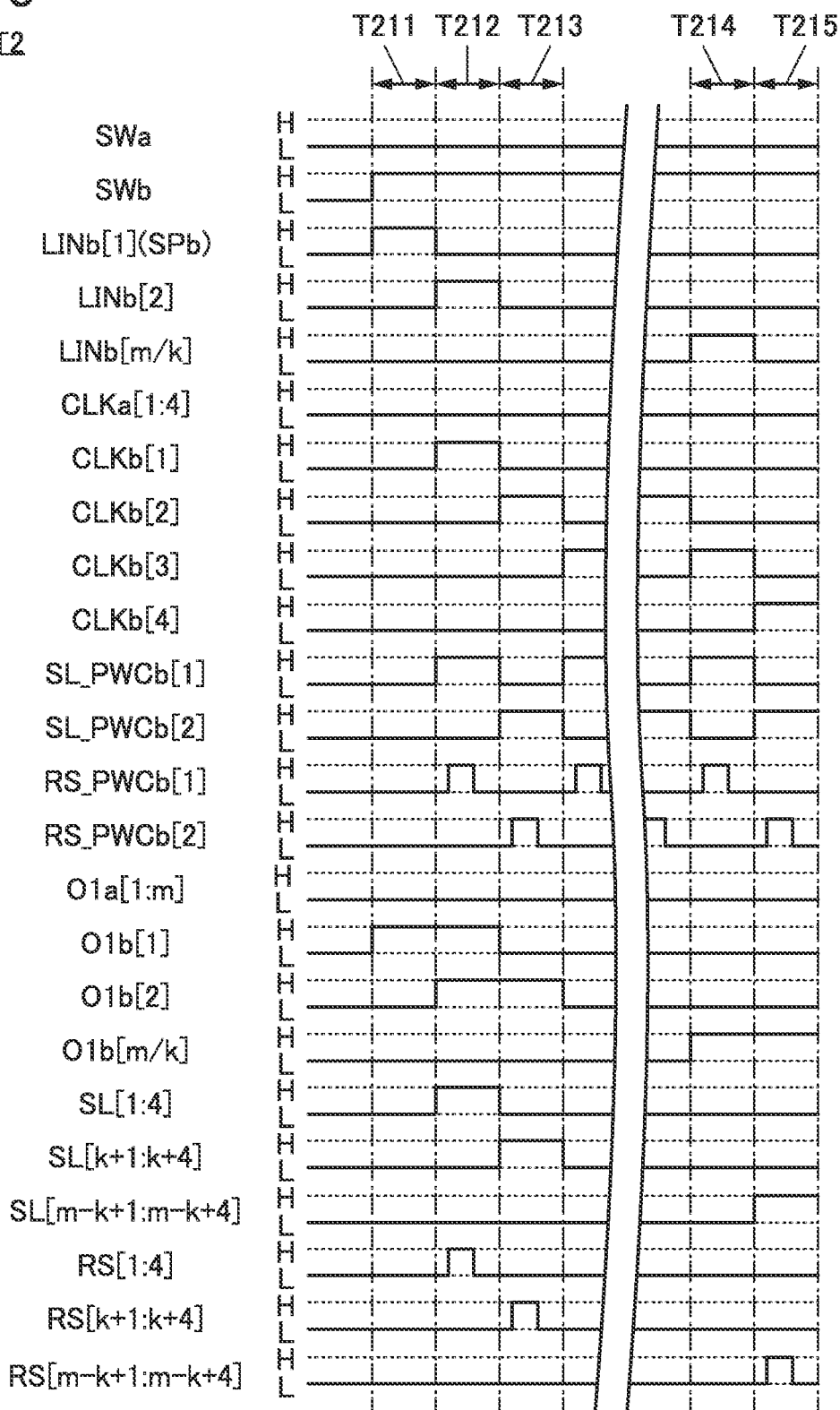
FIG. 18 is a timing chart illustrating an example of a method of operation of an imaging device.

FIG. 17 and FIG. 18 are diagrams illustrating operation examples of the shift register circuit with the configuration illustrated in FIG. 13. Here, FIG. 17 and FIG. 18 illustrate operation examples in the period T2 which is a reading period illustrated in FIG. 2B2. FIG. 17 is an operation example in the first mode, and FIG. 18 is an operation example in the second mode.

The operation illustrated in FIG. 9 can be referred to for the operation illustrated in FIG. 17 by changing the terminal SL_PWC to the terminal SL_PWCa, the terminal RS_PWC to the terminal RS_PWCa, and the like. The descriptions of the operation illustrated in FIG. 10 can be referred to for the operation illustrated in FIG. 18 by changing the terminal SL_PWC[1] and the terminal SL_PWC[2] to the terminal SL_PWCb[1], the terminal SL_PWC[5] and the terminal SL_PWC[6] to the terminal SL_PWCb[2], the terminal RS_PWC[1] and the terminal RS_PWC[2] to the terminal RS_PWCb[1], the terminal RS_PWC[5] and the terminal RS_PWC[6] to the terminal RS_PWCb[2], and the like.

At least part of this embodiment can be implemented in combination with the other embodiments described in this specification as appropriate.

Embodiment 2

In this embodiment, structure examples of a semiconductor device of one embodiment of the present invention and a manufacturing method thereof will be described with reference to FIG. 19 to FIG. 23.

Hereinafter, the structure of the semiconductor device of one embodiment of the present invention is described with reference to FIG. 19A to FIG. 19C and FIG. 20A to FIG. 20C.

Semiconductor Device 10A

Figure 19A:
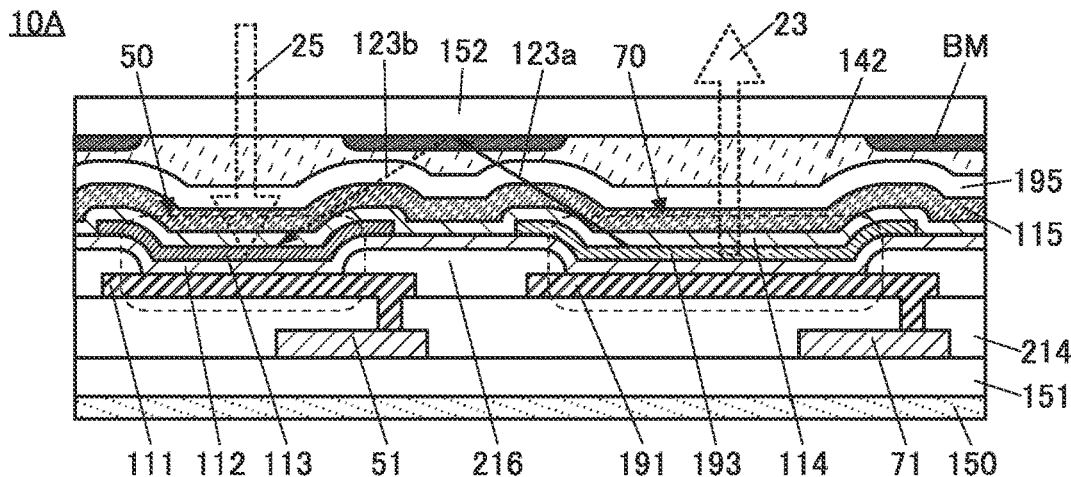
FIG. 19A to FIG. 19C are cross-sectional views illustrating structure examples of a semiconductor device.

FIG. 19A illustrates a cross-sectional view of a display device 10A.

The display device 10A includes a photodetector 50 and a light-emitting element 70.

The photodetector 50 includes a pixel electrode 111, a common layer 112, an active layer 113, a common layer 114, and a common electrode 115.

The light-emitting element 70 includes a pixel electrode 191, the common layer 112, a light-emitting layer 193, the common layer 114, and the common electrode 115.

The pixel electrode 111, the pixel electrode 191, the common layer 112, the active layer 113, the light-emitting layer 193, the common layer 114, and the common electrode 115 may each have a single-layer structure or a stacked-layer structure.

The pixel electrode 111 and the pixel electrode 191 are positioned over an insulating layer 214. The pixel electrode 111 and the pixel electrode 191 can be formed using the same material in the same step.

The common layer 112 is positioned over the pixel electrode 111 and the pixel electrode 191. The common layer 112 is a layer shared by the photodetector 50 and the light-emitting element 70.

The active layer 113 overlaps with the pixel electrode 111 with the common layer 112 therebetween. The light-emitting layer 193 overlaps with the pixel electrode 191 with the common layer 112 therebetween. The active layer 113 includes a first organic compound, and the light-emitting layer 193 includes a second organic compound that is different from the first organic compound.

The common layer 114 is positioned over the common layer 112, the active layer 113, and the light-emitting layer 193. The common layer 114 is a layer shared by the photodetector and the light-emitting element 70.

The common electrode 115 includes a portion overlapping with the pixel electrode 111 with the common layer 112, the active layer 113, and the common layer 114 therebetween. The common electrode 115 further includes a portion overlapping with the pixel electrode 191 with the common layer 112, the light-emitting layer 193, and the common layer 114 therebetween. The common electrode 115 is a layer shared by the photodetector 50 and the light-emitting element 70.

In the semiconductor device of this embodiment, an organic compound is used for the active layer 113 of the photodetector 50. In the photodetector 50, the layers other than the active layer 113 can have structures in common with the layers in the light-emitting element 70 (EL element). Therefore, the photodetector 50 can be formed concurrently with the formation of the light-emitting element 70 only by adding a step of depositing the active layer 113 in the manufacturing process of the light-emitting element 70. The light-emitting element 70 and the photodetector 50 can be formed over the same substrate. Accordingly, the photodetector 50 can be incorporated into the semiconductor device without a significant increase in the number of manufacturing steps.

The semiconductor device 10A illustrates an example in which the photodetector 50 and the light-emitting element 70 have a common structure except that the active layer 113 of the photodetector 50 and the light-emitting layer 193 of the light-emitting element 70 are separately formed. Note that the structures of the photodetector 50 and the light-emitting element 70 are not limited thereto. The photodetector 50 and the light-emitting element 70 may include separately formed layers other than the active layer 113 and the light-emitting layer 193 (see semiconductor device 10D, semiconductor device 10E, and semiconductor device 10F to be described later). The photodetector 50 and the light-emitting element 70 preferably include at least one layer used in common (common layer). Thus, the photodetector 50 can be incorporated into the semiconductor device without a significant increase in the number of manufacturing steps.

The semiconductor device 10A includes the photodetector 50, the light-emitting element a transistor 51, a transistor 71, and the like between a pair of substrates (substrate 151 and substrate 152).

An adhesive layer 150 is provided on the outer side of the substrate 151. The semiconductor device 10A can be fixed to an object with the adhesive layer 150. As the adhesive layer 150, an adhesive capable of being peeled off may be used. Furthermore, an adhesive capable of reattachment after being peeled may be employed. As the adhesive layer 150, an epoxy resin, an acrylic resin, a silicone resin, a phenol resin, a polyimide resin, an imide resin, a PVC (polyvinyl chloride) resin, a PVB (polyvinyl butyral) resin, an EVA (ethylene vinyl acetate) resin, or the like can be used. In particular, a material with low moisture permeability, such as an epoxy resin, is preferred. Alternatively, a two-component resin may be used. An adhesive sheet or the like may be used.

In the photodetector 50, the common layer 112, the active layer 113, and the common layer 114, which are positioned between the pixel electrode 111 and the common electrode 115, can each also be referred to as an organic layer (a layer including an organic compound). The pixel electrode 111 preferably has a function of reflecting infrared light. An end portion of the pixel electrode 111 is covered with a bank 216. The common electrode 115 has a function of transmitting infrared light.

The photodetector 50 has a function of sensing light. Specifically, the photodetector 50 has a function of converting the light 25 entering from the outside of the semiconductor device and converting it into an electric signal. The light 25 can also be expressed as light that is emitted from the light-emitting element 70 and then reflected by a detection target. The light 25 may enter the photodetector 50 through a lens described later.

A light-blocking layer BM is provided on a surface of the substrate 152 that faces the substrate 151. The light-blocking layer BM has openings at a position overlapping with the photodetector 50 and at a position overlapping with the light-emitting element 70. Providing the light-blocking layer BM can control the range where the photodetector 50 senses light.

For the light-blocking layer BM, a material that blocks light emitted from the light-emitting element can be used. The light-blocking layer BM preferably absorbs infrared light. As the light-blocking layer BM, a black matrix can be formed using a metal material or a resin material containing pigment (e.g., carbon black) or dye, for example.

The light-emitting element 70 emits light and the light reflected by the detection target is detected by the photodetector 50, whereby the semiconductor device 10A can detect the detection target. However, in some cases, light emitted from the light-emitting element 70 is reflected inside the semiconductor device 10A and enters the photodetector 50 without through a detection target. The light-blocking layer BM can reduce the influence of such stray light. For example, in the case where the light-blocking layer BM is not provided, light 123a emitted from the light-emitting element 70 is reflected by the substrate 152 and reflected light 123b enters the photodetector 50 in some cases. Providing the light-blocking layer BM can inhibit the reflected light 123b from entering the photodetector 50. Consequently, noise can be reduced, and the sensitivity of a sensor using the photodetector 50 can be increased.

In the light-emitting element 70, the common layer 112, the light-emitting layer 193, and the common layer 114, which are positioned between the pixel electrode 191 and the common electrode 115, can each also be referred to as an EL layer. The pixel electrode 191 preferably has a function of reflecting infrared light. An end portion of the pixel electrode 191 is covered with the bank 216. The pixel electrode 111 and the pixel electrode 191 are electrically insulated from each other with the bank 216. The common electrode 115 has a function of transmitting infrared light.

The light-emitting element 70 has a function of emitting infrared light. Specifically, the light-emitting element 70 is an electroluminescent element that emits light to the substrate 152 side by applying a voltage between the pixel electrode 191 and the common electrode 115 (see light 23).

It is preferable that the light-emitting layer 193 be formed not to overlap with a light-receiving region of the photodetector 50. This inhibits the light-emitting layer 193 from absorbing the light 25, increasing the amount of light with which the photodetector 50 is irradiated.

The pixel electrode 111 is electrically connected to the source or the drain of the transistor 51 through an opening provided in the insulating layer 214. The end portion of the pixel electrode 111 is covered with the bank 216.

The pixel electrode 191 is electrically connected to a source or a drain of the transistor 71 through an opening provided in the insulating layer 214. The end portion of the pixel electrode 191 is covered with the bank 216. The transistor 71 has a function of controlling the operation of the light-emitting element 70.

The transistor 51 and the transistor 71 are in contact with the same layer (the substrate 151 in FIG. 19A).

At least part of a circuit electrically connected to the photodetector 50 is preferably formed using the same material and the same process as a circuit electrically connected to the light-emitting element 70. In that case, the thickness of the semiconductor device can be reduced compared with the case where the two circuits are separately formed, resulting in simplification of the manufacturing steps.

The photodetector 50 and the light-emitting element 70 are preferably covered with a protective layer 195. In FIG. 19A, the protective layer 195 is provided over and in contact with the common electrode 115. Providing the protective layer 195 can inhibit entry of impurities such as water into the photodetector 50 and the light-emitting element 70, so that the reliability of the photodetector 50 and the light-emitting element 70 can be increased. The protective layer 195 and the substrate 152 are bonded to each other with an adhesive layer 142.

Semiconductor Device 10B

Figure 19B:
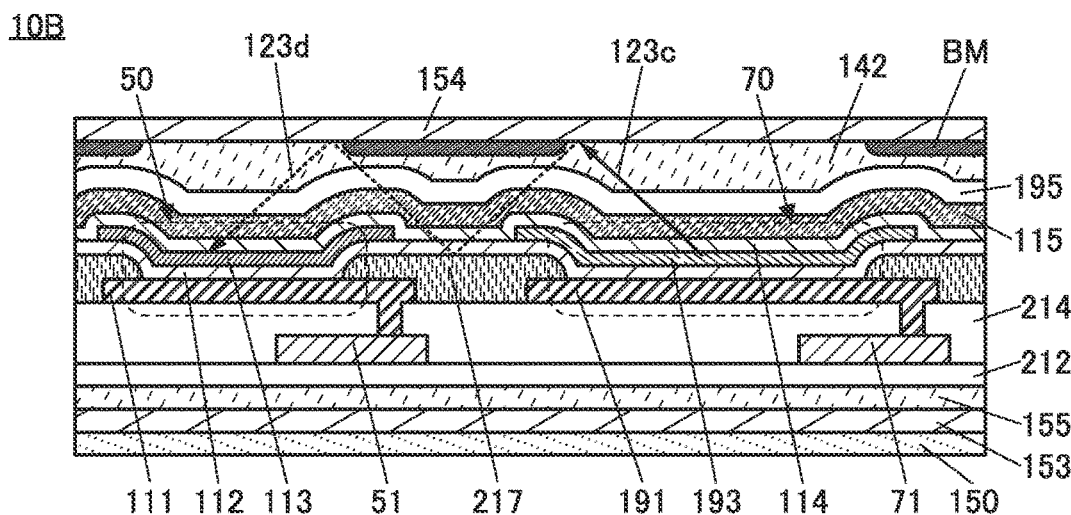

FIG. 19B illustrates cross-sectional views of a semiconductor device 10B. Note that in the description of the semiconductor device below, components similar to those of the above-mentioned semiconductor device are not described in some cases.

The semiconductor device 10B illustrated in FIG. 19B differs from the semiconductor device 10A in that the substrate 151, the substrate 152, and the bank 216 are not included and a substrate 153, a substrate 154, an adhesive layer 155, an insulating layer 212, and a bank 217 are included.

The adhesive layer 150 is provided on the outer side of the substrate 153. The semiconductor device 10B can be fixed to an object with the adhesive layer 150.

The substrate 153 and the insulating layer 212 are bonded to each other with the adhesive layer 155. The substrate 154 and the protective layer 195 are bonded to each other with the adhesive layer 142.

The semiconductor device 10B has a structure obtained in such a manner that the insulating layer 212, the transistor 51, the transistor 71, the photodetector 50, the light-emitting element 70, and the like are formed over a formation substrate and then transferred onto the substrate 153. The substrate 153 and the substrate 154 preferably have flexibility. Accordingly, the flexibility of the semiconductor device 10B can be increased. For example, a resin is preferably used for each of the substrate 153 and the substrate 154.

For each of the substrate 153 and the substrate 154, a polyester resin such as polyethylene terephthalate (PET) or polyethylene naphthalate (PEN), a polyacrylonitrile resin, an acrylic resin, a polyimide resin, a polymethyl methacrylate resin, a polycarbonate (PC) resin, a polyether sulfone (PES) resin, a polyamide resin (e.g., nylon or aramid), a polysiloxane resin, a cycloolefin resin, a polystyrene resin, a polyamide-imide resin, a polyurethane resin, a polyvinyl chloride resin, a polyvinylidene chloride resin, a polypropylene resin, a polytetrafluoroethylene (PTFE) resin, an ABS resin, or cellulose nanofiber can be used, for example. Glass that is thin enough to have flexibility may be used for one or both of the substrate 153 and the substrate 154.

As the substrate included in the semiconductor device of this embodiment, a film having high optical isotropy may be used. Examples of the film having high optical isotropy include a triacetyl cellulose (TAC, also referred to as cellulose triacetate) film, a cycloolefin polymer (COP) film, a cycloolefin copolymer (COC) film, and an acrylic film.

The bank 217 preferably absorbs light emitted with the light-emitting element. As the bank 217, a black matrix can be formed using a resin material containing a pigment or dye, for example. Moreover, the bank 217 can be formed of a colored insulating layer by using a brown resist material.

In some cases, light 123c emitted from the light-emitting element 70 is reflected by the substrate 154 and the bank 217 and reflected light 123d is incident on the photodetector 50. In other cases, the light 123c passes through the bank 217 and is reflected with a transistor, a wiring, or the like, and thus reflected light enters the photodetector 50. When the bank 217 absorbs the light 123c, the reflected light 123d can be inhibited from entering the photodetector 50. Consequently, noise can be reduced, and the sensitivity of a sensor using the photodetector 50 can be increased.

The bank 217 preferably absorbs at least light with the wavelength that is sensed with the photodetector 50. For example, in the case where the photodetector 50 senses green light emitted from the light-emitting element 70, the bank 217 preferably absorbs at least green light. For example, when the bank 217 includes a red color filter, the green light 123c can be absorbed and thus the reflected light 123d can be inhibited from being incident on the photodetector 50.

Semiconductor Device 10C

Figure 19C:
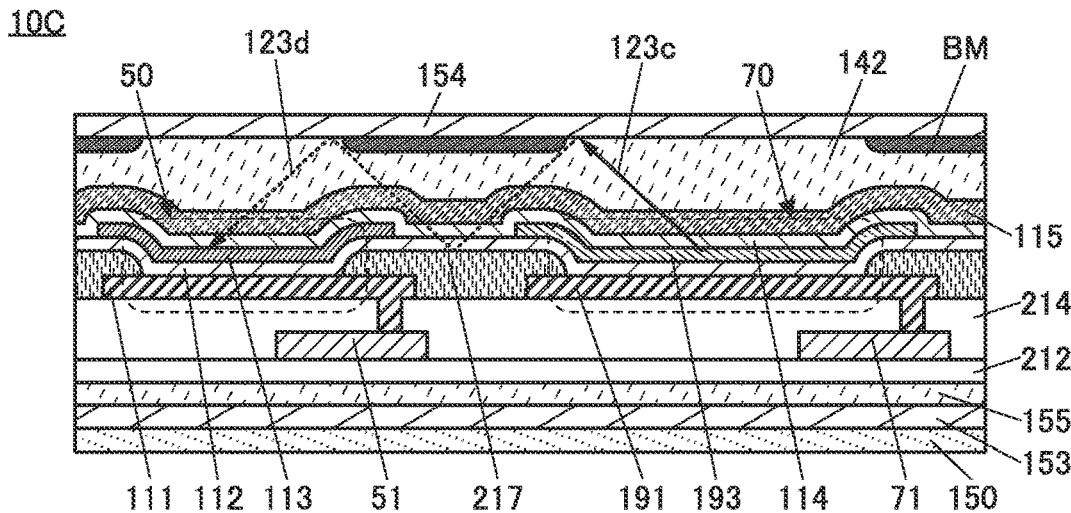

FIG. 19C illustrates a cross-sectional view of a semiconductor device 10C.

The semiconductor device 10C differs from the semiconductor device 10B in that the protective layer 195 is not provided over the photodetector 50 and the light-emitting element 70. In the semiconductor device 10C, the common electrode 115 and the substrate 154 are bonded to each other with the adhesive layer 142.

[Semiconductor Device 10D, Semiconductor Device 10E, and Semiconductor Device 10F]

Figure 20A:
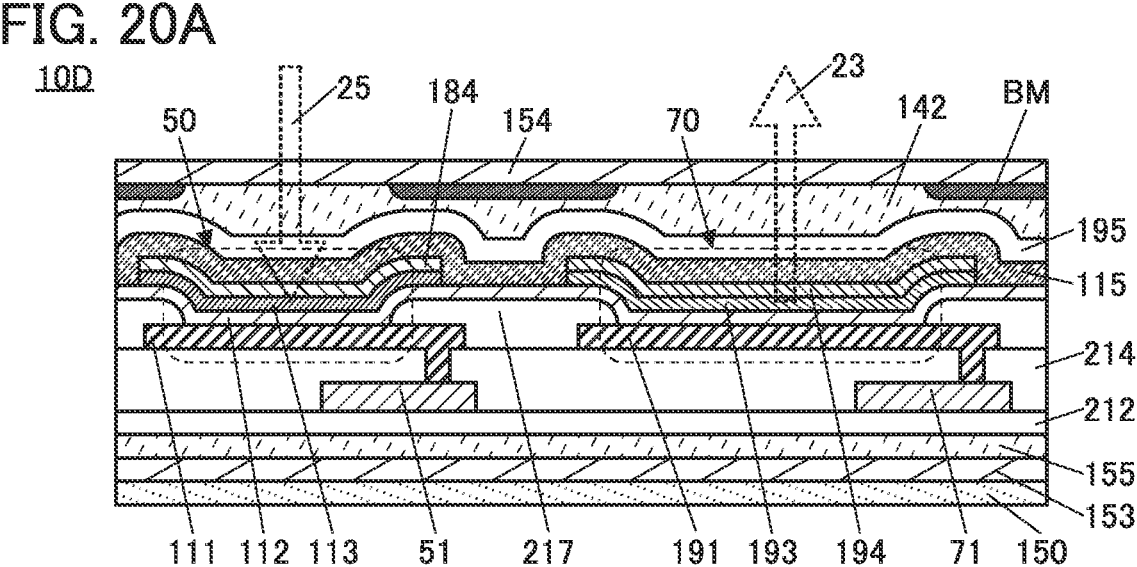
FIG. 20A to FIG. 20C are cross-sectional views illustrating structure examples of a semiconductor device.
Figure 20B:
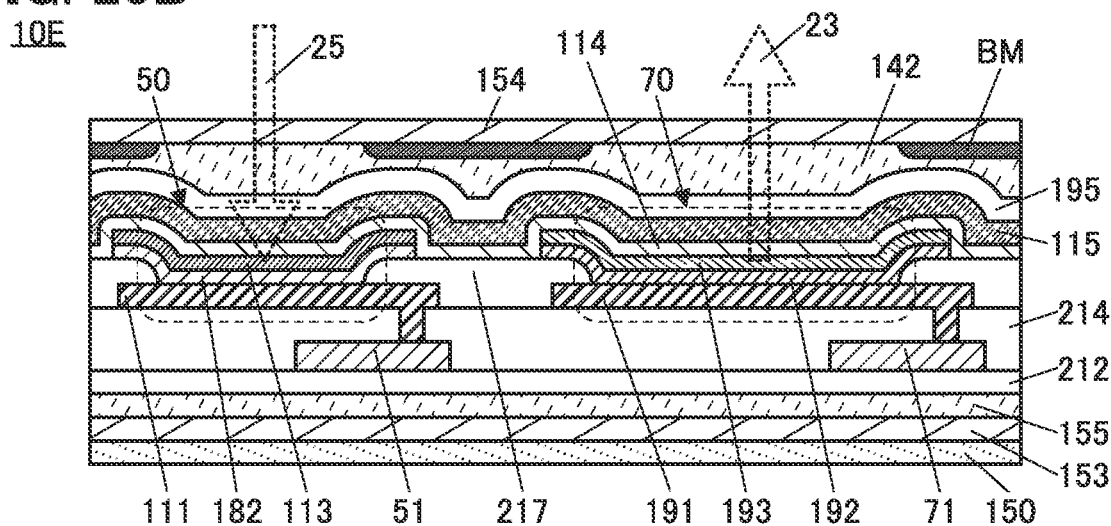
Figure 20C:
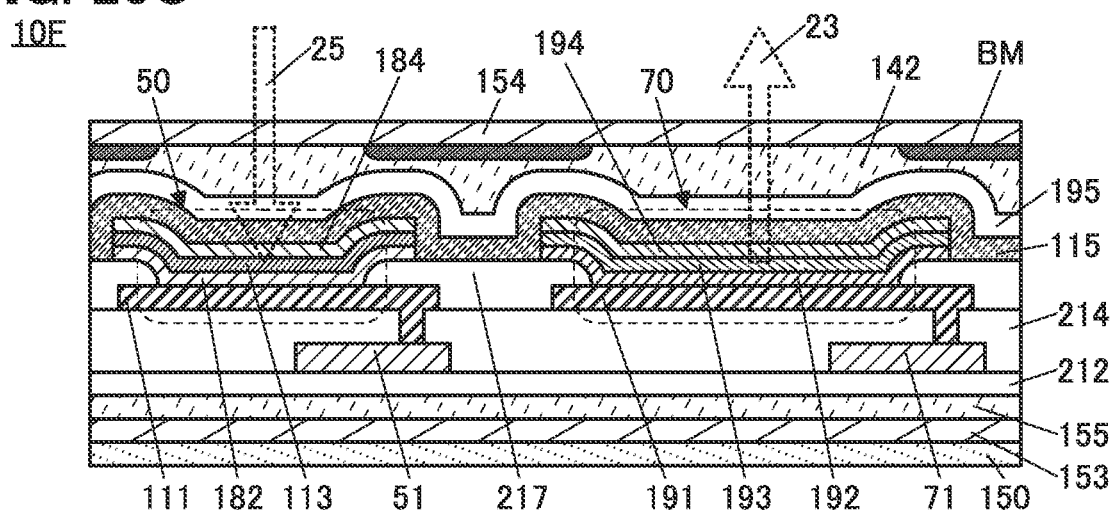

FIG. 20A illustrates a cross-sectional view of the semiconductor device 10D, FIG. 20B illustrates a cross-sectional view of the semiconductor device 10E, and FIG. 20C illustrates a cross-sectional view of the semiconductor device 10F.

The semiconductor device 10D is different from the semiconductor device 10B in that the common layer 114 is not included and a buffer layer 184 and a buffer layer 194 are included. The buffer layer 184 and the buffer layer 194 may each have a single-layer structure or a stacked-layer structure.

In the semiconductor device 10D, the photodetector 50 includes the pixel electrode 111, the common layer 112, the active layer 113, the buffer layer 184, and the common electrode 115. In the semiconductor device 10D, the light-emitting element 70 includes the pixel electrode 191, the common layer 112, the light-emitting layer 193, the buffer layer 194, and the common electrode 115.

The semiconductor device 10E is different from the display device 10B in that the common layer 112 is not included and a buffer layer 182 and a buffer layer 192 are included. The buffer layer 182 and the buffer layer 192 may each have a single-layer structure or a stacked-layer structure.

In the semiconductor device 10E, the photodetector 50 includes the pixel electrode 111, the buffer layer 182, the active layer 113, the common layer 114, and the common electrode 115. In the semiconductor device 10E, the light-emitting element 70 includes the pixel electrode 191, the buffer layer 192, the light-emitting layer 193, the common layer 114, and the common electrode 115.

The semiconductor device 10F is different from the semiconductor device 10A in that the common layer 112 and the common layer 114 are not included and the buffer layer 182, the buffer layer 184, the buffer layer 192, and the buffer layer 194 are included.

In the semiconductor device 10F, the photodetector 50 includes the pixel electrode 111, the buffer layer 182, the active layer 113, the buffer layer 184, and the common electrode 115. In the semiconductor device 10F, the light-emitting element 70 includes the pixel electrode 191, the buffer layer 192, the light-emitting layer 193, the buffer layer 194, and the common electrode 115.

In the formation of the photodetector 50 and the light-emitting element 70, not only the active layer 113 and the light-emitting layer 193 but also other layers can be formed separately.

An example is illustrated in which in the semiconductor device 10D, the buffer layer 184 between the common electrode 115 and the active layer 113 and the buffer layer 194 between the common electrode 115 and the light-emitting layer 193 are formed separately. As the buffer layer 194, one or both of an electron-injection layer and an electron-transport layer can be formed, for example.

An example is illustrated in which in the semiconductor device 10E, the buffer layer 182 between the pixel electrode 111 and the active layer 113 and the buffer layer 192 between the pixel electrode 191 and the light-emitting layer 193 are formed separately. As the buffer layer 192, one or both of a hole-injection layer and a hole-transport layer can be formed, for example.

An example is illustrated in which in the display device 10F, the photodetector 50 and the light-emitting element 70 do not have a common layer between the pair of electrodes (the pixel electrode 111 or the pixel electrode 191 and the common electrode 115). The photodetector 50 and the light-emitting element 70 included in the semiconductor device 10F can be manufactured in the following manner: the pixel electrode 111 and the pixel electrode 191 are formed over the insulating layer 214 using the same material in the same step; the buffer layer 182, the active layer 113, and the buffer layer 184 are formed over the pixel electrode 111; the buffer layer 192, the light-emitting layer 193, and the buffer layer 194 are formed over the pixel electrode 191; and then, the common electrode 115 is formed to cover the pixel electrode 111, the buffer layer 182, the active layer 113, the buffer layer 184, the pixel electrode 191, the buffer layer 192, the light-emitting layer 193, and the buffer layer 194.

Note that the formation order of the stacked-layer structure of the buffer layer 182, the active layer 113, and the buffer layer 184 and the stacked-layer structure of the buffer layer 192, the light-emitting layer 193, and the buffer layer 194 is not particularly limited. For example, after the buffer layer 182, the active layer 113, and the buffer layer 184 are formed, the buffer layer 192, the light-emitting layer 193, and the buffer layer 194 may be formed. In contrast, the buffer layer 192, the light-emitting layer 193, and the buffer layer 194 may be formed before the buffer layer 182, the active layer 113, and the buffer layer 184 are formed. Alternate formation of the buffer layer 182, the buffer layer 192, the active layer 113, the light-emitting layer 193, and the like in this order is also possible.

A more detailed structure of the semiconductor device of one embodiment of the present invention is described below with reference to FIG. 21 to FIG. 23.

Semiconductor Device 100A

Figure 21:
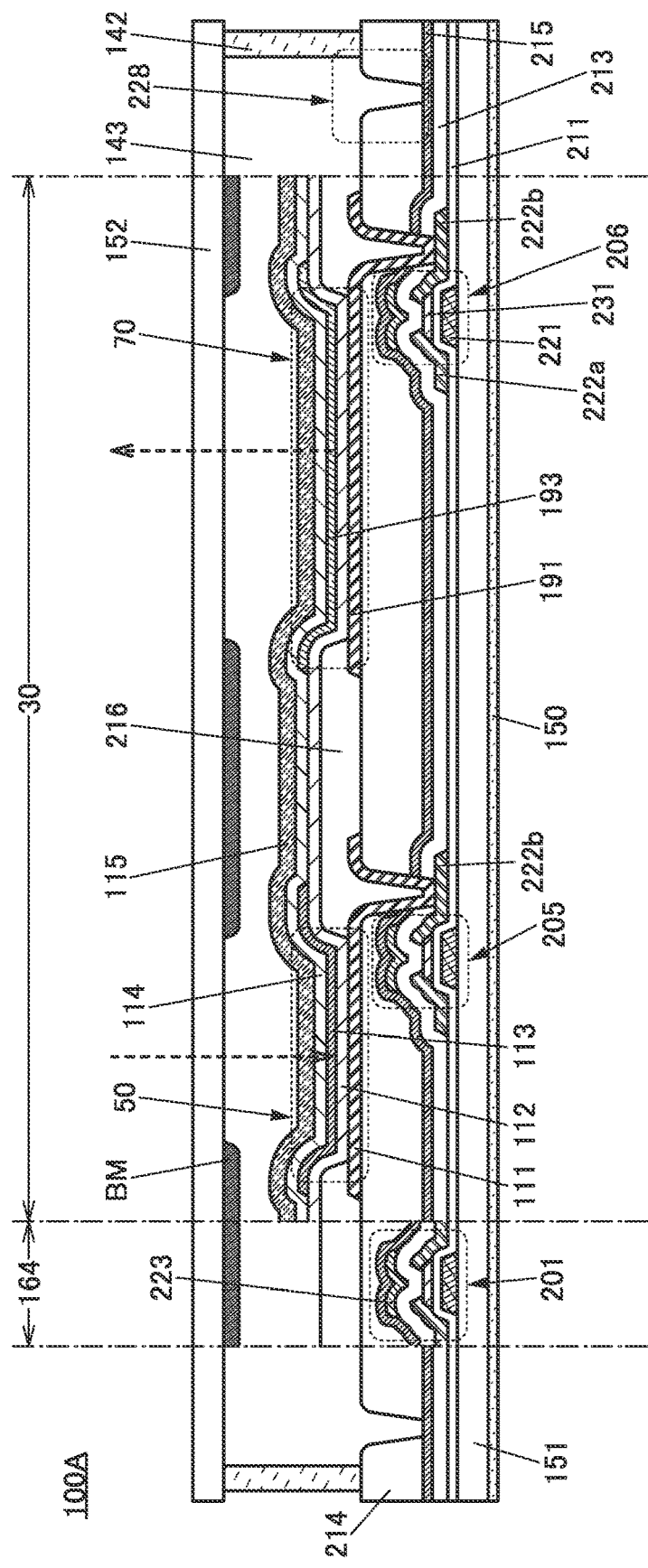
FIG. 21 is a cross-sectional view illustrating a structure example of a semiconductor device.

FIG. 21 illustrates a cross-sectional view of a display device 100A.

In the semiconductor device 100A, the substrate 152 and the substrate 151 are attached to each other.

The semiconductor device 100A includes a pixel portion 30, a circuit 164, and the like. FIG. 21 illustrates an example of cross sections of part of a region including the circuit 164, part of a region including the pixel portion 30, and part of a region including an end portion in the semiconductor device 100A.

As the circuit 164, for example, the gate driver circuit 33, the CDS circuit 35, and the data driver circuit 36 which are described in Embodiment 1 can be used. When the pixel portion 30 and the circuit 164 are formed over the same substrate, a semiconductor device separately formed with a silicon wafer or the like as a circuit is not needed, so that the number of components of the semiconductor device can be reduced.

The semiconductor device 100A illustrated in FIG. 21 includes a transistor 201, a transistor 205, a transistor 206, the light-emitting element 70, the photodetector 50, and the like between the substrate 151 and the substrate 152.

The substrate 152 and the insulating layer 214 are attached to each other with the adhesive layer 142. A solid sealing structure, a hollow sealing structure, or the like can be employed to seal the light-emitting element 70 and the photodetector 50. In FIG. 21, a space 143 surrounded by the substrate 152, the adhesive layer 142, and the insulating layer 214 is filled with an inert gas (e.g., nitrogen or argon), that is, a hollow sealing structure is employed. The adhesive layer 142 may be provided to overlap with the light-emitting element 70. The space 143 surrounded with the substrate 152, the adhesive layer 142, and the insulating layer 214 may be filled with a resin different from that of the adhesive layer 142.

The light-emitting element 70 has a stacked-layer structure in which the pixel electrode 191, the common layer 112, the light-emitting layer 193, the common layer 114, and the common electrode 115 are stacked in this order from the insulating layer 214 side. The pixel electrode 191 is connected to a conductive layer 222b included in the transistor 206 through an opening provided in the insulating layer 214. The transistor 206 has a function of controlling the operation of the light-emitting element 70. The end portion of the pixel electrode 191 is covered with the bank 216. The pixel electrode 191 includes a material that reflects infrared light, and the common electrode 115 includes a material that transmits infrared light.

The photodetector 50 has a stacked-layer structure in which the pixel electrode 111, the common layer 112, the active layer 113, the common layer 114, and the common electrode 115 are stacked in this order from the insulating layer 214 side. The pixel electrode 111 is electrically connected to the conductive layer 222b included in the transistor 205 through an opening provided in the insulating layer 214. The end portion of the pixel electrode 111 is covered with the bank 216. The pixel electrode 111 includes a material that reflects infrared light, and the common electrode 115 includes a material that transmits infrared light.

Light emitted from the light-emitting element 70 is emitted toward the substrate 152 side. Light enters the photodetector 50 through the substrate 152 and the space 143. For the substrate 152, a material having a high infrared-light-transmitting property is preferably used.

The pixel electrode 111 and the pixel electrode 191 can be formed using the same material in the same step. The common layer 112, the common layer 114, and the common electrode 115 are used in both the photodetector 50 and the light-emitting element 70. The photodetector 50 and the light-emitting element 70 can have common components except the active layer 113 and the light-emitting layer 193. Thus, the photodetector 50 can be incorporated into the semiconductor device 100A without a significant increase in the number of manufacturing steps.

A light-blocking layer BM is provided on a surface of the substrate 152 that faces the substrate 151. The light-blocking layer BM has openings at a position overlapping with the photodetector 50 and at a position overlapping with the light-emitting element 70. Providing the light-blocking layer BM can control the range where the photodetector 50 senses light. Furthermore, with the light-blocking layer BM, light can be prevented from directly entering the photodetector 50 from the light-emitting element 70 without passing through a detection target. Hence, a sensor with less noise and high sensitivity can be obtained.

The transistor 201, the transistor 205, and the transistor 206 are formed over the substrate 151. These transistors can be formed using the same materials in the same steps.

An insulating layer 211, an insulating layer 213, an insulating layer 215, and the insulating layer 214 are provided in this order over the substrate 151. Part of the insulating layer 211 function as gate insulating layers of the transistors. Part of the insulating layer 213 function as gate insulating layers of the transistors. The insulating layer 215 is provided to cover the transistors. The insulating layer 214 is provided to cover the transistors and has a function of a planarization layer. Note that there is no limitation on the number of gate insulating layers and the number of insulating layers covering the transistors, and each insulating layer may have either a single layer or two or more layers.

A material into which impurities such as water and hydrogen do not easily diffuse is preferably used for at least one of the insulating layers that cover the transistors. This allows the insulating layer to serve as a barrier layer. Such a structure can effectively inhibit diffusion of impurities into the transistors from the outside and increase the reliability of the semiconductor device.

An inorganic insulating film is preferably used as each of the insulating layer 211, the insulating layer 213, and the insulating layer 215. As the inorganic insulating film, for example, a silicon nitride film, a silicon oxynitride film, a silicon oxide film, a silicon nitride oxide film, an aluminum oxide film, an aluminum nitride film, or the like which is an inorganic insulating film can be used. A hafnium oxide film, an yttrium oxide film, a zirconium oxide film, a gallium oxide film, a tantalum oxide film, a magnesium oxide film, a lanthanum oxide film, a cerium oxide film, a neodymium oxide film, or the like may also be used. A stack including two or more of the above insulating films may also be used.

Here, an organic insulating film often has a lower barrier property than an inorganic insulating film. Therefore, the organic insulating film preferably has an opening in the vicinity of an end portion of the semiconductor device 100A. This can inhibit entry of impurities from the end portion of the semiconductor device 100A through the organic insulating film. Alternatively, the organic insulating film may be formed so that an end portion of the organic insulating film is positioned on the inner side than the end portion of the semiconductor device 100A is, to prevent the organic insulating film from being exposed at the end portion of the semiconductor device 100A.

An organic insulating film is suitable for the insulating layer 214 functioning as a planarization layer. Examples of materials that can be used for the organic insulating film include an acrylic resin, a polyimide resin, an epoxy resin, a polyamide resin, a polyimide-amide resin, a siloxane resin, a benzocyclobutene-based resin, a phenol resin, and precursors of these resins.

In a region 228 illustrated in FIG. 21, an opening is formed in the insulating layer 214. Thus, the entry of impurities into the pixel portion 30 from the outside through the insulating layer 214 can be inhibited even when an organic insulating film is used as the insulating layer 214. Thus, the reliability of the semiconductor device 100A can be increased.

Each of the transistor 201, the transistor 205, and the transistor 206 includes a conductive layer 221 functioning as a gate, the insulating layer 211 functioning as the gate insulating layer, a conductive layer 222a and the conductive layer 222b functioning as a source and a drain, a semiconductor layer 231, the insulating layer 213 functioning as the gate insulating layer, and a conductive layer 223 functioning as a gate. Here, a plurality of layers obtained by processing the same conductive film are shown with the same hatching pattern. The insulating layer 211 is positioned between the conductive layer 221 and the semiconductor layer 231. The insulating layer 213 is positioned between the conductive layer 223 and the semiconductor layer 231.

There is no particular limitation on the structure of the transistors included in the semiconductor device of this embodiment. For example, a planar transistor, a staggered transistor, or an inverted staggered transistor can be used. A top-gate or bottom-gate transistor structure may be used. Alternatively, gates may be provided above and below a semiconductor layer in which a channel is formed.

The structure in which the semiconductor layer where a channel is formed is provided between two gates is used for the transistor 201, the transistor 205, and the transistor 206. The two gates may be connected to each other and supplied with the same signal to operate the transistor. Alternatively, a potential for controlling the threshold voltage may be supplied to one of the two gates and a potential for operation may be supplied to the other to control the threshold voltage of the transistor.

There is no particular limitation on the crystallinity of a semiconductor material used for the transistors, and an amorphous semiconductor or a semiconductor having crystallinity (a microcrystalline semiconductor, a polycrystalline semiconductor, a single crystal semiconductor, or a semiconductor partly including crystal regions) may be used. It is preferable to use a semiconductor having crystallinity, in which case degradation of the transistor characteristics can be suppressed.

A semiconductor layer of a transistor preferably includes a metal oxide (also referred to as an oxide semiconductor). Alternatively, the semiconductor layer of the transistor may include silicon. Examples of silicon include amorphous silicon and crystalline silicon (e.g., low-temperature polysilicon or single crystal silicon).

The semiconductor layer preferably includes indium, M (M is one or more kinds selected from gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, and magnesium), and zinc, for example. In particular, M is preferably one or more kinds selected from aluminum, gallium, yttrium, and tin.

It is particularly preferable to use an oxide containing indium (In), gallium (Ga), and zinc (Zn) (also referred to as IGZO) for the semiconductor layer.

In the case where the semiconductor layer is an In-M-Zn oxide, a sputtering target used for depositing the In-M-Zn oxide preferably has the atomic proportion of In higher than or equal to the atomic proportion of M. Examples of the atomic ratio of the metal elements in such a sputtering target include In:M:Zn=1:1:1, In:M:Zn=1:1:1.2, In:M:Zn=2:1:3, In:M:Zn=3:1:2, In:M:Zn=4:2:3, In:M:Zn=4:2:4.1, In:M:Zn=5:1:6, In:M:Zn=5:1:7, In:M:Zn=5:1:8, In:M:Zn=6:1:6, and In:M:Zn=5:2:5.

A target including a polycrystalline oxide is preferably used as the sputtering target, in which case the semiconductor layer having crystallinity is easily formed. Note that the atomic ratio in the deposited semiconductor layer may vary from the above atomic ratio between metal elements in the sputtering target in a range of ±40%. For example, in the case where the composition of a sputtering target used for the semiconductor layer is In:Ga:Zn=4:2:4.1 [atomic ratio], the composition of the semiconductor layer to be deposited is sometimes in the neighborhood of In:Ga:Zn=4:2:3 [atomic ratio].

Note that when the atomic ratio is described as In:Ga:Zn=4:2:3 or as being in the neighborhood thereof, the case is included where the atomic proportion of Ga is greater than or equal to 1 and less than or equal to 3 and the atomic proportion of Zn is greater than or equal to 2 and less than or equal to 4 with the atomic proportion of In being 4. In addition, when the atomic ratio is described as In:Ga:Zn=5:1:6 or as being in the neighborhood thereof, the case is included where the atomic proportion of Ga is greater than 0.1 and less than or equal to 2 and the atomic proportion of Zn is greater than or equal to 5 and less than or equal to 7 with the atomic proportion of In being 5. Furthermore, when the atomic ratio is described as In:Ga:Zn=1:1:1 or as being in the neighborhood thereof, the case is included where the atomic proportion of Ga is greater than and less than or equal to 2 and the atomic proportion of Zn is greater than 0.1 and less than or equal to 2 with the atomic proportion of In being 1.

The transistors included in the circuit 164 and the transistors included in the pixel portion may have the same structure or different structures. A plurality of transistors included in the circuit 164 may have the same structure or two or more kinds of structures. Similarly, a plurality of transistors included in the pixel portion 30 may have the same structure or two or more kinds of structures.

The adhesive layer 150 is provided on the outer side of the substrate 151. The semiconductor device 100A can be fixed to an object with the adhesive layer 150.

A variety of optical members can be arranged on the outer surface of the substrate 152. Examples of the optical members include a polarizing plate, a retardation plate, a light diffusion layer (e.g., diffusion film), an anti-reflective layer, and a light-condensing film. Furthermore, an antistatic film inhibiting the attachment of dust, a water repellent film inhibiting the attachment of stain, a hard coat film inhibiting generation of a scratch caused by the use, a shock absorbing layer, or the like may be provided on the outside of the substrate 152.

For each of the substrate 151 and the substrate 152, glass, quartz, ceramic, sapphire, resin, or the like can be used. When a flexible material is used for the substrate 151 and the substrate 152, the flexibility of the semiconductor device can be increased.

As the adhesive layer 142 and the adhesive layer 155, a variety of curable adhesives, e.g., a photocurable adhesive such as an ultraviolet curable adhesive, a reactive curable adhesive, a thermosetting adhesive, and an anaerobic adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with low moisture permeability, such as an epoxy resin, is preferred. Alternatively, a two-component resin may be used. An adhesive sheet or the like may be used.

The light-emitting element 70 has a top-emission structure, a bottom-emission structure, a dual-emission structure, or the like. A conductive film that transmits infrared light is used as the electrode through which light is extracted. A conductive film that reflects infrared light is preferably used as the electrode through which no light is extracted.

The light-emitting element 70 includes at least the light-emitting layer 193. The light-emitting element 70 may further include, as a layer other than the light-emitting layer 193, a layer containing a substance with a high hole-injection property, a substance with a high hole-transport property, a hole-blocking material, a substance with a high electron-transport property, a substance with a high electron-injection property, a substance with a bipolar property (a substance with a high electron- and hole-transport property), or the like. For example, the common layer 112 preferably includes one or both of a hole-injection layer and a hole-transport layer. For example, the common layer 114 preferably includes one or both of an electron-transport layer and an electron-injection layer.

The common layer 112, the light-emitting layer 193, and the common layer 114 may use either a low molecular compound or a high molecular compound and may also contain an inorganic compound. The layers that constitute the common layer 112, the light-emitting layer 193, and the common layer 114 can each be formed with a method such as an evaporation method (including a vacuum evaporation method), a transfer method, a printing method, an inkjet method, or a coating method.

The light-emitting layer 193 may contain an inorganic compound such as quantum dots as a light-emitting material.

The active layer 113 of the photodetector 50 includes a semiconductor. Examples of the semiconductor include an inorganic semiconductor such as silicon and an organic semiconductor including an organic compound. This embodiment shows an example in which an organic semiconductor is used as the semiconductor included in the active layer 113. The use of an organic semiconductor is preferable because the light-emitting layer 193 of the light-emitting element 70 and the active layer 113 of the photodetector 50 can be formed with the same method (e.g., a vacuum evaporation method) and thus the same manufacturing apparatus can be used.

Examples of an n-type semiconductor material included in the active layer 113 are electron-accepting organic semiconductor materials such as fullerene (e.g., $C_{60}$ and $C_{70}$) and derivatives thereof. As a p-type semiconductor material contained in the active layer 113, an electron-donating organic semiconductor material such as copper(II) phthalocyanine (CuPc) or tetraphenyldibenzoperiflanthene (DBP) can be given.

For example, the active layer 113 is preferably formed through co-evaporation of an n-type semiconductor and a p-type semiconductor.

As materials that can be used for conductive layers such as a variety of wirings and electrodes that constitute the semiconductor device, in addition to a gate, a source, and a drain of a transistor; metals such as aluminum, titanium, chromium, nickel, copper, yttrium, zirconium, molybdenum, silver, tantalum, or tungsten, an alloy containing any of these metals as its main component, or the like can be given. A single-layer structure or a stacked-layer structure including a film containing any of these materials can be used.

As a light-transmitting conductive material, a conductive oxide such as indium oxide, indium tin oxide, indium zinc oxide, zinc oxide, or zinc oxide containing gallium, or graphene can be used. A metal material such as gold, silver, platinum, magnesium, nickel, tungsten, chromium, molybdenum, iron, cobalt, copper, palladium, or titanium, or an alloy material containing the metal material can also be used. A nitride of the metal material (e.g., titanium nitride) or the like may also be used. Note that in the case of using the metal material or the alloy material (or the nitride thereof), the thickness is preferably set small enough to be able to transmit light. A stacked-layer film of any of the above materials can be used as a conductive layer. For example, a stacked film or the like of indium tin oxide and an alloy of silver and magnesium is preferably used because it can increase the conductivity. These materials can also be used for conductive layers such as a variety of wirings and electrodes that constitute a semiconductor device, and conductive layers (conductive layers functioning as a pixel electrode or a common electrode) included in a display element.

As an insulating material that can be used for each insulating layer, for example, a resin such as an acrylic resin or an epoxy resin, and an inorganic insulating material such as silicon oxide, silicon oxynitride, silicon nitride oxide, silicon nitride, or aluminum oxide can be given.

Semiconductor Device 100B

Figure 22:
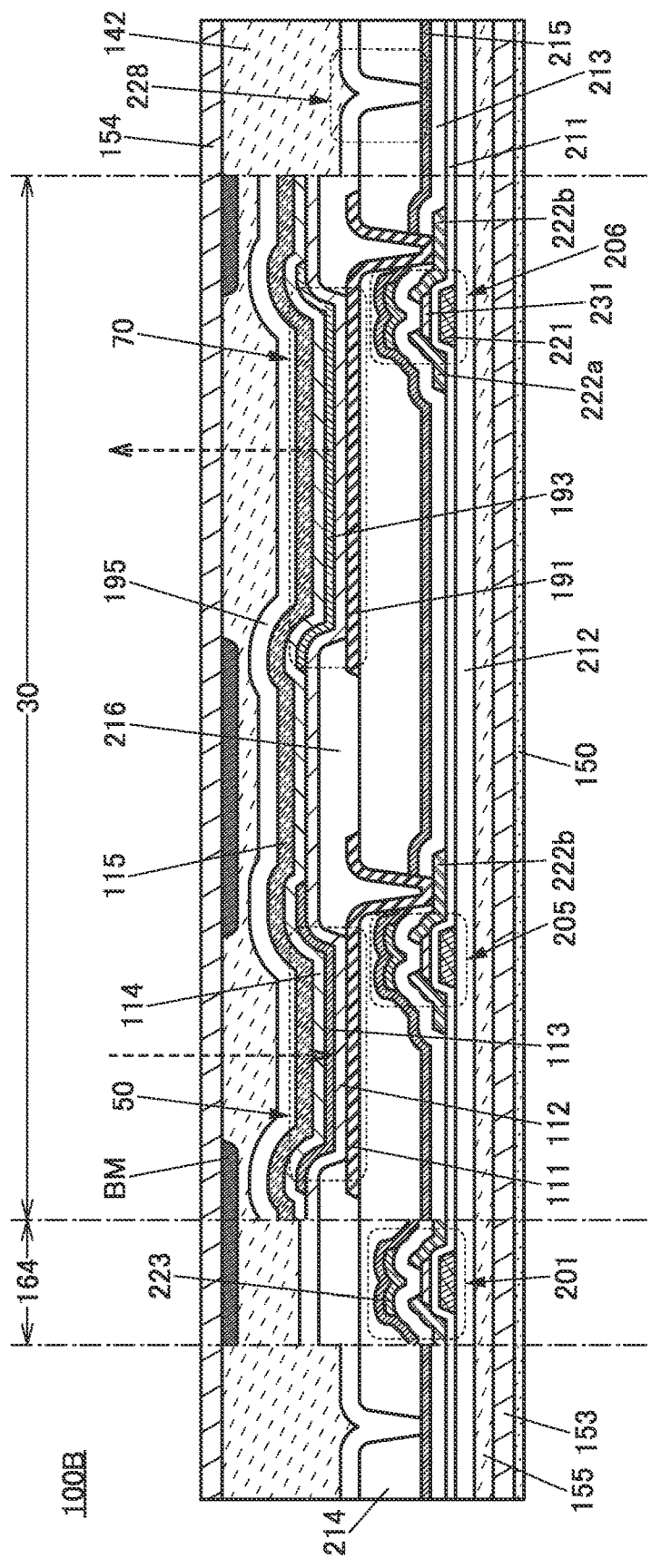
FIG. 22 is a cross-sectional view illustrating a structure example of a semiconductor device.

FIG. 22 illustrates a cross-sectional view of a semiconductor device 100B.

The semiconductor device 100B differs from the semiconductor device 100A in that the substrate 151 and the substrate 152 are not included, the substrate 153, the substrate 154, the adhesive layer 155, and the insulating layer 212 are included, and the protective layer 195 is included.

The substrate 153 and the insulating layer 212 are bonded to each other with the adhesive layer 155. The substrate 154 and the protective layer 195 are bonded to each other with the adhesive layer 142. The adhesive layer 142 is provided to overlap with the photodetector 50 and the light-emitting element 70; that is, the semiconductor device 100B employs a solid sealing structure.

The semiconductor device 100B is formed in such a manner that the insulating layer 212, the transistor 201, the transistor 205, the transistor 206, the photodetector 50, the light-emitting element 70, and the like which are formed over a formation substrate are transferred onto the substrate 153. The substrate 153 and the substrate 154 preferably have flexibility. Accordingly, the flexibility of the semiconductor device 100B can be increased.

The adhesive layer 150 is provided on the outer side of the substrate 153. The semiconductor device 100B can be fixed to an object with the adhesive layer 150.

The inorganic insulating film that can be used as the insulating layer 211, the insulating layer 213, and the insulating layer 215 can be used as the insulating layer 212.

Providing the protective layer 195 covering the photodetector 50 and the light-emitting element 70 can inhibit entry of impurities such as water into the photodetector 50 and the light-emitting element 70, so that the reliability of the photodetector 50 and the light-emitting element can be increased.

In the region 228 in the vicinity of an end portion of the semiconductor device 100B, the insulating layer 215 and the protective layer 195 are preferably in contact with each other through an opening in the insulating layer 214. In particular, the inorganic insulating film included in the insulating layer 215 and the inorganic insulating film included in the protective layer 195 are preferably in contact with each other. Thus, entry of impurities from the outside into the semiconductor device 100B through the organic insulating film can be inhibited. Thus, the reliability of the semiconductor device 100B can be increased.

The protective layer 195 may have a stacked-layer structure of an organic insulating film and an inorganic insulating film. In that case, an end portion of the inorganic insulating film preferably extends beyond an end portion of the organic insulating film.

Semiconductor Device 100C

FIG. 23A illustrates a cross-sectional view of a semiconductor device 100C.

The semiconductor device 100C differs from the semiconductor device 100B in transistor structures.

The semiconductor device 100C includes a transistor 208, a transistor 209, and a transistor 210 over the substrate 153.

Each of the transistor 208, the transistor 209, and the transistor 210 includes the conductive layer 221 functioning as a gate, the insulating layer 211 functioning as a gate insulating layer, a semiconductor layer including a channel formation region 231i and a pair of low-resistance regions 231n, the conductive layer 222a connected to one of the pair of low-resistance regions 231n, the conductive layer 222b connected to the other of the pair of low-resistance regions 231n, an insulating layer 225 functioning as a gate insulating layer, the conductive layer 223 functioning as a gate, and the insulating layer 215 covering the conductive layer 223. The insulating layer 211 is positioned between the conductive layer 221 and the channel formation region 231i. The insulating layer 225 is positioned between the conductive layer 223 and the channel formation region 231i.

The conductive layer 222a and the conductive layer 222b are connected to the corresponding low-resistance regions 231n through openings provided in the insulating layer 225 and the insulating layer 215. One of the conductive layer 222a and the conductive layer 222b serves as a source, and the other serves as a drain.

The pixel electrode 191 of the light-emitting element 70 is electrically connected to the other of the pair of low-resistance regions 231n of the transistor 208 through the conductive layer 222b.

The pixel electrode 111 of the photodetector 50 is electrically connected to the other of the pair of low-resistance regions 231n of the transistor 209 through the conductive layer 222b.

FIG. 23A illustrates an example in which the insulating layer 225 covers a top surface and a side surface of the semiconductor layer. Meanwhile, in FIG. 23B, the insulating layer 225 overlaps with the channel formation region 231i of the semiconductor layer 231 and does not overlap with the low-resistance regions 231n. The structure illustrated in FIG. 23B can be obtained by processing the insulating layer 225 with the conductive layer 223 as a mask, for example. In FIG. 23B, the insulating layer 215 is provided to cover the insulating layer 225 and the conductive layer 223, and the conductive layer 222a and the conductive layer 222b are connected to the low-resistance regions 231n through the openings in the insulating layer 215. Furthermore, an insulating layer 218 covering the transistor may be provided.

Metal Oxide

A metal oxide that can be used for the semiconductor layer is described below.

Note that in this specification and the like, a metal oxide containing nitrogen is also collectively referred to as a metal oxide in some cases. A metal oxide containing nitrogen may be referred to as a metal oxynitride. For example, a metal oxide containing nitrogen, such as zinc oxynitride (ZnON), may be used for the semiconductor layer.

A metal oxide with a low carrier concentration is preferably used for the semiconductor layer. In order to reduce the carrier concentration of the metal oxide, the concentration of impurities in the metal oxide is reduced so that the density of defect states can be reduced. In this specification and the like, a state with a low impurity concentration and a low density of defect states is referred to as a highly purified intrinsic or substantially highly purified intrinsic state. Examples of impurities in a metal oxide include hydrogen, nitrogen, alkali metal, alkaline earth metal, iron, nickel, and silicon.

In particular, hydrogen contained in a metal oxide reacts with oxygen bonded to a metal atom to be water, and thus forms oxygen vacancies in the metal oxide in some cases. If the channel formation region in the metal oxide includes oxygen vacancies, the transistor sometimes has normally-on characteristics. In some cases, a defect that is an oxygen vacancy into which hydrogen enters functions as a donor and generates an electron serving as a carrier. In other cases, bonding of part of hydrogen to oxygen bonded to a metal atom generates electrons serving as carriers. Thus, a transistor using a metal oxide containing a large amount of hydrogen is likely to have normally-on characteristics.

A defect that is an oxygen vacancy into which hydrogen has entered can function as a donor of a metal oxide. However, it is difficult to evaluate the defects quantitatively. Thus, the metal oxide is sometimes evaluated in terms of not its donor concentration but its carrier concentration. Therefore, in this specification and the like, the carrier concentration assuming the state where an electric field is not applied is sometimes used, instead of the donor concentration, as the parameter of the metal oxide. That is, "carrier concentration" in this specification and the like can be replaced with "donor concentration" in some cases.

Therefore, hydrogen in the metal oxide is preferably reduced as much as possible. Specifically, the hydrogen concentration of the metal oxide, which is measured by secondary ion mass spectrometry (SIMS), is lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$. When a metal oxide with sufficiently reduced concentration of impurities such as hydrogen is used for a channel formation region of a transistor, stable electrical characteristics can be given.

The carrier concentration of the metal oxide in the channel formation region is preferably lower than or equal to $1\times10^{18}$ cm$^{-3}$, further preferably lower than $1\times10^{17}$ cm$^{-3}$, still further preferably lower than $1\times10^{16}$ cm$^{-3}$, yet further preferably lower than $1\times10^{13}$ cm$^{-3}$, and yet still further preferably lower than $1\times10^{12}$ cm$^{-3}$. Note that the lower limit of the carrier concentration of the metal oxide in the channel formation region is not particularly limited and can be, for example, $1\times10^{-9}$ cm$^{-3}$.

In this specification and the like, CAAC (c-axis aligned crystal) and CAC (Cloud-Aligned Composite) may be stated. CAAC refers to an example of a crystal structure, and CAC refers to an example of a function or a material composition.

As the semiconductor layer, a CAC-OS can be used, for example.

A CAC-OS or a CAC-metal oxide has a conducting function in part of the material and has an insulating function in part of the material, and has a function of a semiconductor as the whole material. Note that, in the case where the CAC-OS or the CAC-metal oxide is used in a semiconductor layer of a transistor, the conducting function is to allow electrons (or holes) serving as carriers to flow, and the insulating function is to not allow electrons serving as carriers to flow. By the complementary action of the conducting function and the insulating function, a switching function (On/Off function) can be given to the CAC-OS or the CAC-metal oxide. In the CAC-OS or the CAC-metal oxide, separation of the functions can maximize each function.

The CAC-OS or the CAC-metal oxide includes conductive regions and insulating regions. The conductive regions have the above-described conducting function, and the insulating regions have the above-described insulating function. Furthermore, in some cases, the conductive regions and the insulating regions in the material are separated at the nanoparticle level. Furthermore, in some cases, the conductive regions and the insulating regions are unevenly distributed in the material. Furthermore, in some cases, the conductive regions are observed to be coupled in a cloud-like manner with their boundaries blurred.

In the CAC-OS or the CAC-metal oxide, the conductive regions and the insulating regions each have a size greater than or equal to 0.5 nm and less than or equal to 10 nm, preferably greater than or equal to 0.5 nm and less than or equal to 3 nm and are dispersed in the material in some cases.

The CAC-OS or the CAC-metal oxide includes components having different band gaps. For example, the CAC-OS or the CAC-metal oxide is composed of a component having a wide gap due to the insulating region and a component having a narrow gap due to the conductive region. In the case of the structure, when carriers flow, carriers mainly flow in the component having a narrow gap. Furthermore, the component having a narrow gap complements the component having a wide gap, and carriers also flow in the component having a wide gap in conjunction with the component having a narrow gap. Therefore, in the case where the above-described CAC-OS or CAC-metal oxide is used in a channel formation region of a transistor, high current drive capability in the on state of the transistor, that is, a high on-state current and high field-effect mobility can be obtained.

In other words, the CAC-OS or the CAC-metal oxide can also be referred to as a matrix composite or a metal matrix composite.

Oxide semiconductors (metal oxides) are classified into a single crystal oxide semiconductor and a non-single-crystal oxide semiconductor. Oxide semiconductors (metal oxides) are classified into a single crystal oxide semiconductor and a non-single-crystal oxide semiconductor. Examples of a non-single-crystal oxide semiconductor include a CAAC-OS (c-axis aligned crystalline oxide semiconductor), a polycrystalline oxide semiconductor, an nc-OS (nanocrystalline oxide semiconductor), an amorphous-like oxide semiconductor (a-like OS), and an amorphous oxide semiconductor.

The CAAC-OS has c-axis alignment, a plurality of nanocrystals are connected in the a-b plane direction, and its crystal structure has distortion. Note that the distortion refers to a portion where the direction of a lattice arrangement changes between a region with a regular lattice arrangement and another region with a regular lattice arrangement in a region where the plurality of nanocrystals are connected.

The nanocrystal is basically a hexagon but is not always a regular hexagon and is a non-regular hexagon in some cases. Furthermore, a pentagonal or heptagonal lattice arrangement, for example, is included in the distortion in some cases. Note that it is difficult to observe a clear crystal grain boundary (also referred to as grain boundary) even in the vicinity of distortion in the CAAC-OS. That is, formation of a crystal grain boundary is found to be inhibited by the distortion of a lattice arrangement. This is because the CAAC-OS can tolerate distortion owing to a low density of arrangement of oxygen atoms in the a-b plane direction, an interatomic bond length changed by substitution of a metal element, and the like.

The CAAC-OS tends to have a layered crystal structure (also referred to as a layered structure) in which a layer containing indium and oxygen (hereinafter, In layer) and a layer containing the element M, zinc, and oxygen (hereinafter, (M,Zn) layer) are stacked. Note that indium and the element M can be replaced with each other, and when the element M in the (M,Zn) layer is replaced with indium, the layer can also be referred to as an (In,M,Zn) layer. Furthermore, when indium in the In layer is replaced with the element M, the layer can be referred to as an (In,M) layer.

The CAAC-OS is a metal oxide with high crystallinity. On the other hand, a clear crystal grain boundary is difficult to observe in the CAAC-OS; thus, it can be said that a reduction in electron mobility due to the crystal grain boundary is unlikely to occur. Entry of impurities, formation of defects, or the like might decrease the crystallinity of a metal oxide; thus, it can be said that the CAAC-OS is a metal oxide that has small amounts of impurities and defects (e.g., oxygen vacancies (also referred to as Vo)). Thus, a metal oxide including a CAAC-OS is physically stable. Therefore, the metal oxide including a CAAC-OS is resistant to heat and has high reliability.

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor by some analysis methods.

Note that indium-gallium-zinc oxide (hereinafter referred to as IGZO), which is a kind of metal oxide containing indium, gallium, and zinc, has a stable structure in some cases by being formed of the above-described nanocrystals. In particular, crystals of IGZO tend not to grow in the air and thus, a stable structure is obtained when IGZO is formed of smaller crystals (e.g., the above-described nanocrystals) rather than larger crystals (here, crystals with a size of several millimeters or several centimeters).

An a-like OS is a metal oxide having a structure between those of the nc-OS and an amorphous oxide semiconductor. The a-like OS includes a void or a low-density region. That is, the a-like OS has low crystallinity as compared with the nc-OS and the CAAC-OS.

An oxide semiconductor (metal oxide) can have various structures that show different properties. Two or more of the amorphous oxide semiconductor, the polycrystalline oxide semiconductor, the a-like OS, the nc-OS, and the CAAC-OS may be included in an oxide semiconductor of one embodiment of the present invention.

A metal oxide film that functions as a semiconductor layer can be formed using either or both of an inert gas and an oxygen gas. Note that there is no particular limitation on the flow rate ratio of oxygen (the partial pressure of oxygen) at the time of depositing the metal oxide film. However, to obtain a transistor having high field-effect mobility, the flow rate ratio of oxygen (the partial pressure of oxygen) at the time of depositing the metal oxide film is preferably higher than or equal to 0% and lower than or equal to 30%, further preferably higher than or equal to 5% and lower than or equal to 30%, and still further preferably higher than or equal to 7% and lower than or equal to 15%.

The energy gap of the metal oxide is preferably 2 eV or more, further preferably 2.5 eV or more, still further preferably 3 eV or more. With the use of a metal oxide having such a wide energy gap, the off-state current of the transistor can be reduced.

The substrate temperature during the deposition of the metal oxide film is preferably lower than or equal to 350° C., further preferably higher than or equal to room temperature and lower than or equal to 200° C., and still further preferably higher than or equal to room temperature and lower than or equal to 130° C. The substrate temperature during the deposition of the metal oxide film is preferably room temperature because productivity can be increased.

The metal oxide film can be formed with a sputtering method. Alternatively, a PLD method, a PECVD method, a thermal CVD method, an ALD method, or a vacuum evaporation method, for example, may be used.

In the photodetector, at least one of the layers other than the active layer can have a structure in common with a layer in the light-emitting element (EL element). Also in the photodetector, all of the layers other than the active layer can have structures in common with the layers in the light-emitting element (EL element). For example, the light-emitting element and the photodetector can be formed over one substrate only by adding a step of depositing the active layer in the manufacturing process of the light-emitting element. In the photodetector and the light-emitting element, their pixel electrodes can be formed using the same material in the same step, and their common electrodes can be formed using the same material in the same step. When a circuit electrically connected to the photodetector and a circuit electrically connected to the light-emitting element are formed using the same materials in the same steps, the manufacturing process of the semiconductor device can be simplified. In such a manner, a semiconductor device that incorporates a photodetector and is highly convenient can be manufactured without complicated steps.

The semiconductor device of this embodiment includes a coloring layer between the photodetector and the light-emitting element. A bank that electrically isolates the photodetector and the light-emitting element may also function as the colored layer. The coloring layer can absorb stray light in the semiconductor device, which increases the sensitivity of a sensor using the photodetector.

At least part of this embodiment can be implemented in combination with the other embodiments described in this specification as appropriate.

Embodiment 3

In this embodiment, electronic devices of embodiments of the present invention will be described.

Electronic devices in this embodiment are each provided with the semiconductor device of one embodiment of the present invention. For example, the semiconductor device of one embodiment of the present invention can be used in a display portion of the electronic device. Since the semiconductor device of one embodiment of the present invention has a function of detecting light, the display device can perform an input operation regardless of whether with or without contact. In addition, biological recognition can be performed with the use of an imaging function of the display portion. Thus, the electronic device can have improved functionality and convenience, for example.

Examples of the electronic devices include a digital camera, a digital video camera, a digital photo frame, a mobile phone, a portable game console, a portable information terminal, and an audio reproducing device, in addition to electronic devices with a relatively large screen, such as a television device, a desktop or laptop personal computer, a monitor of a computer or the like, digital signage, and a large game machine such as a pachinko machine.

The electronic device in this embodiment may include a sensor (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, a smell, or infrared rays).

The electronic device in this embodiment can have a variety of functions. For example, the electronic device can have a function of displaying a variety of data (a still image, a moving image, a text image, and the like) on the display portion, a touch panel function, a function of displaying a calendar, date, time, and the like, a function of executing a variety of software (programs), a wireless communication function, and a function of reading out a program or data stored in a recording medium.

Figure 24A:
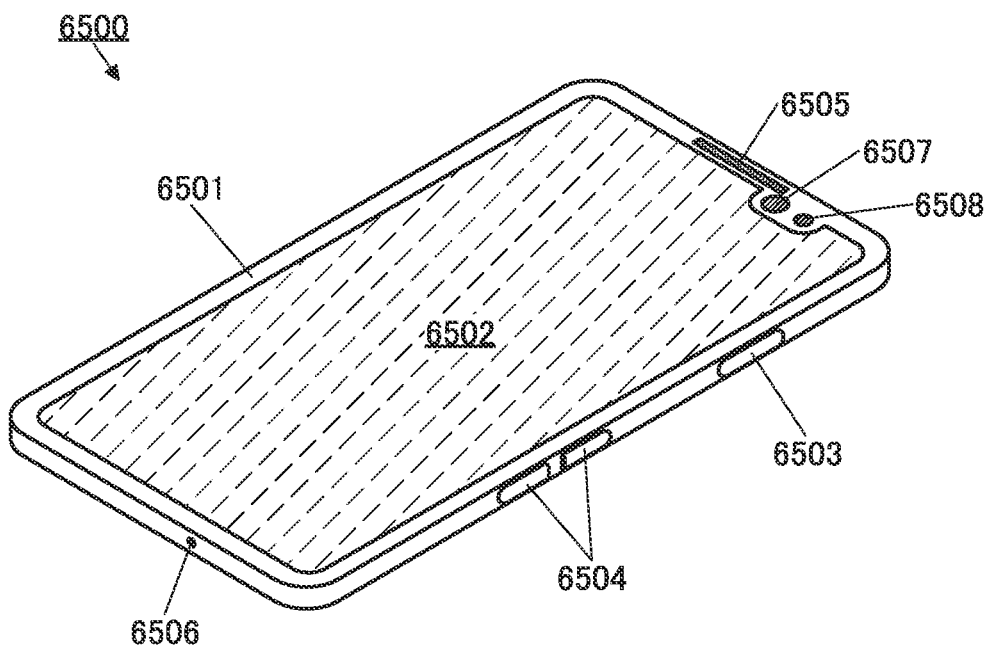
FIG. 24A and FIG. 24B are diagrams showing an example of an electronic device.

An electronic device 6500 illustrated in FIG. 24A is a portable information terminal that can be used as a smartphone.

The electronic device 6500 includes a housing 6501, a display portion 6502, a power button 6503, buttons 6504, a speaker 6505, a microphone 6506, a camera 6507, a light source 6508, and the like. The display portion 6502 has a touch panel function.

The semiconductor device of one embodiment of the present invention can be used in the display portion 6502.

Figure 24B:
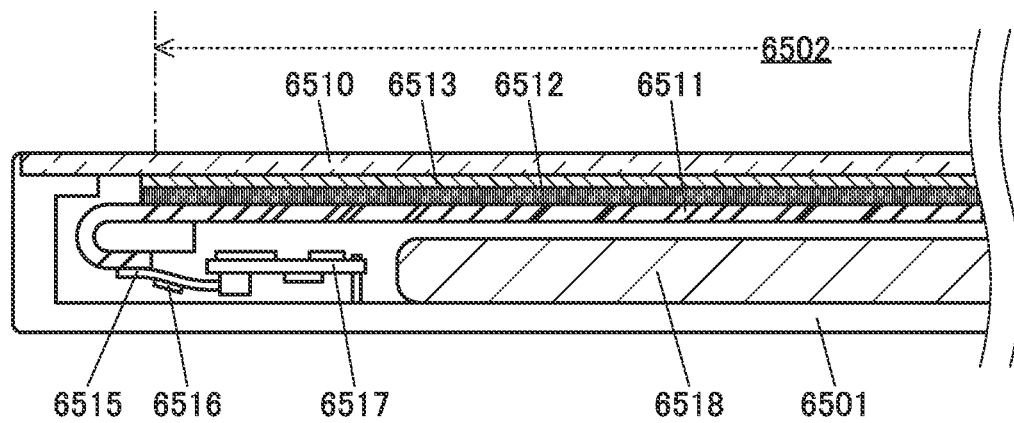

FIG. 24B is a schematic cross-sectional view including an end portion of the housing 6501 on the microphone 6506 side.

A protection member 6510 having a light-transmitting property is provided on the display surface side of the housing 6501, and a display panel 6511, an optical member 6512, a touch sensor panel 6513, a printed circuit board 6517, a battery 6518, and the like are provided in a space surrounded with the housing 6501 and the protection member 6510.

The display panel 6511, the optical member 6512, and the touch sensor panel 6513 are fixed to the protection member 6510 with an adhesive layer (not illustrated). Note that the semiconductor device of one embodiment of the present invention can be used in the display panel 6511, and the touch sensor panel 6513 may be omitted in the case where only a sensor function of the semiconductor device is used.

Part of the display panel 6511 is folded back in a region outside the display portion 6502, and an FPC 6515 is connected to the part that is folded back. An IC 6516 is mounted on the FPC 6515. The FPC 6515 is connected to a terminal provided on the printed circuit board 6517.

The semiconductor device with flexibility of one embodiment of the present invention can be used for the display panel 6511. Thus, an extremely lightweight electronic device can be achieved. Since the display panel 6511 is extremely thin, the battery 6518 with high capacity can be mounted with the thickness of the electronic device controlled. An electronic device with a narrow frame can be achieved when part of the display panel 6511 is folded back so that the portion connected to the FPC 6515 is provided on the rear side of a pixel portion.

Figure 25A:
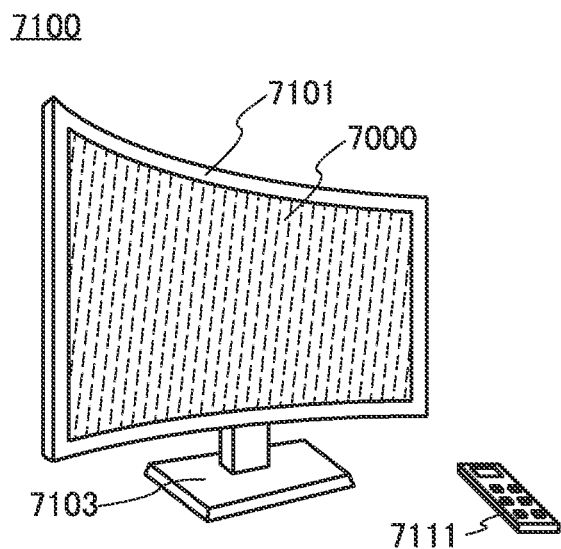
FIG. 25A to FIG. 25D are drawings showing examples of electronic devices.

FIG. 25A illustrates an example of a television device. In a television device 7100, a display portion 7000 is incorporated in a housing 7101. Here, a structure in which the housing 7101 is supported with a stand 7103 is illustrated.

The semiconductor device of one embodiment of the present invention can be used for the display portion 7000.

Operation of the television device 7100 illustrated in FIG. 25A can be performed with an operation switch provided in the housing 7101 or a remote controller 7111. Alternatively, the television device 7100 may be operated in such a manner that the touch sensor or the near-touch sensor provided in the display portion 7000 is made to function and a finger or the like touches or is made closer to the display portion 7000. The remote controller 7111 may be provided with a display portion for displaying information output from the remote controller 7111. With operation keys or a touch panel provided in the remote controller 7111, channels and volume can be operated and video displayed on the display portion 7000 can be operated.

Note that the television device 7100 has a structure in which a receiver, a modem, and the like are provided. A general television broadcast can be received with the receiver. When the television device is connected to a communication network with or without wires via the modem, one-way (from a transmitter to a receiver) or two-way (between a transmitter and a receiver or between receivers, for example) data communication can be performed.

Figure 25B:
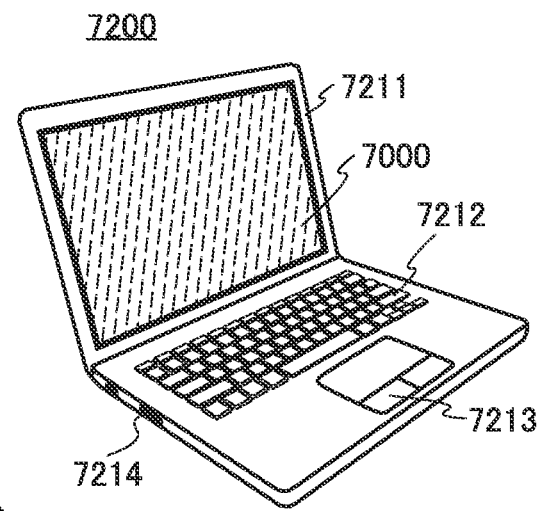

FIG. 25B illustrates an example of a laptop personal computer. A laptop personal computer 7200 includes a housing 7211, a keyboard 7212, a pointing device 7213, an external connection port 7214, and the like. In the housing 7211, the display portion 7000 is incorporated.

The semiconductor device of one embodiment of the present invention can be used for the display portion 7000.

Figure 25C:
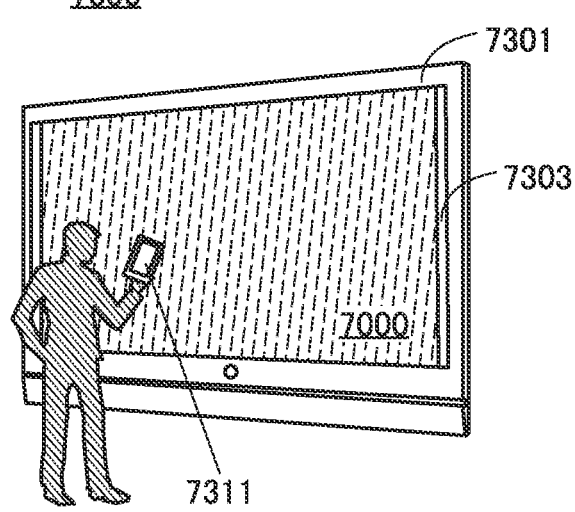
Figure 25D:
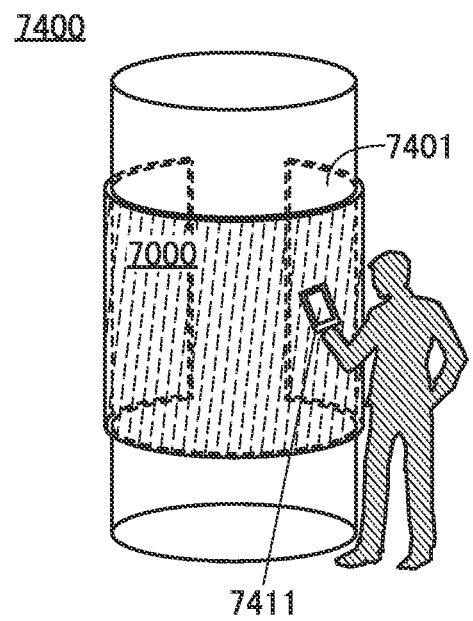

FIG. 25C and FIG. 25D show examples of digital signage.

Digital signage 7300 illustrated in FIG. 25C includes a housing 7301, the display portion 7000, a speaker 7303, and the like. Furthermore, the digital signage can include an LED lamp, operation keys (including a power switch or an operation switch), a connection terminal, a variety of sensors, a microphone, and the like.

FIG. 25D is digital signage 7400 attached to a cylindrical pillar 7401. The digital signage 7400 includes the display portion 7000 provided along a curved surface of the pillar 7401.

The semiconductor device of one embodiment of the present invention can be used for the display portion 7000 in FIG. 25C and FIG. 25D.

A larger area of the display portion 7000 can increase the amount of data that can be provided at a time. The larger display portion 7000 attracts more attention, so that the advertising effectiveness can be enhanced, for example.

When the touch sensor or the near-touch sensor provided in the display portion 7000 is made to function, not only display of an image or a moving image on the display portion 7000 but also intuitive operation by the user is possible. Moreover, for an application for getting information such as route information or traffic information, usability can be enhanced by intuitive operation.

Furthermore, as illustrated in FIG. 25C and FIG. 25D, it is preferable that the digital signage 7300 or the digital signage 7400 work with an information terminal 7311 or an information terminal 7411 such as a smartphone a user has through wireless communication. For example, information of an advertisement displayed on the display portion 7000 can be displayed on a screen of the information terminal 7311 or the information terminal 7411. By operation of the information terminal 7311 or the information terminal 7411, display on the display portion 7000 can be switched.

Furthermore, it is possible to make the digital signage 7300 or the digital signage 7400 execute a game with the use of the screen of the information terminal 7311 or the information terminal 7411 as an operation means (controller). Thus, an unspecified number of users can join in and enjoy the game concurrently.

The electronic devices illustrated in FIG. 26A to FIG. 26F include a housing 9000, a display portion 9001, a speaker 9003, an operation key 9005 (including a power switch or an operation switch), a connection terminal 9006, a sensor 9007 (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, a smell, or infrared rays), a microphone 9008, and the like.

The electronic devices illustrated in FIG. 26A to FIG. 26F have a variety of functions. For example, the electronic devices can have a function of displaying a variety of data (a still image, a moving image, a text image, and the like) on the display portion, a touch panel function, a function of displaying a calendar, date, time, and the like, a function of controlling processing with use of a variety of software (programs), a wireless communication function, and a function of reading out and processing a program or data stored in a recording medium. Note that the functions of the electronic devices are not limited thereto, and the electronic devices can have a variety of functions. The electronic devices may include a plurality of display portions. The electronic devices may each include a camera or the like and have a function of taking a still image or a moving image and storing the taken image in a recording medium (an external recording medium or a recording medium incorporated in the camera), a function of displaying the taken image on the display portion, or the like.

The details of the electronic devices illustrated in FIG. 26A to FIG. 26F will be described below. When the semiconductor device of one embodiment of the present invention is used in the electronic devices illustrated in FIG. 26A to FIG. 26F, an input function is possible even without contact. In addition, biological recognition can be performed with the use of an imaging function of the display portion. Thus, the electronic device can have improved functionality and convenience, for example.

Figure 26A:
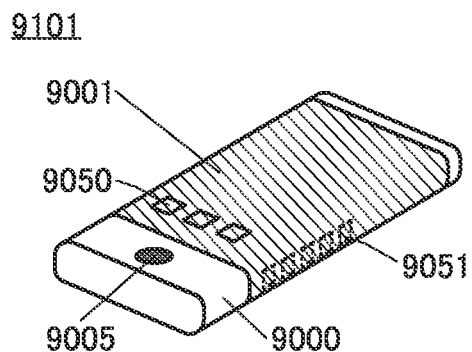
FIG. 26A to FIG. 26F are diagrams showing examples of electronic devices.

FIG. 26A is a perspective view illustrating a portable information terminal 9101. For example, the portable information terminal 9101 can be used as a smartphone. Note that the portable information terminal 9101 may be provided with the speaker 9003, the connection terminal 9006, the sensor 9007, or the like. The portable information terminal 9101 can display characters and image information on its plurality of surfaces. FIG. 26A shows an example where three icons 9050 are displayed. Information 9051 indicated by dashed rectangles can be displayed on another surface of the display portion 9001. Examples of the information 9051 include notification of reception of an e-mail, SNS, or an incoming call, the title and sender of an e-mail, SNS, or the like, the date, the time, remaining battery, and the reception strength of an antenna. Alternatively, the icon 9050 or the like may be displayed in the position where the information 9051 is displayed.

Figure 26B:
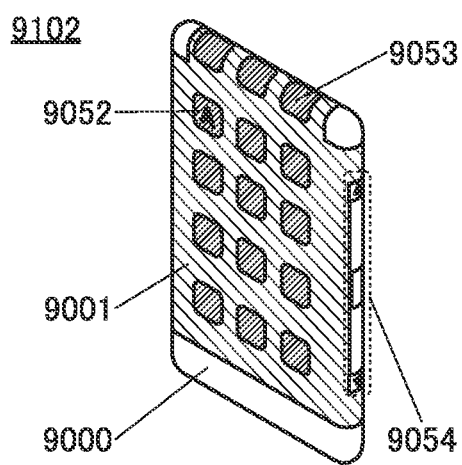

FIG. 26B is a perspective view illustrating a portable information terminal 9102. The portable information terminal 9102 has a function of displaying information on three or more surfaces of the display portion 9001. Here, an example in which information 9052, information 9053, and information 9054 are displayed on different surfaces is shown. For example, a user can check the information 9053 displayed in a position that can be observed from above the portable information terminal 9102, with the portable information terminal 9102 put in a breast pocket of his/her clothes. The user can see the display without taking out the portable information terminal 9102 from the pocket and decide whether to answer the call, for example.

Figure 26C:
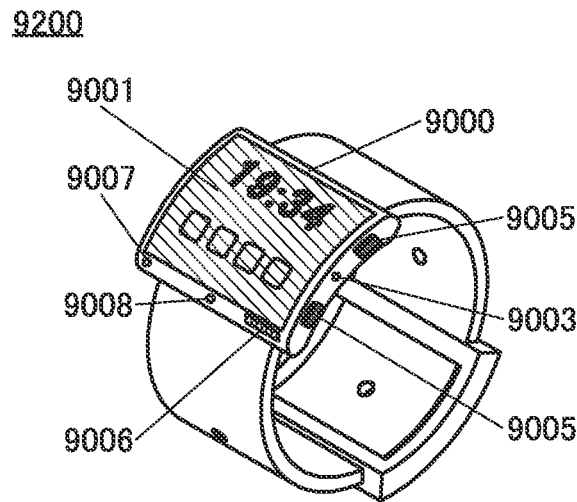

FIG. 26C is a perspective view illustrating a watch-type portable information terminal 9200. For example, the portable information terminal 9200 can be used as a smartwatch. The display surface of the display portion 9001 is curved and provided, and display can be performed along the curved display surface. Mutual communication between the portable information terminal 9200 and, for example, a headset capable of wireless communication enables hands-free calling. With the connection terminal 9006, the portable information terminal 9200 can perform mutual data transmission with another information terminal and charging. Note that the charging operation may be performed through wireless power feeding.

Figure 26D:
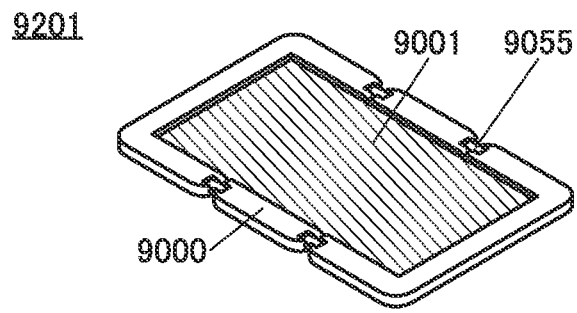
Figure 26E:
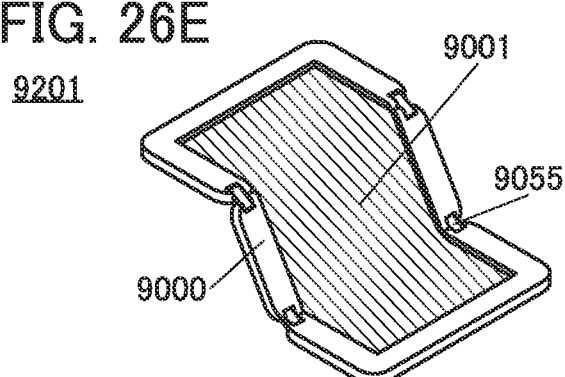
Figure 26F:
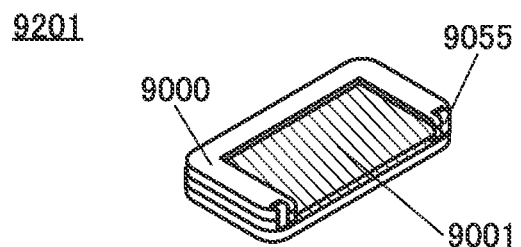

FIG. 26D to FIG. 26F are perspective views showing a foldable portable information terminal 9201. Specifically, FIG. 26D is a perspective view of an opened state of the portable information terminal 9201, FIG. 26F is a perspective view of a folded state thereof, and FIG. 26E is a perspective view of a state in the middle of change from one of FIG. 26D and FIG. 26F to the other. The portable information terminal 9201 is highly portable in the folded state and is highly browsable in the opened state because of a seamless large display region. The display portion 9001 of the portable information terminal 9201 is supported by three housings 9000 joined by hinges 9055. For example, the display portion 9001 can be curved with a radius of curvature greater than or equal to 0.1 mm and less than or equal to 150 mm.

At least part of this embodiment can be implemented in combination with the other embodiments described in this specification as appropriate.

EXAMPLE

In this example, the results of simulation of a shift register circuit included in a semiconductor device of one embodiment of the present invention are described.

In this example, the shift register circuit illustrated in FIG. 5 was assumed and the operation illustrated in FIG. 9 and FIG. 10 were simulated. In addition, the shift register circuit with the configuration illustrated in FIG. 13 was assumed and the operations illustrated in FIG. 17 and FIG. 18 were simulated. Here, k was 36.

Figure 27A:
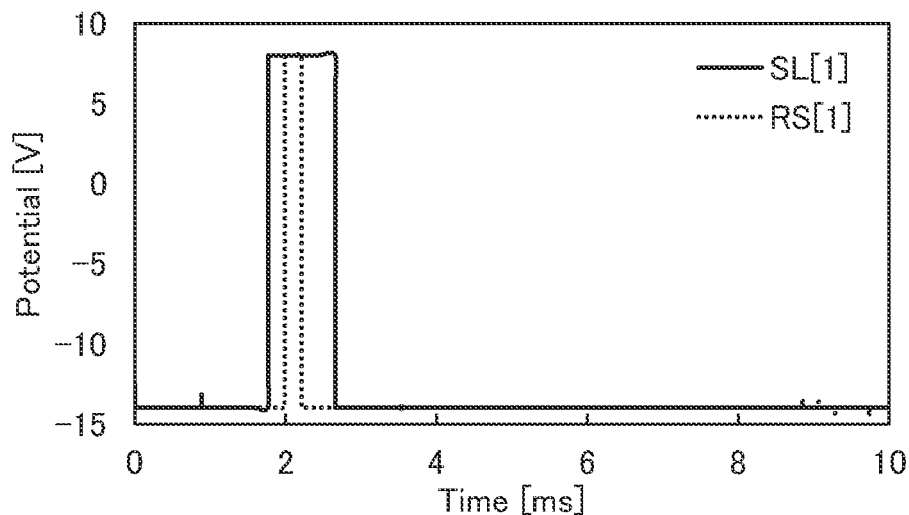
FIG. 27A to FIG. 27C are simulation results of an example.
Figure 27B:
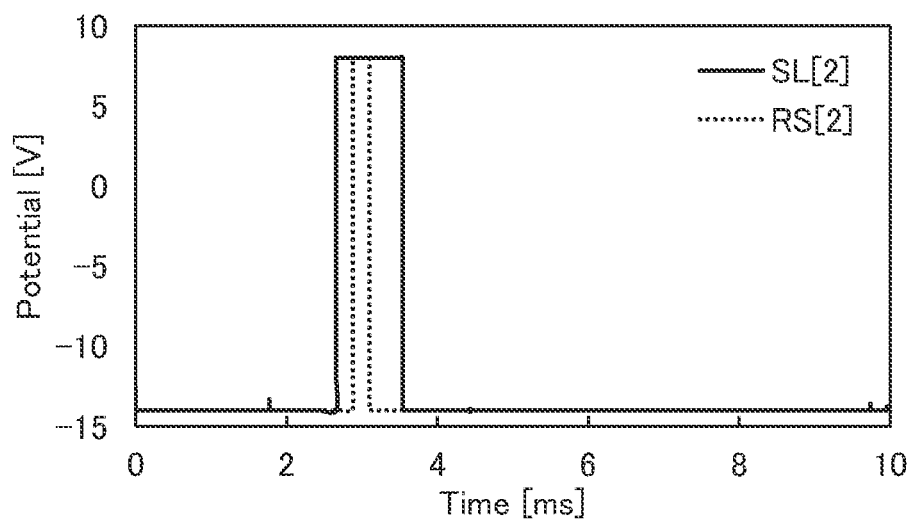
Figure 27C:
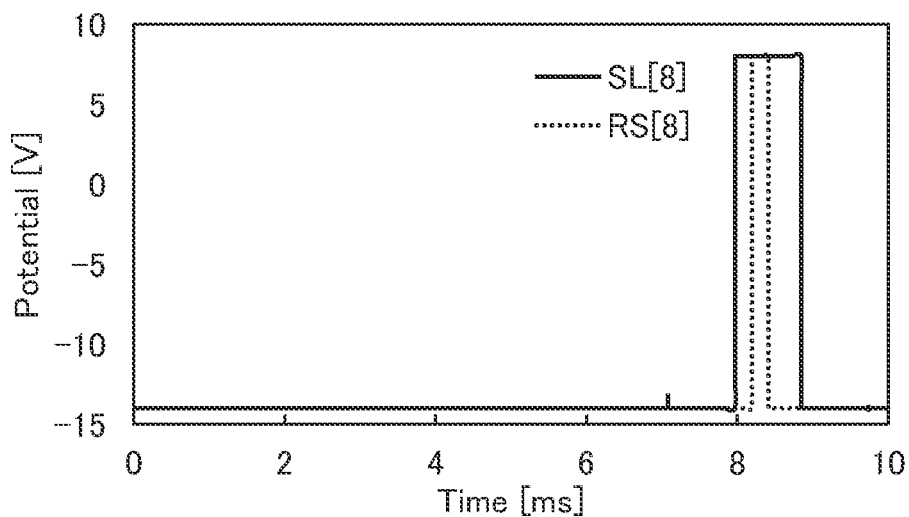

FIG. 27A to FIG. 27C are graphs illustrating the potential changes of the terminal SL and the terminal RS over time when the shift register circuit with the configuration illustrated in FIG. 5 was assumed and the operation illustrated in FIG. 9, that is, the first mode operation was simulated. The potential changes of the terminal SL over time are illustrated with solid lines and the potential changes of the terminal RS are illustrated with dotted lines. FIG. 27A illustrates the potential change of the terminal SL[1] and the terminal RS[1] over time, FIG. 27B illustrates the potential change of the terminal SL[2] and the terminal RS[2] over time, and FIG. 27C illustrates the potential change of the terminal SL[8] and the terminal RS[8] over time.

Figure 28A:
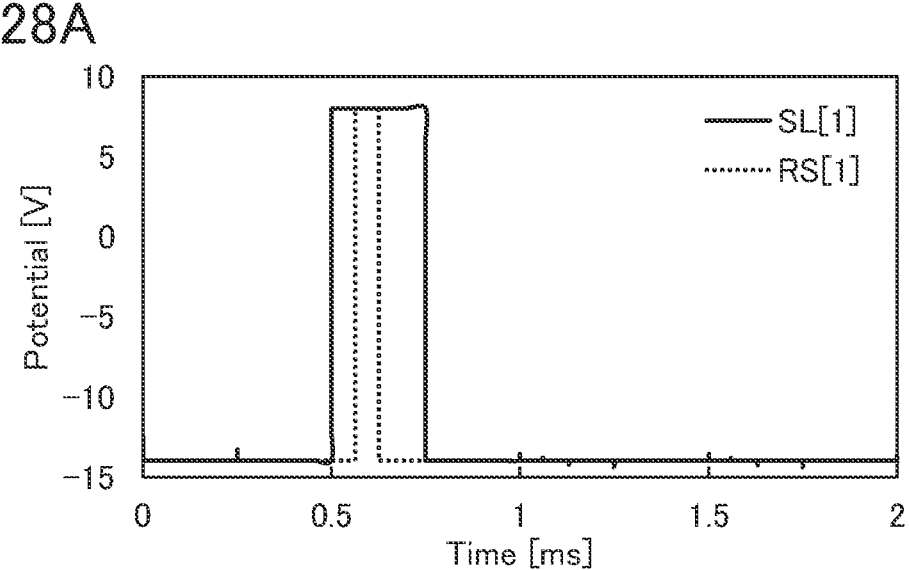
FIG. 28A to FIG. 28C are simulation results of an example.
Figure 28B:
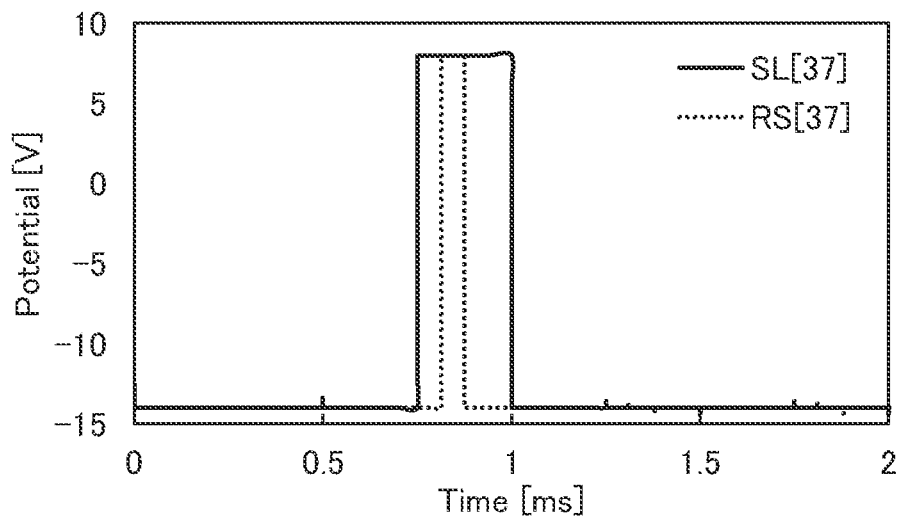
Figure 28C:
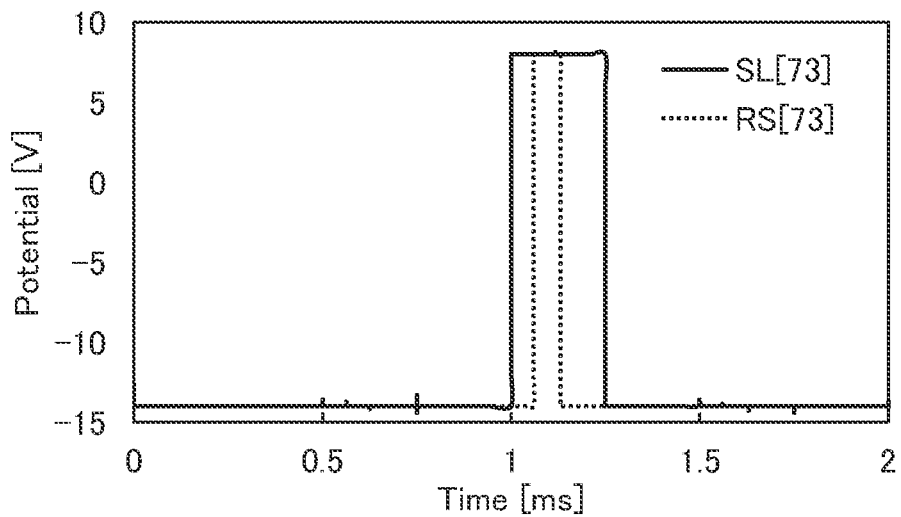

FIG. 28A to FIG. 28C are graphs illustrating the potential changes of the terminal SL and the terminal RS over time when the shift register circuit with the configuration illustrated in FIG. 5 was assumed and the operation illustrated in FIG. 10, that is, the second mode operation was simulated. The potential changes of the terminal SL over time are illustrated with solid lines and the potential changes of the terminal RS are illustrated with dotted lines. FIG. 28A illustrates the potential change of the terminal SL[1] and the terminal RS[1] over time, FIG. 28B illustrates the potential change of the terminal SL[37] and the terminal RS[37] over time, and FIG. 28C illustrates the potential change of the terminal SL[73] and the terminal RS[73] over time.

Figure 29A:
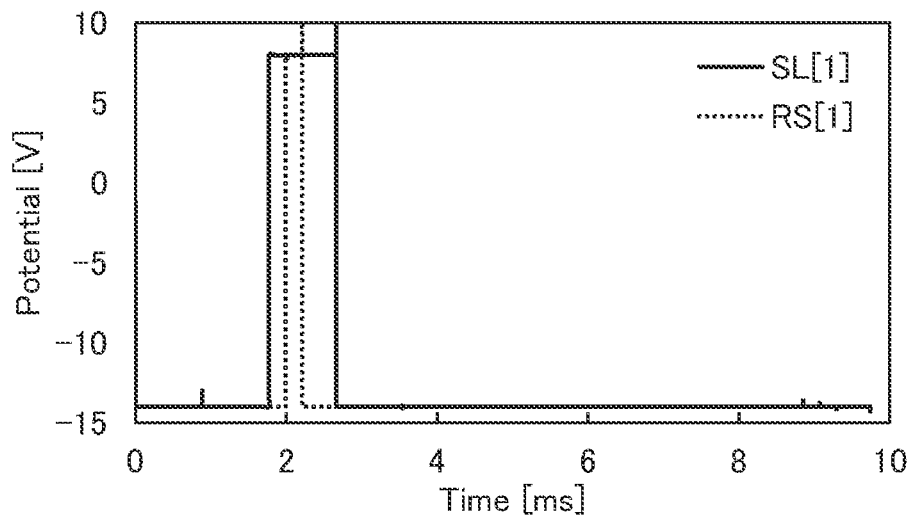
FIG. 29A to FIG. 29C are simulation results of an example.
Figure 29B:
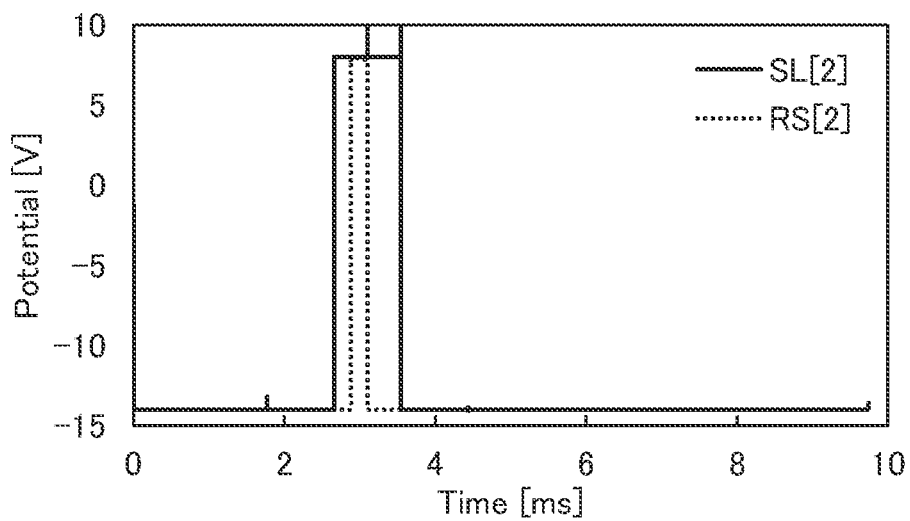
Figure 29C:
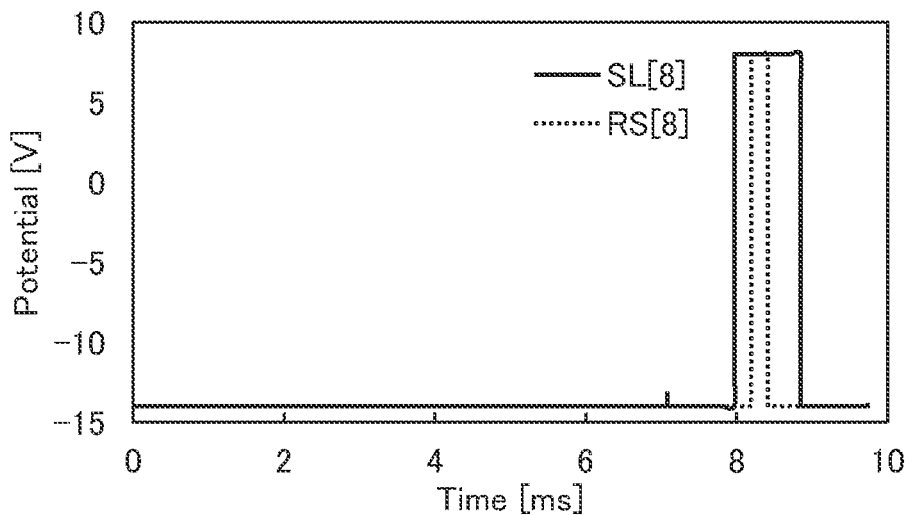

FIG. 29A to FIG. 29C are graphs illustrating the potential changes of the terminal SL and the terminal RS over time when the shift register circuit with the configuration illustrated in FIG. 13 was assumed and the operation illustrated in FIG. 17, that is, the first mode operation was simulated. The potential changes of the terminal SL over time are illustrated with solid lines and the potential changes of the terminal RS are illustrated with dotted lines. FIG. 29A illustrates the potential change of the terminal SL[1] and the terminal RS[1] over time, FIG. 29B illustrates the potential change of the terminal SL[2] and the terminal RS[2] over time, and FIG. 29C illustrates the potential change of the terminal SL[8] and the terminal RS[8] over time.

Figure 30A:
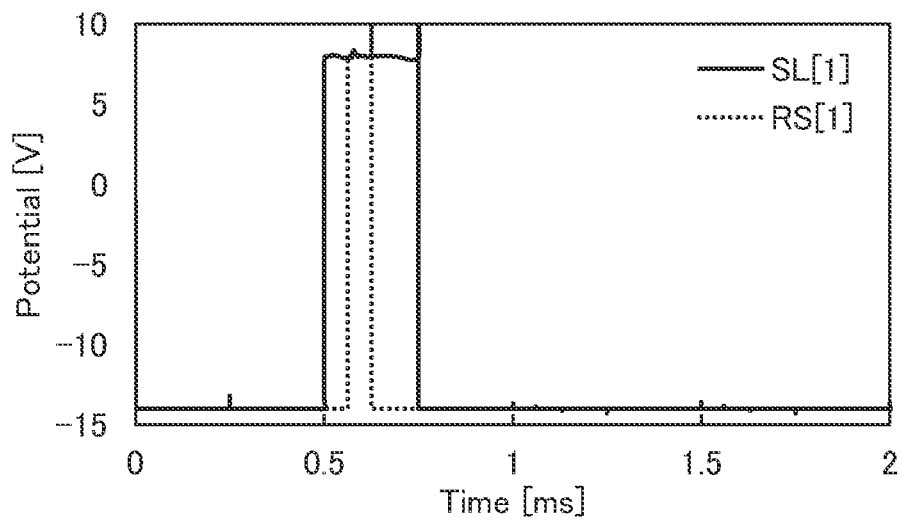
FIG. 30A to FIG. 30C are simulation results of an example.
Figure 30B:
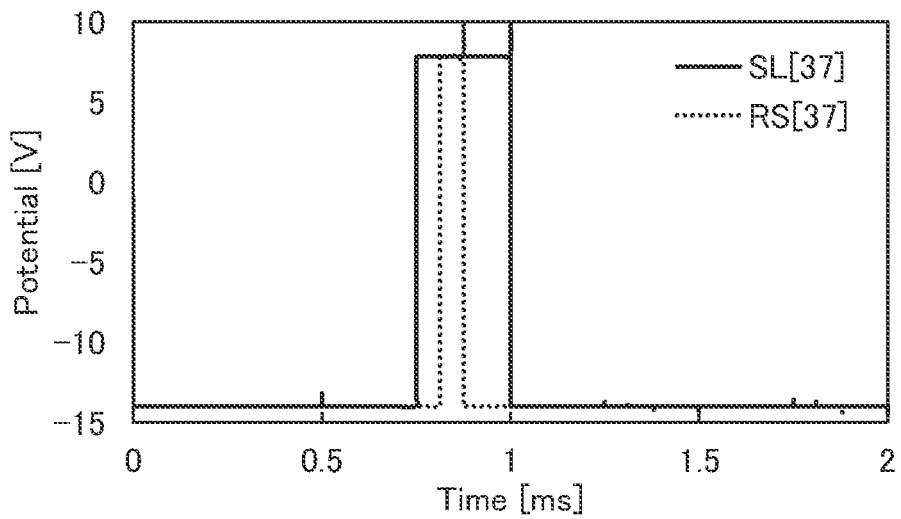
Figure 30C:
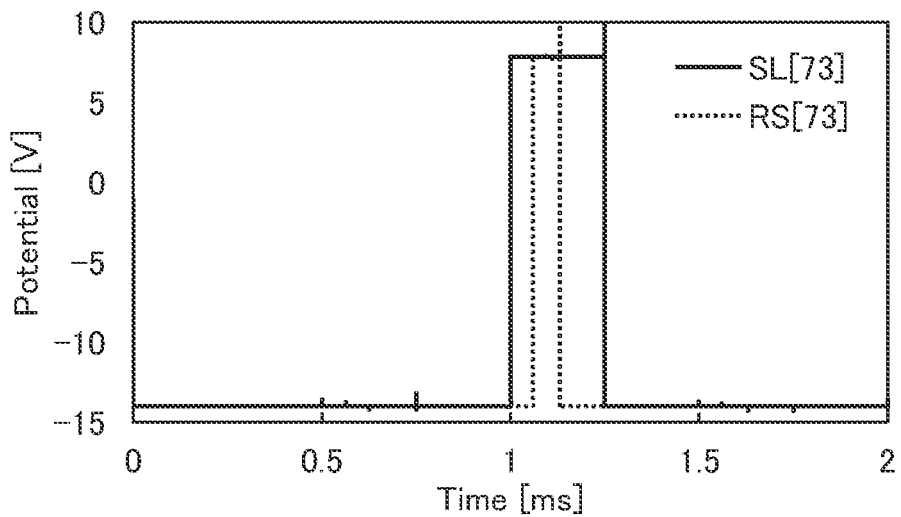

FIG. 30A to FIG. 30C are graphs illustrating the potential changes of the terminal SL and the terminal RS over time when the shift register circuit with the configuration illustrated in FIG. 13 was assumed and the operation illustrated in FIG. 18, that is, the second mode operation was simulated. The potential changes of the terminal SL over time are illustrated with solid lines and the potential changes of the terminal RS are illustrated with dotted lines. FIG. 30A illustrates the potential change of the terminal SL[1] and the terminal RS[1] over time, FIG. 30B illustrates the potential change of the terminal SL[37] and the terminal RS[37] over time, and FIG. 30C illustrates the potential change of the terminal SL[73] and the terminal RS[73] over time.

In the case where the shift circuit had any of the configurations illustrated in FIG. 5 and FIG. 13, it was confirmed that signals were sequentially output from the terminals SL and the terminals RS in both the first mode and the second mode.

REFERENCE NUMERALS

10: semiconductor device, 10A: semiconductor device, 10B: semiconductor device, 10C: semiconductor device, 10D: semiconductor device, 10E: semiconductor device, 10F: semiconductor device, 11: substrate, 12: substrate, 13: light-emitting device, 15: imaging device, 23: light, 25: light, 27: finger, 29: fingerprint, 30: pixel portion, 31: pixel, 33: gate driver circuit, 35: CDS circuit, 36: data driver circuit, 41: wiring, 43: wiring, 44: wiring, 45: wiring, 46: wiring, 47: wiring, 48: wiring, 49: wiring, 50: photodetector, 51: transistor, 52: transistor, 53: transistor, 54: transistor, 56: capacitor, 57: capacitor, 61: period, 62: period, 63: period, 64: period, 65: period, 70: light-emitting element, 71: transistor, 100A: semiconductor device, 100B: semiconductor device, 100C: semiconductor device, 111: pixel electrode, 112: common layer, 113: active layer, 114: common layer, 115: common electrode, 123a: light, 123b: reflected light, 123c: light, 123d: reflected light, 142: adhesive layer, 143: space, 150: adhesive layer, 151: substrate, 152: substrate, 153: substrate, 154: substrate, 155: adhesive layer, 164: circuit, 182: buffer layer, 184: buffer layer, 191: pixel electrode, 192: buffer layer, 193: light-emitting layer, 194: buffer layer, 195: protective layer, 201: transistor, 205: transistor, 206: transistor, 208: transistor, 209: transistor, 210: transistor, 211: insulating layer, 212: insulating layer, 213: insulating layer, 214: insulating layer, 215: insulating layer, 216: bank, 217: bank, 218: insulating layer, 221: conductive layer, 222a: conductive layer, 222b: conductive layer, 223: conductive layer, 225: insulating layer, 228: region, 231: semiconductor layer, 231i: channel formation region, 231n: low-resistance region, 6500: electronic device, 6501: housing, 6502: display portion, 6503: power button, 6504: button, 6505: speaker, 6506: microphone, 6507: camera, 6508: light source, 6510: protection member, 6511: display panel, 6512: optical member, 6513: touch sensor panel, 6515: FPC, 6516: IC, 6517: printed substrate, 6518: battery, 7000: display portion, 7100: television device, 7101: housing, 7103: stand, 7111: remote controller, 7200: laptop personal computer, 7211: housing, 7212: keyboard, 7213: pointing device, 7214: external connection port, 7300: digital signage, 7301: housing, 7303: speaker, 7311: information terminal, 7400: digital signage, 7401: pillar, 7411: information terminal, 9000: housing, 9001: display portion, 9003: speaker, 9005: operation key, 9006: connection terminal, 9007: sensor, 9008: microphone, 9050: icon, 9051: information, 9052: information, 9053: information, 9054: information, 9055: hinge, 9101: portable information terminal, 9102: portable information terminal, 9200: portable information terminal, 9201: portable information terminal

The invention claimed is:

1. A semiconductor device, comprising:
a light-emitting device and an imaging device,
wherein the imaging device comprises a gate driver circuit,
wherein the imaging device is configured to operate in a first mode or a second mode,
wherein the gate driver circuit comprises first to m-th register circuits for the first mode, first to p-th register circuits for the second mode, a buffer circuit, a first transistor, a second transistor, a third transistor, and a fourth transistor,
wherein the first to m-th register circuits for the first mode are connected with each other in series,
wherein the first to p-th register circuits for the second mode are connected with each other in series,
wherein a first output terminal of the first register circuit for the first mode is electrically connected to one of a source and a drain of the first transistor,
wherein a second output terminal of the first register circuit for the first mode is electrically connected to one of a source and a drain of the second transistor,
wherein a first output terminal of the first register circuit for the second mode is electrically connected to one of a source and a drain of the third transistor,
wherein a second output terminal of the first register circuit for the second mode is electrically connected to one of a source and a drain of the fourth transistor,
wherein the other of the source and the drain of the first transistor is electrically connected to the other of the source and the drain of the third transistor,
wherein the other of the source and the drain of the first transistor is electrically connected to the buffer circuit,
wherein the other of the source and the drain of the second transistor is electrically connected to the other of the source and the drain of the fourth transistor,
wherein the other of the source and the drain of the second transistor is electrically connected to the buffer circuit,
wherein m is an integer more than or equal to 2, and
wherein p is an integer more than or equal to 1 and less than m.

2. The semiconductor device, according to claim 1,
wherein in the first mode, the first and the second transistors are in the on state, and the third and the fourth transistors are in the off state, and
wherein in the second mode, the third and the fourth transistors are in the on state, and the first and the second transistors are in the off state.

3. The semiconductor device, according to claim 1,
wherein the imaging device comprises m rows of pixels,
wherein p is m/k, and
wherein k is an integer more than or equal to 2 and less than or equal to m.

4. A semiconductor device, comprising:
a light-emitting device and an imaging device,
wherein the imaging device comprises a gate driver circuit,
wherein the imaging device is configured to operate in a first mode or a second mode,
wherein the gate driver circuit comprises first to m-th register circuits for the first mode, first to p-th register circuits for the second mode, a first transistor, a second transistor, a third transistor, and a fourth transistor, wherein the first to m-th register circuits for the first mode are connected with each other in series, wherein the first to p-th register circuits for the second mode are connected with each other in series, wherein a first output terminal of the first register circuit for the first mode is electrically connected to one of a source and a drain of the first transistor, wherein a second output terminal of the first register circuit for the first mode is electrically connected to one of a source and a drain of the second transistor, wherein a first output terminal of the first register circuit for the second mode is electrically connected to one of a source and a drain of the third transistor, wherein a second output terminal of the first register circuit for the second mode is electrically connected to one of a source and a drain of the fourth transistor, wherein the other of the source and the drain of the first transistor is electrically connected to the other of the source and the drain of the third transistor, wherein the other of the source and the drain of the second transistor is electrically connected to the other of the source and the drain of the fourth transistor, wherein m is an integer more than or equal to 2, wherein p is an integer more than or equal to 1 and less than m, wherein the imaging device is configured to perform fingerprint recognition in the first mode, and wherein the imaging device is configured to perform touch sensing or near touch sensing in the second mode.

5. The semiconductor device, according to claim 4, wherein in the first mode, the first and the second transistors are in the on state, and the third and the fourth transistors are in the off state, and wherein in the second mode, the third and the fourth transistors are in the on state, and the first and the second transistors are in the off state.

6. The semiconductor device, according to claim 4, wherein the imaging device comprises m rows of pixels, wherein p is m/k, and wherein k is an integer more than or equal to 2 and less than or equal to m.

7. The semiconductor device, according to claim 4, wherein the gate driver circuit comprises a buffer circuit, wherein the other of the source and the drain of the first transistor is electrically connected to the buffer circuit, and wherein the other of the source and the drain of the second transistor is electrically connected to the buffer circuit.

8. The semiconductor device, according to claim 4, wherein each of the first to m-th register circuits for the first mode comprises a buffer circuit, and wherein each of the first to p-th register circuits for the second mode comprises a buffer circuit.

9. A semiconductor device, comprising:

a transistor;

a light-emitting device electrically connected to the transistor; and an imaging device, wherein the imaging device comprises a gate driver circuit and m rows of pixels, wherein the gate driver circuit comprises a plurality of first register circuits and second register circuits whose number is less than that of the first register circuits, wherein the first register circuits are connected with each other in series, wherein the second register circuits are connected with each other in series, wherein the gate driver circuit is configured to operate in a first mode and a second mode, wherein in the first mode, the first register circuits are in an on state and the second register circuits are in an off state, wherein in the second mode, the second register circuits are in the on state and the first register circuits are in the off state, and wherein m is an integer more than or equal to 2.

10. The semiconductor device, according to claim 9, wherein the gate driver circuit comprises m first register circuits and m/k second register circuits, and wherein k is an integer more than or equal to 2 and less than or equal to m.

11. The semiconductor device, according to claim 9, wherein the number of rows of the pixels to which signals output from the second register circuits are supplied in the second mode is less than the number of rows of the pixels to which signals output from the first register circuits are supplied in the first mode.

12. The semiconductor device, according to claim 9, wherein in the first mode, signals output from the first register circuits are supplied to m rows of the pixels, and wherein in the second mode, signals output from the second register circuits are supplied to the pixels more than m/k rows and less than m rows.

13. The semiconductor device, according to claim 9, wherein the imaging device is configured to perform fingerprint recognition in the first mode, and wherein the imaging device is configured to perform touch sensing or near touch sensing in the second mode.

* * * * *